United States Patent
Wolting

(10) Patent No.: US 10,411,989 B2
(45) Date of Patent: Sep. 10, 2019

(54) COMPILER FOR AND METHOD OF SOFTWARE DEFINED NETWORKING, STORAGE AND COMPUTE DETERMINING PHYSICAL AND VIRTUAL RESOURCES

(71) Applicant: Wolting Holding B.V., Huizen (NL)

(72) Inventor: Simon Wolting, Huizen (NL)

(73) Assignee: Wolting Holding B.V., Huizen (NL)

( * ) Notice: Subject to any disclaimer, the term of this patent is extended or adjusted under 35 U.S.C. 154(b) by 158 days.

(21) Appl. No.: 15/512,892

(22) PCT Filed: Sep. 21, 2015

(86) PCT No.: PCT/NL2015/050657
§ 371 (c)(1),
(2) Date: Mar. 21, 2017

(87) PCT Pub. No.: WO2016/048143
PCT Pub. Date: Mar. 31, 2016

(65) Prior Publication Data
US 2017/0310574 A1    Oct. 26, 2017

(30) Foreign Application Priority Data

Sep. 22, 2014 (EP) ...................................... 14185824
Sep. 22, 2014 (EP) ...................................... 14185828

(51) Int. Cl.
| | |
|---|---|
| *H04L 12/751* | (2013.01) |
| *H04L 12/24* | (2006.01) |
| *H04L 12/947* | (2013.01) |
| *H04L 12/931* | (2013.01) |

(52) U.S. Cl.
CPC .............. *H04L 45/02* (2013.01); *H04L 41/12* (2013.01); *H04L 49/252* (2013.01); *H04L 49/70* (2013.01)

(58) Field of Classification Search
None
See application file for complete search history.

(56) References Cited

U.S. PATENT DOCUMENTS

| | | | |
|---|---|---|---|
| 2008/0219272 A1 | 9/2008 | Novello et al. | |
| 2009/0141637 A1* | 6/2009 | Bauer | H04L 45/04 370/238 |

(Continued)

FOREIGN PATENT DOCUMENTS

WO    2012090996 A1    7/2012

OTHER PUBLICATIONS

Kireeti Kompella, "Research Problems in SDN", Proceedings of IETF 85—SDNRG, Atlanta, GA, USA, Nov. 6, 2012, URL: http://www.1-4-5.net/~dmm/sdnrg/IETF85/presentations/Kompella.SDN-irtf.pptx.pdf.

*Primary Examiner* — Anh Ngoc M Nguyen
(74) *Attorney, Agent, or Firm* — N.V. Nederlandsch Octrooibureau; Catherine A. Shultz; Tamara C. Stegmann

(57) ABSTRACT

Method of and a compiler for controlling a network based on a logical network model. The compiler determines physical and/or virtual resources, comprising of physical nodes and physical links, against which the logical model can be compiled. The network has known physical nodes, unknown physical nodes and logical nodes. The known physical nodes are "physical nodes" which are existing or still to be setup (virtual) nodes in the network. The known physical nodes are interconnected by physical links in accordance with a physical network layout. The logical network model has logical nodes indicated with a logical node name which refers to at least one known physical node or one unknown physical node in the network. The method uses a depth-mapping relation defining how the logical nodes are mapped to the known physical nodes and the unknown physical nodes. The term "unknown physical node" is used to define an imaginary physical node to which logical nodes can be mapped through depth-mappings and which are to be substituted by a physical node of the network of which the physical node name is stored. The method includes creating logical links between the logical nodes in dependence on the (Continued)

paths between the known physical nodes and/or the unknown physical nodes and on the depth-mapping relation. Known physical nodes are determined for unknown physical nodes and known physical paths are determined for unknown physical paths between unknown physical nodes by performing a search. The method uses edge-relationships between logical link, logical path, physical link, physical path and depth-mapping relations. Logical paths in the logical network are transformed into a physical path comprising of physical links between the physical nodes through recursive calculation and forwarding instructions are created for the physical nodes, in dependence on the edge-relationships and point-of-attachment names between physical links and physical nodes.

29 Claims, 51 Drawing Sheets

(56)  References Cited

U.S. PATENT DOCUMENTS

| | | |
|---|---|---|
| 2009/0147723 A1* | 6/2009 | Fang .................... H04L 45/302 370/315 |
| 2011/0022694 A1 | 1/2011 | Dalal et al. |
| 2013/0044641 A1 | 2/2013 | Koponen et al. |
| 2013/0058215 A1 | 3/2013 | Koponen et al. |
| 2013/0163475 A1 | 6/2013 | Beliveau et al. |
| 2016/0014044 A1* | 1/2016 | Mangin ................ H04L 47/724 370/329 |

* cited by examiner

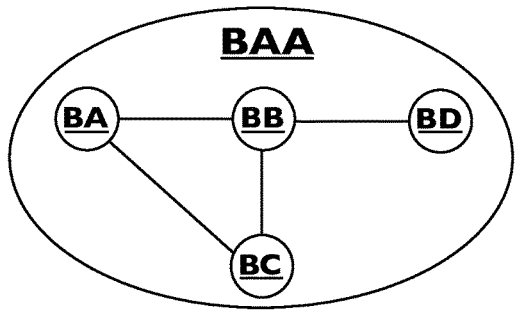
FIG. 2A  FIG. 2B
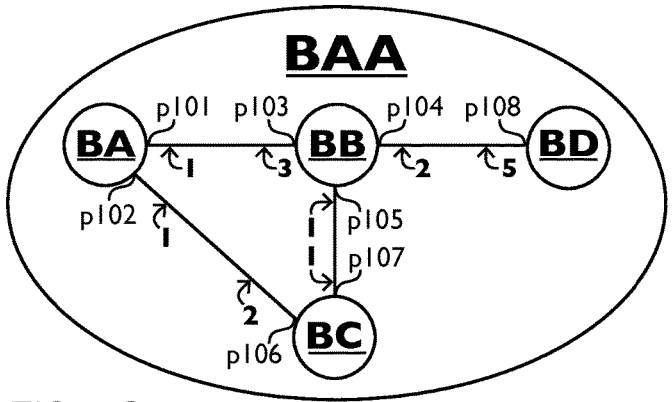
FIG. 2C
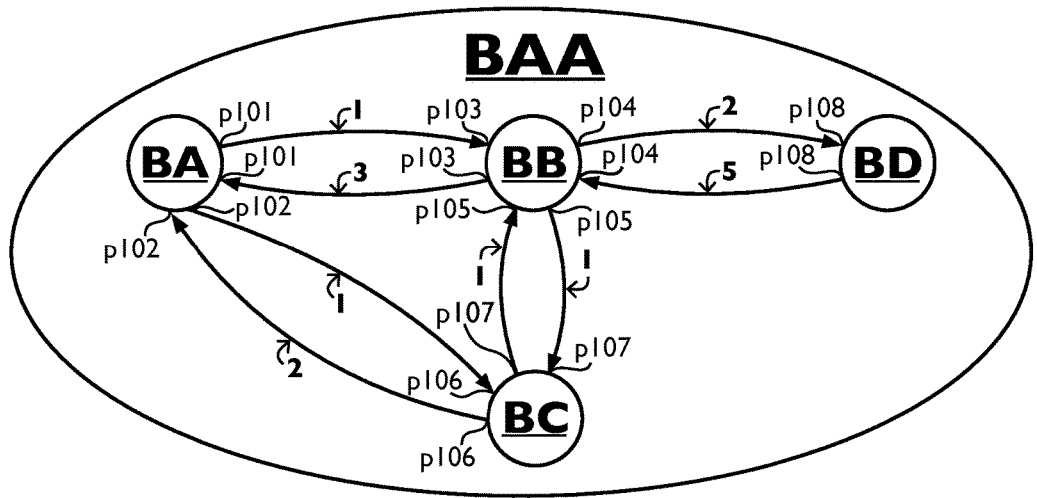
FIG. 2D

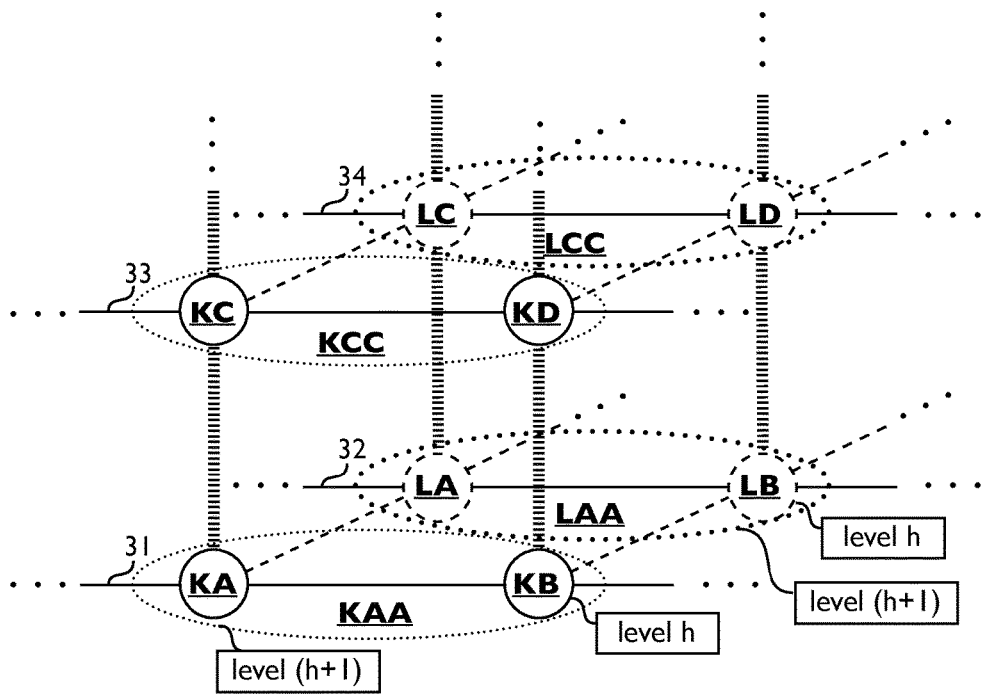
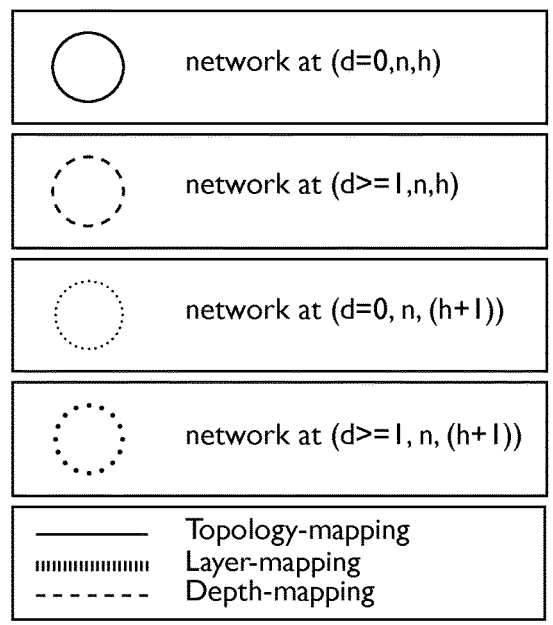
FIG. 3D

FIRST EDGE-NAME = FIRST NETWORK - (FIRST MAPPING-TYPE   FIRST POA :: SECOND POA) -> SECOND NETWORK

FIG. 6A

SECOND EDGE-NAME = SECOND NETWORK - (SECOND MAPPING-TYPE   THIRD POA :: FOURTH POA) -> THIRD NETWORK

FIG. 6B

THIRD EDGE-TYPE   THIRD EDGE-NAME = FIRST EDGE-NAME / THIRD EDGE-NAME + SECOND EDGE-NAME / THIRD EDGE-NAME

FIG. 6C

THIRD EDGE-TYPE   THIRD EDGE-NAME =
FIRST NETWORK - (FIRST MAPPING-TYPE   FIRST POA : FIRST SET OF EDGE-RELATIONSHIPS : SECOND POA) ->
SECOND NETWORK - (SECOND MAPPING-TYPE   THIRD POA : SECOND SET OF EDGE-RELATIONSHIPS : FOURTH POA) ->
THIRD NETWORK

FIG. 6D

```
L5 = KA-(topmap p701::p702)->KB
L6 = KB-(topmap p702::p701)->KA

L7 = KC-(laymap p704::p703)->KA
L8 = KA-(laymap p703::p704)->KC
L9 = KD-(laymap p706::p705)->KB
L10 = KB-(laymap p705::p706)->KD L12 = LA-(depmap)->KA
L13 = KB-(depmap)->LB
L15 = KA-(depmap)->LA
L16 = LB-(depmap)->KB
L17 = LC-(depmap)->KC
L18 = KD-(depmap)->LD
L24 = KC-(depmap)->LC
L25 = LD-(depmap)->KD
```

FIG. 7A

```
toppath L11 = L5/L11
topmap L14 = L12/L14+L11/L14+L13/L14
laymap L19 = L17/L19+L7/L19+L15/L19
laymap L20 = L16/L20+L10/L20+L18/L20
toppath L21 = L14/L21
topmap L22 = L19/L22+L21/L22+L20/L22
toppath L23 = L22/L23
```

FIG. 7B

| Step 1 | toppath L23 = L22/L23 = |
|---|---|
| Step 2 | L19/L22/L23+L21/L22/L23+L20/L22/L23 = |
| Step 3 | L19/L22/L23+L14/L21/L22/L23+L20/L22/L23 = |
| Step 4 | L17/L19/L22/L23+L7/L19/L22/L23+L15/L19/L22/L23+<br>L12/L14/L21/L22/L23+L11/L14/L21/L22/L23+<br>L13/L14/L21/L22/L23+L16/L20/L22/L23+L10/L20/L22/L23+<br>L18/L20/L22/L23 = |
| Step 5 | L17/L19/L22/L23+L7/L19/L22/L23+L15/L19/L22/L23+<br>L12/L14/L21/L22/L23+L5/L11/L14/L21/L22/L23+<br>L13/L14/L21/L22/L23+L16/L20/L22/L23+L10/L20/L22/L23+<br>L18/L20/L22/L23 = |
| Step 6 | LC-(depmap L17/L19/L22/L23)-><br>KC-(laymap p204:L7/L19/L22/L23:p203)-><br>KA-(depmap L15/L19/L22/L23)-><br>LA-(depmap L12/L14/L21/L22/L23)-><br>KA-(topmap p201:L5/L11/L14/L21/L22/L23:p202)-><br>KB-(depmap L13/L14/L21/L22/L23)-><br>LB-(depmap L16/L20/L22/L23)-><br>KB-(laymap p205:L10/L20/L22/L23:p206)-><br>KD-(depmap L18/L20/L22/L23)->LD |

FIG. 7C

```
K3 = ?X1-(depmap)->FE
K4 = FE-(depmap)->?X1
K5 = ?X2-(depmap)->FF
K6 = FF-(depmap)->?X2
K7 = ?X3-(depmap)->FG
K8 = FG-(depmap)->?X3
```

FIG. 11C

```
topmap K1 = K4/K1+?K9[toppath]/K1+K5/K1
topmap K2 = K6/K2+?K10[toppath]/K2+K7/K2
```

FIG. 11D

| Step 1 | topmap K1 = K4/K1+?K9[toppath]/K1+K5/K1 = |
|---|---|
| Step 2 | FE-(depmap K4/K1)-> ?X1-?K9[toppath]/K1->?X2-(depmap K5/K1)->FF |

FIG. 11E

| Step 1 | topmap K2 = K6/K2+?K10[toppath]/K2+K7/K2 = |
|---|---|
| Step 2 | FF-(depmap K6/K2)-> ?X2-?K10[toppath]/K2->?X3-(depmap K7/K2)->FG |

FIG. 11F

| PHYSICAL ENTITIES OF TOPMAP K1 | ?X1-?K9[toppath]/K1->?X2 |
|---|---|
| PHYSICAL ENTITIES OF TOPMAP K2 | ?X2-?K10[toppath]/K2->?X3 |
| SEARCH STATEMENT | (?X1-?K9[toppath]/K1->?X2) AND (?X2-?K10[toppath]/K2->?X3) |

FIG. 11G

| REQUIREMENTS LOGICAL TOPOLOGY-MAPPPING | REQUIREMENTS UNKNOWN PHYSICAL TOPOLOGY-PATH |
|---|---|
| K1 | ?K9 |
| K2 | ?K10 |

FIG. 11H

| REQUIREMENTS LOGICAL NODE | REQUIREMENTS UNKNOWN PHYSICAL NODE |
|---|---|
| FE | ?X1 |
| FF | ?X2 |
| FG | ?X3 |

FIG. 11I

K11 = KP-(topmap p211::p212)->KQ
K12 = KQ-(topmap p212::p211)->KP
K13 = KQ-(topmap p213::p214)->KR
K14 = KR-(topmap p214::p213)->KQ
K15 = KR-(topmap p215::p216)->KS
K16 = KS-(topmap p216::p215)->KR
K17 = KR-(topmap p217::p218)->KT
K18 = KT-(topmap p218::p217)->KR

FIG. 12C

| UNKNOWN PHYSICAL NODE | PHYSICAL NODE |
|---|---|
| ?X1 | KP |
| ?X2 | KQ |
| ?X3 | KS |

FIG. 12D

| UNKNOWN PHYSICAL TOPOLOGY-PATH | PHYSICAL TOPOLOGY-PATH |
|---|---|
| ?K9[toppath] | toppath K9=K11/K9 |
| ?K10[toppath] | toppath K10=K13/K10+K15/K10 |

FIG. 12E

```
K3 = KP-(depmap)->FE
K4 = FE-(depmap)->KP
K5 = KQ-(depmap)->FF
K6 = FF-(depmap)->KQ
K7 = KS-(depmap)->FG
K8 = FG-(depmap)->KS
```

FIG. 12G

```
topmap K1 = K4/K1+K9/K1+K5/K1
topmap K2 = K6/K2+K10/K2+K7/K2
```

FIG. 12H

```
toppath K19 = K1/K19+K2/K19
```

FIG. 12I

| Step 1 | toppath K19 = K1/K19+K2/K19 = |
|---|---|
| Step 2 | (K4/K1+K9/K1+K5/K1)/K19+(K6/K2+K10/K2+K7/K2)/K19 = |
| Step 3 | (K4/K1+(K11/K9)/K1+K5/K1)/K19+ <br> (K6/K2+(K13/K10+K15/K10)/K2+K7/K2)/K19 = |
| Step 4 | K4/K1/K19+K11/K9/K1/K19+K5/K1/K19+ <br> K6/K2/K19+K13/K10/K2/K19+K15/K10/K2/K19+K7/K2/K19 = |
| Step 5 | FE-(depmap K4/K1/K19)-> <br> KP-(topmap p211:K11/K9/K1/K19:p212)-> <br> KQ-(depmap K5/K1/K19)-> <br> FF-(depmap K6/K2/K19)-> <br> KQ-(topmap p213:K13/K10/K2/K19:p214)-> <br> KR-(topmap p215: K15/K10/K2/K19:p216)-> <br> KS-(depmap K7/K2/K19)->FG |

FIG. 12J

| EDGE-NAME | SWITCHING-IDENTIFIER |
|---|---|
| K11 | SRC p211, DST p212 |
| K12 | SRC p212, DST p211 |
| K13 | SRC p213, DST p214 |
| K14 | SRC p214, DST p213 |
| K15 | SRC p215, DST p216 |
| K16 | SRC p216, DST p215 |
| K17 | SRC p217, DST p218 |
| K18 | SRC p218, DST p217 |
| K19 | SRC FE, DST FG |

FIG. 12K

| NODE | INPUT PORT | OUTPUT PORT | INCOMING SET OF EDGE-RELATIONSHIPS | OUTGOING SET OF EDGE-RELATIONSHIPS |
|---|---|---|---|---|
| KP | NONE | p211 | NONE | K11 (SRC p211, DST p212) / K19 (SRC FE, DST FG) |
| KQ | p212 | p213 | K11 (SRC p211, DST p212) / K19 (SRC FE, DST FG) | K13 (SRC p213, DST p214) / K19 (SRC FE, DST FG) |
| KR | p214 | p215 | K13 (SRC p213, DST p214) / K19 (SRC FE, DST FG) | K15 (SRC p215, DST p216) / K19 (SRC FE, DST FG) |
| KS | p216 | NONE | K15 (SRC p215, DST p216) / K19 (SRC FE, DST FG) | NONE |

FIG. 12L

```
K4 = FE-(depmap)->KP
K5 = ?X2-(depmap)->FF
K6 = FF-(depmap)->?X2
K7 = ?X3-(depmap)->FG
K8 = FG-(depmap)->?X3
```

FIG. 13C

| Step 1 | topmap K1 = K4/K1+?K9[toppath]/K1+K5/K1 = |
|---|---|
| Step 2 | FE-(depmap K4/K1)-> KP-?K9[toppath]/K1->?X2-(depmap K5/K1)->FF |

FIG. 13D

| PHYSICAL ENTITIES OF TOPMAP K1 | KP-?K9[toppath]/K1->?X2 |
|---|---|
| PHYSICAL ENTITIES OF TOPMAP K2 | ?X2-?K10[toppath]/K2->?X3 |
| SEARCH STATEMENT | (KP-?K9[toppath]/K1->?X2) AND (?X2-?K10[toppath]/K2->?X3) |

FIG. 13E topmap K21 = K6/K21+?K23[toppath]/K21+K3/K21
topmap K22 = K8/K22+?K24[toppath]/K22+K5/K22

FIG. 14C

| Step 1 | topmap K21 = K6/K21+?K23[toppath]/K21+K3/K21 = |
|---|---|
| Step 2 | FF-(depmap K6/K21)-><br>?X2-?K23[toppath]/K21->?X1-(depmap K3/K21)->FE |

FIG. 14D

| Step 1 | topmap K22 = K8/K22+?K24[toppath]/K22+K5/K22 = |
|---|---|
| Step 2 | FG-(depmap K8/K22)-><br>?X3-?K24[toppath]/K22->?X2-(depmap K5/K22)->FF |

FIG. 14E

| PHYSICAL ENTITIES OF TOPMAP K1 | ?X1-?K9[toppath]/K1->?X2 |
|---|---|
| PHYSICAL ENTITIES OF TOPMAP K2 | ?X2-?K10[toppath]/K2->?X3 |
| PHYSICAL ENTITIES OF TOPMAP K21 | ?X2-?K23[toppath]/K21->?X1 |
| PHYSICAL ENTITIES OF TOPMAP K22 | ?X3-?K24[toppath]/K22->?X2 |
| SEARCH STATEMENT | (?X1-?K9[toppath]/K1->?X2) AND (?X2-?K10[toppath]/K2->?X3) AND (?X2-?K23[toppath]/K21->?X1) AND (?X3-?K24[toppath]/K22->?X2) |

FIG. 14F

K3 = ?X1-(depmap)->FE
K4 = FE-(depmap)->?X1
K5 = ?X2-(depmap)->FF
K6 = FF-(depmap)->?X2
K7 = ?X3-(depmap)->FG
K8 = FG-(depmap)->?X3
K28 = ?X4-(depmap)->FH
K29 = FH-(depmap)->?X4
K30 = ?X5-(depmap)->FJ
K31 = FJ-(depmap)->?X5

FIG. 15C topmap K1 = K4/K1+?K9[toppath]/K1+K5/K1
topmap K2 = K6/K2+?K10[toppath]/K2+K7/K2
laymap K25 = K29/K25+?K32[laymap]/K25+K3/K25
laymap K26 = K8/K26+?K33[laymap]/K26+K30/K26
toppath K27 = K1/K27+K2/K27
topmap K34 = K25/K34+K27/K34+K26/K34
toppath K35 = K34/K35

FIG. 15D

| Step 1 | laymap K25 = K29/K25+?K32[laymap]/K25+K3/K25 = |
|---|---|
| Step 2 | FH-(depmap K29/K25)-><br>?X4-?K32[laymap]/K25->?X1-(depmap K3/K25)->FE |

FIG. 15E

| Step 1 | laymap K26 = K8/K26+?K33[laymap]/K26+K30/K26 |
|---|---|
| Step 2 | FG-(depmap K8/K26)-><br>?X3-?K33[laymap]/K26->?X5-(depmap K30/K26)->FJ |

FIG. 15F

| PHYSICAL ENTITIES OF TOPMAP K1 | ?X1-?K9[toppath]/K1->?X2 |
|---|---|
| PHYSICAL ENTITIES OF TOPMAP K2 | ?X2-?K10[toppath]/K2->?X3 |
| PHYSICAL ENTITIES OF LAYMAP K25 | ?X4-?K32[laymap]/K25->?X1 |
| PHYSICAL ENTITIES OF LAYMAP K26 | ?X3-?K33[laymap]/K26->?X5 |
| SEARCH STATEMENT | (?X1-?K9[toppath]/K1->?X2)<br>AND<br>(?X2-?K10[toppath]/K2->?X3)<br>AND<br>(?X4-?K32[laymap]/K25->?X1)<br>AND<br>(?X3-?K33[laymap]/K26->?X5) |

FIG. 15G

K41 = KE-(topmap p211::p212)->KF
K42 = KF-(topmap p212::p211)->KE
K43 = KF-(topmap p213::p214)->KG
K44 = KG-(topmap p214::p213)->KF
K45 = KG-(topmap p215::p216)->KH
K46 = KH-(topmap p216::p215)->KG
K47 = KG-(topmap p217::p218)->KJ
K48 = KJ-(topmap p218::p217)->KG K49 = KE-(laymap p221::p222)->KK
K50 = KK-(laymap p222::p221)->KE
K51 = KH-(laymap p223::p224)->KL
K52 = KL-(laymap p224::p223)->KH
K53 = KJ-(laymap p225::p226)->KM
K54 = KM-(laymap p226::p225)->KJ

FIG. 16C

| UNKNOWN PHYSICAL NODE | PHYSICAL NODE |
|---|---|
| ?X1 | KE |
| ?X2 | KG |
| ?X3 | KJ |
| ?X4 | KK |
| ?X5 | KM |

FIG. 16D

| UNKNOWN PHYSICAL TOPOLOGY-PATH | PHYSICAL TOPOLOGY-PATH |
|---|---|
| ?K9[toppath] | toppath K9=K41/K9+K43/K9 |
| ?K10[toppath] | toppath K10=K47/K10 |

FIG. 16E

| UNKNOWN PHYSICAL LAYER-MAPPING | PHYSICAL LAYER-MAPPING |
|---|---|
| ?K32[laymap] | laymap K50 |
| ?K33[laymap] | laymap K53 |

FIG. 16F

```
K3 = KE-(depmap)->FE
K4 = FE-(depmap)->KE
K5 = KG-(depmap)->FF
K6 = FF-(depmap)->KG
K7 = KJ-(depmap)->FG
K8 = FG-(depmap)->KJ
K28 = KK-(depmap)->FH
K29 = FH-(depmap)->KK
K30 = KM-(depmap)->FJ
K31 = FJ-(depmap)->KM
```

FIG. 16G

```
topmap K1 = K4/K1+K9/K1+K5/K1
topmap K2 = K6/K2+K10/K2+K7/K2
laymap K25 = K29/K25+K50/K25+K3/K25
laymap K26 = K8/K26+K53/K26+K30/K26
```

FIG. 16H

| Step 1 | toppath K35 = K34/K35 = |
|---|---|
| Step 2 | K25/K34/K35+K27/~~K34/K35~~+K26/K34/K35 = |
| Step 3 | K29/K25/K34/K35+K50/K25/K34/K35+K3/K25/K34/K35+ K1/K27+K2/K27+K8/K26/K34/K35+K53/K26/K34/K35+ K30/K26/K34/K35 = |
| Step 4 | K29/K25/K34/K35+K50/K25/K34/K35+K3/K25/K34/K35+ K4/K1/K27+K9/K1/K27+K5/K1/K27+K6/K2/K27+K10/K2/K27+ K7/K2/K27+K8/K26/K34/K35+K53/K26/K34/K35+ K30/K26/K34/K35 = |
| Step 5 | K29/K25/K34/K35+K50/K25/K34/K35+K3/K25/K34/K35+ K4/K1/K27+K41/K9/K1/K27+K43/K9/K1/K27+K5/K1/K27+ K6/K2/K27+K47/K10/K2/K27+K7/K2/K27+K8/K26/K34/K35+ K53/K26/K34/K35+K30/K26/K34/K35 = |
| Step 6 | FH-(depmap K29/K25/K34/K35)-> KK-(laymap p222: K50/K25/K34/K35:p221)-> KE-(depmap K3/K25/K34/K35)-> FE-(depmap K4/K1/K27)-> KE-(topmap p211: K41/K9/K1/K27:p212)-> KF-(topmap p213: K43/K9/K1/K27:p214)-> KG-(depmap K5/K1/K27)-> FF-(depmap K6/K2/K27)-> KG-(topmap p217: K47/K10/K2/K27:p218)-> KJ-(depmap K7/K2/K27)-> FG-(depmap K8/K26/K34/K35)-> KJ-(laymap p225: K53/K26/K34/K35:p226)-> KM-(depmap K30/K26/K34/K35)->FJ |

FIG. 17A

| NODE | INPUT PORT | OUTPUT PORT | INCOMING SET OF EDGE-RELATIONSHIPS | OUTGOING SET OF EDGE-RELATIONSHIPS |
|---|---|---|---|---|
| KK | NONE | p222 | NONE | K50/K25/K34/K35 |
| KE | p221 | p211 | K50/K25/K34/K35 | K41/K9/K1/K27 |
| KF | p212 | p213 | K41/K9/K1/K27 | K43/K9/K1/K27 |
| KG | p214 | p217 | K43/K9/K1/K27 | K47/K10/K2/K27 |
| KJ | p218 | p225 | K47/K10/K2/K27 | K53/K26/K34/K35 |
| KM | p226 | NONE | K53/K26/K34/K35 | NONE |

FIG. 17B

| EDGE-NAME | SWITCHING-IDENTIFIER |
|---|---|
| K41 | SRC p211, DST p212 |
| K42 | SRC p212, DST p211 |
| K43 | SRC p213, DST p214 |
| K44 | SRC p214, DST p213 |
| K45 | SRC p215, DST p216 |
| K46 | SRC p216, DST p215 |
| K47 | SRC p217, DST p218 |
| K48 | SRC p218, DST p217 |
| K27 | SOURCE 1:2:3:4:11:11:11:10, DESTINATION 1:2:3:5:11:11:11:13, FLOW-LABEL 100 |
| K35 | TCP, SOURCE PORT 80, DESTINATION PORT 80 |

FIG. 17C

| EQUIPMENT | NODE | INPUT PORT | OUTPUT PORT | INCOMING SET OF EDGE-RELATIONSHIPS | OUTGOING SET OF EDGE-RELATIONSHIPS |
|---|---|---|---|---|---|
| FIRST COMPUTING EQUIPMENT | KK | NONE | p222 | NONE | K35 (TCP, NONE SRC PORT 80, DST PORT 80) |
| | KE | p221 | p211 | NONE | K41 (SRC p211, DST p212) / K27 (SRC 1:2:3:4:11:11:11:10, DST 1:2:3:5:11:11:11:13, FLOW-LABEL 100) |
| FIRST PACKET FORWARDING SYSTEM | KF | p212 | p213 | K41 (SRC p211, DST p212) / K27 (SRC 1:2:3:4:11:11:11:10, DST 1:2:3:5:11:11:11:13, FLOW-LABEL 100) | K43 (SRC p213, DST p214) / K27 (SRC 1:2:3:4:11:11:11:10, DST 1:2:3:5:11:11:11:13, FLOW-LABEL 100) |
| SECOND PACKET FORWARDING SYSTEM | KG | p214 | p217 | K43 (SRC p213, DST p214) / K27 (SRC 1:2:3:4:11:11:11:10, DST 1:2:3:5:11:11:11:13, FLOW-LABEL 100) | K47 (SRC p217, DST p218) / K27 (SRC 1:2:3:4:11:11:11:10, DST 1:2:3:5:11:11:11:13, FLOW-LABEL 100) |
| | KJ | p218 | p225 | K47 (SRC p217, DST p218) / K27 (SRC 1:2:3:4:11:11:11:10, DST 1:2:3:5:11:11:11:13, FLOW-LABEL 100) | NONE |
| THIRD COMPUTING EQUIPMENT | KM | p226 | NONE | K35 (TCP, SRC PORT 80, DST PORT 80) | NONE |

FIG.17D

| EDGE-NAME | SWITCHING-IDENTIFIER |
|---|---|
| K41 | SRC p211, DST p212 |
| K42 | SRC p212, DST p211 |
| K43 | SRC p213, DST p214 |
| K44 | SRC p214, DST p213 |
| K45 | SRC p215, DST p216 |
| K46 | SRC p216, DST p215 |
| K47 | SRC p217, DST p218 |
| K48 | SRC p218, DST p217 |
| K27 | SOURCE 100.100.100.100, DESTINATION 100.100.100.200, TCP, SRC PORT 80, DST PORT 80 |
| K35 | HTTP REQUEST 1 |

| EQUIPMENT | NODE | INPUT PORT | OUTPUT PORT | INCOMING SET OF EDGE-RELATIONSHIPS | OUTGOING SET OF EDGE-RELATIONSHIPS |
|---|---|---|---|---|---|
| FIRST COMPUTING EQUIPMENT | KK | NONE | p222 | NONE | K35 (HTTP REQUEST 1) |
| | KE | p221 | p211 | NONE | K41 (SRC p211, DST p212) / K27 (SRC 100.100.100.100, DST 100.100.100.200,TCP, SRC PORT 80, DST PORT 80) |
| FIRST PACKET FORWARDING SYSTEM | KF | p212 | p213 | K41 (SRC p211, DST p212) / K27 (SRC 100.100.100.100, DST 100.100.100.200,TCP, SRC PORT 80, DST PORT 80) | K43 (SRC p213, DST p214) / K27 (SRC 100.100.100.100, DST 100.100.100.200,TCP, SRC PORT 80, DST PORT 80) |
| SECOND PACKET FORWARDING SYSTEM | KG | p214 | p217 | K43 (SRC p213, DST p214) / K27 (SRC 100.100.100.100, DST 100.100.100.200,TCP, SRC PORT 80, DST PORT 80) | K47 (SRC p217, DST p218) / K27 (SRC 100.100.100.100, DST 100.100.100.200,TCP, SRC PORT 80, DST PORT 80) |
| THIRD COMPUTING EQUIPMENT | KJ | p218 | p225 | K47 (SRC p217, DST p218) / K27 (SRC 100.100.100.100, DST 100.100.100.200,TCP, SRC PORT 80, DST PORT 80) | NONE |
| | KM | p226 | NONE | K35 (HTTP REQUEST 1) | NONE |

FIG. 17G

```
K55 = KP-(laymapdec)->KP
K56 = KP-(laymapinc)->KP
K57 = KS-(laymapdec)->KS
K58 = KS-(laymapinc)->KS
K59 = KT-(laymapdec)->KT
K60 = KT-(laymapinc)->KT
```

FIG. 18B

| UNKNOWN PHYSICAL NODE | PHYSICAL NODE |
|---|---|
| ?X1 | KP |
| ?X2 | KR |
| ?X3 | KT |

FIG. 18C

| UNKNOWN PHYSICAL TOPOLOGY-PATH | PHYSICAL TOPOLOGY-PATH |
|---|---|
| ?K9[toppath] | toppath K9=K11/K9+K13/K9 |
| ?K10[toppath] | toppath K10=K17/K10 |

FIG. 18D

| UNKNOWN PHYSICAL LAYER-MAPPING | PHYSICAL LAYER-MAPPING |
|---|---|
| ?K32[laymapdec] | laymapdec K55 |
| ?K33[laymapinc] | laymapinc K60 |

FIG. 18E

```
K3 = ?X1-(depmap)->FE
K4 = FE-(depmap)->?X1
K5 = ?X2-(depmap)->FF
K6 = FF-(depmap)->?X2
K7 = ?X3-(depmap)->FG
K8 = FG-(depmap)->?X3
K37 = FH-(depmap)->?X1
K38 = ?X3-(depmap)->FJ
```

FIG. 19B

```
topmap K1 = K4/K1+?K9[toppath]/K1+K5/K1
topmap K2 = K6/K2+?K10[toppath]/K2+K7/K2
laymapdec K25 = K37/K25+?K39[laymapdec]/K25+K3/K25
laymapinc K26 = K8/K26+?K40[laymapinc]/K26+K38/K26
```

FIG. 19C

| Step 1 | laymapdec K25 = K37/K25+?K39[laymapdec]/K25+K3/K25 = |
|---|---|
| Step 2 | FH-(depmap K37/K25)-> ?X1-?K39[laymapdec]/K25->?X1-(depmap K3/K25)->FE |

FIG. 19D

| Step 1 | laymapinc K26 = K8/K26+?K40[laymapinc]/K26+K38/K26 = |
|---|---|
| Step 2 | FG-(depmap K8/K26)-> ?X3-?K40[laymapinc]/K26->?X3-(depmap K38/K26)->FJ |

FIG. 19E

```
(?X1-?K9[toppath]/K1->?X2)
AND
(?X2-?K10[toppath]/K2->?X3)
AND
(?X1-?K39[laymapdec]/K25->?X1)
AND
(?X3-?K40[laymapinc]/K26->?X3)
```

FIG. 19F

COMPILER FOR AND METHOD OF SOFTWARE DEFINED NETWORKING, STORAGE AND COMPUTE DETERMINING PHYSICAL AND VIRTUAL RESOURCES

TECHNICAL FIELD

The present invention relates to communication networks, storage equipment and computing equipment. Such networks may be packet-switched or circuit-switched. In particular, the present invention relates to a method for configuring packet forwarding devices, computing equipment, storage equipment, virtual switches, virtual machines and containers in physical and virtual networks.

BACKGROUND INFORMATION

Recent developments in the field of Packet Switched Networking (PSN) and Computing have lead to the notion of Software Defined Networking (SDN). Within the context of this invention we consider Software Defined Networking as the capability to define a network in a high-level specification (such as, but not limited to, a high-level programming or scripting language) and through an automated process instruct the appropriate physical and virtual networking, storage and computing resources in accordance with this specification.

Such recent developments can be found in WO2010115060 "Method and apparatus for implementing and managing virtual switches" and WO2012082988 "Methods for configuring network switches".

Recently, it has become possible to instruct packet forwarding devices with the desired forwarding behavior using an open interface through a standardized protocol. The current leading protocol for this is OpenFlow, but the present invention is not limited or bound to the OpenFlow protocol, but generic in nature and could work with future protocols that provide programmatic access to forwarding table(s) of packet forwarding devices. The forwarding table(s) contains the information against which information from the incoming packet and input port is matched, providing the desired output port(s) to forward the packet out to.

We will refer to 'packet forwarding device' as 'switch' throughout the remainder of this document, referencing to any device performing packet forwarding, not limited to Open Systems Interconnection (OSI) Layer 2. Besides the forwarding functionality a switch might provide additional operation(s) on the packet, such as but not limited to monitoring and/or recording and/or buffering and/or modifying of the incoming packet header and/or payload before forwarding the packet to one or more of it's output ports. The switch might also not forward (block) the packet. These type of devices performing additional operation(s) on the packet other than packet switching are typically referred to as middleboxes and are included in the definition of a switch used in this document.

Recently, interest has grown to perform switching and middlebox functions in virtual machines running on virtualized physical servers or in containers, typically referred to as Network Functions Virtualization (NFV), to allow for greater flexibility and agility in deploying network functionality and to potentially reduce cost. An SDN Compiler, as described and claimed in the present invention, should have the capability to create forwarding instructions for these virtual machines or containers.

The distribution of these forwarding tables to switches is typically done by a so-called 'SDN controller'. The SDN controller is functionally a central place (implementations are typically redundant) at which the centrally specified forwarding tables are distributed among the typically geographically distributed switches in the network.

Further, the SDN controller provides at its northbound interface a centralized view of the physical and/or virtual network resources, e.g. switches in the network, their topology, status of individual links.

The above outlines an important difference between SDN and traditional networking: the forwarding tables for the switches in the network are calculated in a centralized manner, as opposed to the distributed manner traditional networks operate which is based on a large variety of networking control protocols. This allows the user of the SDN network (user in the broadest sense: e.g. but not limited to network operator, IT operator, operations system, application, other network, other SDN Compiler) to centrally specify the desired behavior of the network, greatly enhancing the control over the network. Further, with the introduction of the Cloud Computing, a tight integration between and centralized control over computing, storage and networking resources has become a mandatory requirement.

Currently, the networking industry is focused on programmatic access to forwarding table(s) of packet forwarding devices. In order to create a tight integration between networking, storage and computing, however, there is a need to provide instructions to physical hosts, virtual hosts and physical NICs as well. E.g. a host could be instructed over which interface to send a packet to a particular destination node. E.g. a host could be instructed which packets to accept and which to drop. E.g. a NIC could be instructed which packets to forward and which to drop. This requires a holistic approach to Software Defined Networking including physical and virtual networking, storage and computing resources.

In the field of computing it has become common practice to virtualize physical servers into one or more virtual machines, resulting in aforementioned Cloud Computing. The process of server virtualization creates a logical abstraction of physical computing resources. Given today's tight integration between computing and networking a need has arisen for logical abstraction of physical and virtual networking resources.

US 2013/058215 discloses a virtualizer for managing a plurality of managed switching elements that forward data through a network. The virtualizer comprises a first set of tables for storing input logical forwarding plane data and a second set of tables for storing output physical control plane data. It also includes a table mapping engine for mapping the input logical forwarding plane data in the first set of tables to output physical control plane data in the second set of tables by performing a set of database join operations on the input logical forwarding plane data in the first set of tables. In some embodiments, the physical control plane data is subsequently translated into physical forwarding behaviors that direct the forwarding of data by the managed switching elements. In this prior art document a managed switch converts this physical control plane data to physical forwarding plane data that specifies the forwarding behavior of the managed switch (cf. [0197]), having the disadvantage of placing a requirement on physical nodes to perform this conversion and using resources in said physical nodes. The prior art presented in US2013/044641 creates an overlay virtual network, in terminology of this application a logical network, based on tunnels in an underlay, typically IP-based network. This approach has the disadvantage of operating both the virtual overlay network and the underlay network complicating operations. Moreover, the prior art according to US2013/044641 models a virtual node, in terminology of this application a logical node, after a physical node, having the disadvantage of continuing to configure and manage networks based on network element operations rather than network services.

SUMMARY OF THE INVENTION

The present patent-application claims priority from EP14185824.1 which is not pre-published but filed on 22 Sep. 2014.

The present patent-application claims priority from EP14185828.2 which is not pre-published but filed on 22 Sep. 2014.

Not pre-published patent application PCT/EP2014/055640 of the same inventor as the present application describes a method and a compiler that addresses the above mentioned tight integration between computing and networking, and need for logical abstraction of physical and virtual networking resources.

Thus, PCT/EP2014/055640 describes a method for translating or compiling a high-level network specification into a set of instructions for the appropriate physical and/or virtual networking and/or computing resources. These instructions state which actions to perform on incoming packets such as forwarding, receiving, dropping incoming packets as well as how to send packets from a source node.

The invention described in PCT/EP2014/055640 also relates to a SDN compiler arranged to perform such a method.

In order to accomplish this task, the SDN compiler retains a model of each logical network that is defined through a high-level network specification. Also, the SDN compiler retains a model of physical and/or virtual networking and/or computing resources. Both models as well as their relationship are represented in a set of relations, such as matrices. The logical network comprises logical nodes. The forwarding path between each logical source and logical destination node is determined through operations performed on these matrices resulting in a list of Points-of-Attachments (e.g. but not limited to an Ethernet Media Access Control (MAC) Address) of physical and virtual resources. From these forwarding paths stored in matrices the above mentioned appropriate instructions are derived. The above approach allows for definition and creation of multiple simultaneous logical networks on the same physical and virtual resources.

The method described in PCT/EP2014/055640 can be applied to currently available OpenFlow-based products, but is not limited to OpenFlow and could work with future protocols that provide programmatic access to forwarding table(s) of packet forwarding devices. The described method can be applied to currently widely used identifiers of Point-of-Attachment, such as Ethernet MAC Addresses. The described method can be applied to IPv4 and IPv6 naming and packet formats.

The invention described in PCT/EP2014/055640 does not require any conversion in a physical node, creating forwarding entries that can directly be used for making forwarding decisions on incoming packets, allowing for less complex forwarding hardware and software forwarding implementations. The described invention does not require an underlay network, simplifying operations, by compiling a logical network using a logical namespace to physical networking resources. The described invention uses a network abstraction based on a directed graph allowing a user of an SDN Compiler to specify network services based on declarative request, and an SDN Compiler to implement and maintain said network services, simplifying operations and allowing for specifying, implementing and maintaining complex network services.

In a cloud-based IT (Information Technology) environment it is an objective to deploy logical storage and logical compute, as well as applications built from logical storage and logical compute against physical and/or virtual resources in an optimum way and on demand. Currently, networking is a bottleneck in this process, while ideally a logical network would be deployed against physical and/or virtual resources in an optimum way and on demand and in conjunction with logical storage and logical compute. PCT/EP2014/055640 describes a method for translating or compiling a high-level network specification into a set of instructions for the appropriate physical and/or virtual networking and/or computing resources. The method described in PCT/EP2014/055640 can be applied to an overall network in which a logical node at a highest layer denotes logical storage or logical compute and in which a requested-topology-level-path denotes a logical message-stream.

It is an object of the present invention to compile logical compute, storage and network against physical and/or virtual resources in an optimum way, thereby selecting physical and/or virtual resources based on requirements of logical compute, storage and network.

To that end, the present invention provides a method as claimed in claim 1.

The SDN Compiler method described in PCT/EP2014/055640 is extended to determine depth-mappings, relating nodes at different depths, by an SDN Compiler based on requirements of logical nodes, logical-topology-mappings, and optionally logical layer-mappings, specified by a user of an SDN Compiler. Said extension allows a user of an SDN Compiler to specify logical nodes, requirements of logical nodes, logical topology-mappings and requirements of logical-topology-mappings, and optionally logical layer-mappings and requirements of logical layer-mappings and have said SDN Compiler determine physical and/or virtual resources, comprising of physical nodes and physical links, against which said logical specification can be compiled, thereby determining the relationships between logical nodes and physical nodes as represented by depth-mappings, physical topology-paths, and optionally physical layer-mappings.

BRIEF DESCRIPTION OF DRAWINGS

The invention will be explained in detail with reference to some drawings that are only intended to show embodiments of the invention and not to limit the scope. The scope of the invention is defined in the annexed claims and by its technical equivalents. I.e., a person skilled in the art will understand that features, components, elements, etc. explicitly used to explain the invention can be substituted by technical equivalents unless otherwise stated. Moreover, separate features of different embodiments can be combined, even if not explicitly shown in the drawings or explained in the specification, unless such combination is physically impossible.

The drawings show:

FIG. 2A is a diagram showing a functional representation of physical nodes BA, BB, BC and BD FIG. 2B is a diagram showing a functional representation of physical network BAA, consisting of physical nodes BA, BB, BC and BD interconnected by links.

FIG. 2C is a diagram showing a functional representation of physical network BAA, consisting of physical nodes BA, BB, BC and BD interconnected by physical links, of which the interconnection between a physical node and a physical link is denoted by a physical Point-of-Attachment (PoA), p101 through p108, of which the cost of the physical link in each direction of the physical link is shown FIG. 2D is a diagram showing a weighted directed graph representation of physical network BAA, consisting of vertices (nodes) BA, BB, BC and BD interconnected by edges, of which the interconnection between a vertex and an edge is denoted by a physical Point-of-Attachment (PoA), p101 through p108, of which the cost of each edge is shown

FIG. 3D is a diagram showing networks KA, KB, KC, KD, LA, LB, LC, LD at level h and their mapping relationships as well as networks KAA, KCC, LAA, LCC at level (h+1). Network KAA at (d,n,h+1) contains networks KA and KB both at (d,n,h). Network KCC at (d,n+1,h+1) contains networks KC and KD both at (d,n+1,h). Network LAA at (d+1,n,h+1) contains networks LA and LB both at (d+1,n,h). Network LCC at (d+1,n+1,h+1) contains networks LC and LD both at (d+1,n+1,h). Diagonal layer-mappings between nodes KA and KD, KB and KC, LA and LD, LB and LC which where shown in FIG. 3C have been omitted in this figure to simplify the figure. Diagonal depth-mappings between nodes KA and LA, KB and LA, KC and LD, KD and LC, KA and LC, KC and LA, KB and LD, KD and LB which where shown in FIG. 3C have been omitted in this figure to simplify the figure.

FIG. 4A also shows the topology-mappings between networks at (d, n, h).

FIG. 4B also shows the level-mappings between networks at (d, n) as well as the topology-mappings between networks at (d, n, h).

FIG. 6A is a diagram showing the notation used for a first mapping of a first mapping-type with a first mapping-name from a first network to a second network.

FIG. 6B is a diagram showing the notation used for a second mapping of a second mapping-type with a second mapping-name from a second network to a third network.

FIG. 6C is a diagram showing the notation used for a third edge of a third edge-type with a third edge-name being a concatenation of a first edge with a first edge-name and a second edge with a second edge-name.

FIG. 6D is a diagram showing the notation used for a third edge of a third edge-type with a third edge-name being a concatenation of a first mapping with a first set of edge-relationships and a second mapping with a second set of edge-relationships.

FIG. 7A is a diagram showing topology-mappings L5 and L6, layer-mappings L7, L8, L9 and L10 and depth-mappings L12, L13, L15, L16, L17, L18, L24 and L25.

FIG. 7B is a diagram showing topology-mappings L14 and L22, layer-mappings L19 and L20 and topology-paths L11, L21 and L23.

FIG. 7C is a diagram showing in step 1 a topology-path named L23 from network LC to network LD and in step 6 the recursive-path of the topology-path named L23 from network LC to network LD, step 2 through step 5 being intermediate steps of the calculation.

FIG. 8 also shows physical networks QA, QB, QC, QD, QE and QF at (d=0, n=0, h=0). FIG. 8 also shows the topology-mappings, depth-mapping, level-mappings and topology-path between networks, as well as the name of each topology-mapping, level-mapping and topology-path and edge-relationships.

FIG. 9 also shows a User and SDN Controller and an SDN Node and message flows 51 through 61.

FIG. 11A also shows a topology-mapping from logical node FE to logical node FF and a topology-mapping from logical node FF to logical node FG, represented as directed edges in a graph.

FIG. 11B also shows topology-mappings named K1 and K2, depth-mappings named K3 through K8, and unknown physical topology-paths named ?K9 and K10, represented as directed edges in a graph.

In FIG. 11B questions marks indicate unknown physical nodes and unknown physical topology-paths.

FIG. 11C is a diagram showing depth-mappings named K3 through K8, per the notation of FIG. 6A.

FIG. 11D is a diagram showing topology-mappings K1 and K2, per the notation of FIG. 6C. In FIG. 11D '?K9 [toppath]' denotes that K9 is an unknown topology-path, and '?K10[toppath]' denotes that K10 is an unknown topology-path.

FIG. 11E is a diagram showing the topology-mapping named K1.

FIG. 11F is a diagram showing the topology-mapping named K2.

FIG. 11G is a diagram showing physical entities of the topology-mapping named K1, physical entities of the topology-mapping named K2, and a search statement.

FIG. 11H is a diagram showing how requirements of a logical topology-mapping are related to requirements of an unknown physical topology-path.

FIG. 11I is a diagram showing how requirements of a logical node are related to requirements of an unknown physical node.

FIG. 12A also shows Point-of-Attachment (PoA) p211 through p218.

FIG. 12B also shows topology-mappings named K11 through K18, represented as directed edges in a graph.

FIG. 12C is a diagram showing topology-mappings named K11 through K18, per the notation of FIG. 6A.

FIG. 12D is a diagram showing how an unknown physical node is related to a physical node.

FIG. 12E is a diagram showing how an unknown physical topology-path is related to a physical topology-path.

FIG. 12F also shows topology-mappings named K1, K2, K11 through K18, depth-mappings named K3 through K8, physical topology-paths named K9 and K10, and a logical topology-path named K19, represented as directed edges in a graph.

FIG. 12G is a diagram showing depth-mappings named K3 through K8, per the notation of FIG. 6A.

FIG. 12H s a diagram showing topology-mappings K1 and K2, per the notation of FIG. 6C.

FIG. 12I is a diagram showing topology-path K19, per the notation of FIG. 6C.

FIG. 12J is a diagram showing in step 1 a topology-path named K19 from node FE to node FG and in step 5 the recursive-path of the topology-path named K19, step 2 through step 4 being intermediate steps of the calculation.

FIG. 12K is a diagram showing switching-identifiers for the edges named K11 through K19.

FIG. 12L is a diagram showing for networks at (d=0, h=0), being physical nodes KP, KQ, KR, KS and KT, in the recursive-path calculated from the requested topology-path named K19 forwarding instructions comprising an input port, an output port, incoming set of edge-relationships and switching-identifiers of each edge in said incoming set of edge-relationships, and outgoing set of edge-relationships and switching-identifiers of each edge in said outgoing set of edge-relationships.

FIG. 13A also shows a topology-mapping from logical node FE to logical node FF, a topology-mapping from logical node FF to logical node FG, and a depth-mapping from logical node FE to physical node KP represented as directed edges in a graph.

FIG. 13B also shows topology-mappings named K1 and K2, depth-mappings named K4 through K8, and unknown physical topology-paths named ?K9 and K10, represented as directed edges in a graph. In FIG. 13B questions marks indicate unknown physical nodes and unknown physical topology-paths.

FIG. 13C is a diagram showing depth-mappings named K4 through K8, per the notation of FIG. 6A.

FIG. 13D is a diagram showing a topology-mapping named K1.

FIG. 13E is a diagram showing physical entities of the topology-mapping named K1, physical entities of the topology-mapping named K2, and a search statement.

FIG. 14A also shows a topology-mapping from logical node FE to logical node FF, a topology-mapping from logical node FF to logical node FE, and a topology-mapping from logical node FF to logical node FG, a topology-mapping from logical node FG to logical node FF, represented as directed edges in a graph.

FIG. 14B also shows topology-mappings named K1, K2, K21 and K22, depth-mappings named K3 through K8, and unknown physical topology-paths named ?K9, K10, K23 and K24, represented as directed edges in a graph. In FIG. 14B questions marks indicate unknown physical nodes and unknown physical topology-paths.

FIG. 14C is a diagram showing topology-mappings K21 and K22, per the notation of FIG. 6C. In FIG. 14C '?K23[toppath]' denotes that K23 is an unknown topology-path, and '?K24[toppath]' denotes that K24 is an unknown topology-path.

FIG. 14D is a diagram showing a topology-mapping named K21.

FIG. 14E is a diagram showing a topology-mapping named K22.

FIG. 14F is a diagram showing physical entities of the topology-mapping named K1, physical entities of the topology-mapping named K2, physical entities of the topology-mapping named K21, physical entities of the topology-mapping named K22, and a search statement.

FIG. 15B also shows topology-mappings named K1 and K2, depth-mappings named K3 through K8 and K28 through K31, logical layer-mappings named K25 and K26, unknown physical layer-mappings named ?K32 and ?K33, and unknown physical topology-paths named ?K9 and K10, represented as directed edges in a graph. In FIG. 15B questions marks indicate unknown physical nodes, unknown physical layer-mappings and unknown physical topology-paths.

FIG. 15C is a diagram showing depth-mappings named K3 through K8, and K28 through K31 per the notation of FIG. 6A.

FIG. 15D is a diagram showing topology-mappings K1, K2 and K34, layer-mappings K25 and K26, and topology-paths K27 and K35 per the notation of FIG. 6C. In FIG. 15D '?K9[toppath]' denotes that K9 is an unknown topology-path, '?K10[toppath]' denotes that K10 is an unknown topology-path, '?K32[laymap]' denotes that ?K32 is an unknown layer-mapping, and '?K33[laymap]' denotes that ?K33 is an unknown layer-mapping.

FIG. 15E is a diagram showing a layer-mapping named K25.

FIG. 15F is a diagram showing a layer-mapping named K26.

FIG. 15G is a diagram showing physical entities of the topology-mapping named K1, physical entities of the topology-mapping named K2, physical entities of the layer-mapping named K25, physical entities of the layer-mapping named K26, and a search statement.

FIG. 16A also shows Point-of-Attachment (PoA) p211 through p218 and p221 through p226.

FIG. 16B also shows topology-mappings named K41 through K48 and layer-mappings K49 through K54, represented as directed edges in a graph.

FIG. 16C is a diagram showing topology-mappings named K41 through K48, and layer-mappings named K49 through K54 per the notation of FIG. 6A.

FIG. 16D is a diagram showing how an unknown physical node is related to a physical node.

FIG. 16E is a diagram showing how an unknown physical topology-path is related to a physical topology-path.

FIG. 16F is a diagram showing how an unknown physical layer-mapping is related to a physical layer-mapping.

FIG. 16G is a diagram showing depth-mappings named K3 through K8, and K28 through K31 per the notation of FIG. 6A.

FIG. 16H is a diagram showing topology-mappings K1 and K2, and layer-mappings K25 and K26 per the notation of FIG. 6C.

FIG. 16I also shows topology-mappings named K1, K2, K41 through K48, depth-mappings named K3 through K8 and K28 through K31, layer-mappings named K25, K26 and K49 through K54, and physical topology-paths named K9 and K10, represented as directed edges in a graph.

FIG. 16J also shows topology-mappings named K1, K2, K41 through K48, depth-mappings named K3 through K8 and K28 through K31, layer-mappings named K25, K26 and K49 through K54, and topology-paths named K9, K10, K27 and K35, represented as directed edges in a graph.

FIG. 17A is a diagram showing in step 1 a requested topology-path named K35 and in step 6 the recursive-path of the requested topology-path named K35, step 2 through step 5 being intermediate steps of the calculation.

FIG. 17B is a diagram showing for physical nodes KE, KF, KG, KJ, KK and KM, in the recursive-path calculated from the requested topology-path named K35 forwarding instructions comprising an input port, an output port, incoming set of edge-relationships and outgoing set of edge-relationships.

FIG. 17C is a diagram showing switching-identifiers for the edges named K41 through K48, K27 and K35.

FIG. 17D is a diagram showing for physical nodes KE, KF, KG, KJ, KK and KM, in the recursive-path calculated from the requested topology-path named K35 forwarding instructions comprising an input port, an output port, incoming set of edge-relationships and switching-identifiers of each edge in said incoming set of edge-relationships, and outgoing set of edge-relationships and switching-identifiers of each edge in said outgoing set of edge-relationships.

FIG. 17G is a diagram showing for physical nodes KE, KF, KG, KH, KJ, KK, KL and KM, in the recursive-path calculated from the requested topology-path named K35 forwarding instructions comprising an input port, an output port, incoming set of edge-relationships and switching-identifiers of each edge in said incoming set of edge-relationships, and outgoing set of edge-relationships and switching-identifiers of each edge in said outgoing set of edge-relationships.

FIG. 18B is a diagram layer-mappings named K55 through K60 per the notation of FIG. 6A.

FIG. 18C is a diagram showing how an unknown physical node is related to a physical node.

FIG. 18D is a diagram showing how an unknown physical topology-path is related to a physical topology-path.

FIG. 18E is a diagram showing how an unknown physical layer-mapping is related to a physical layer-mapping.

FIG. 19A also shows topology-mappings named K1 and K2, depth-mappings named K3 through K8, K37 and K38, logical layer-mappings named K25 and K26, unknown physical layer-mappings named ?K39 and ?K40, and unknown physical topology-paths named ?K9 and K10, represented as directed edges in a graph. In FIG. 19A questions marks indicate unknown physical nodes, unknown physical layer-mappings and unknown physical topology-paths.

FIG. 19B is a diagram showing depth-mappings named K3 through K8, K37 and K38 per the notation of FIG. 6A.

FIG. 19C is a diagram showing topology-mappings named K1 and K2, a layer-mapping decreasing in layer named K25, and a layer-mapping increasing in layer named K26, per the notation of FIG. 6C.

FIG. 19D is a diagram showing a layer-mapping named K25.

FIG. 19E is a diagram showing a layer-mapping named K26.

FIG. 19F is a diagram showing a search statement.

DETAILED DESCRIPTION OF THE INVENTION AND PREFERRED EMBODIMENT

Non-pre-published prior art PCT/EP2014/055640 describes a compiler for and method of Software Defined Networking (SDN). Below a summary of the main elements of said method is described. However, it is noted that all features already described in PCT/EP2014/0055640 may also be applied in the present invention. Also combinations with features/examples as described in PCT/EP2014/0055640 which are not explicitly described here, are also possible embodiments within the context of the present invention. So, all passages of PCT/EP2014/0055640 referred to below are incorporated in the present document by way of reference.

Figure 1:
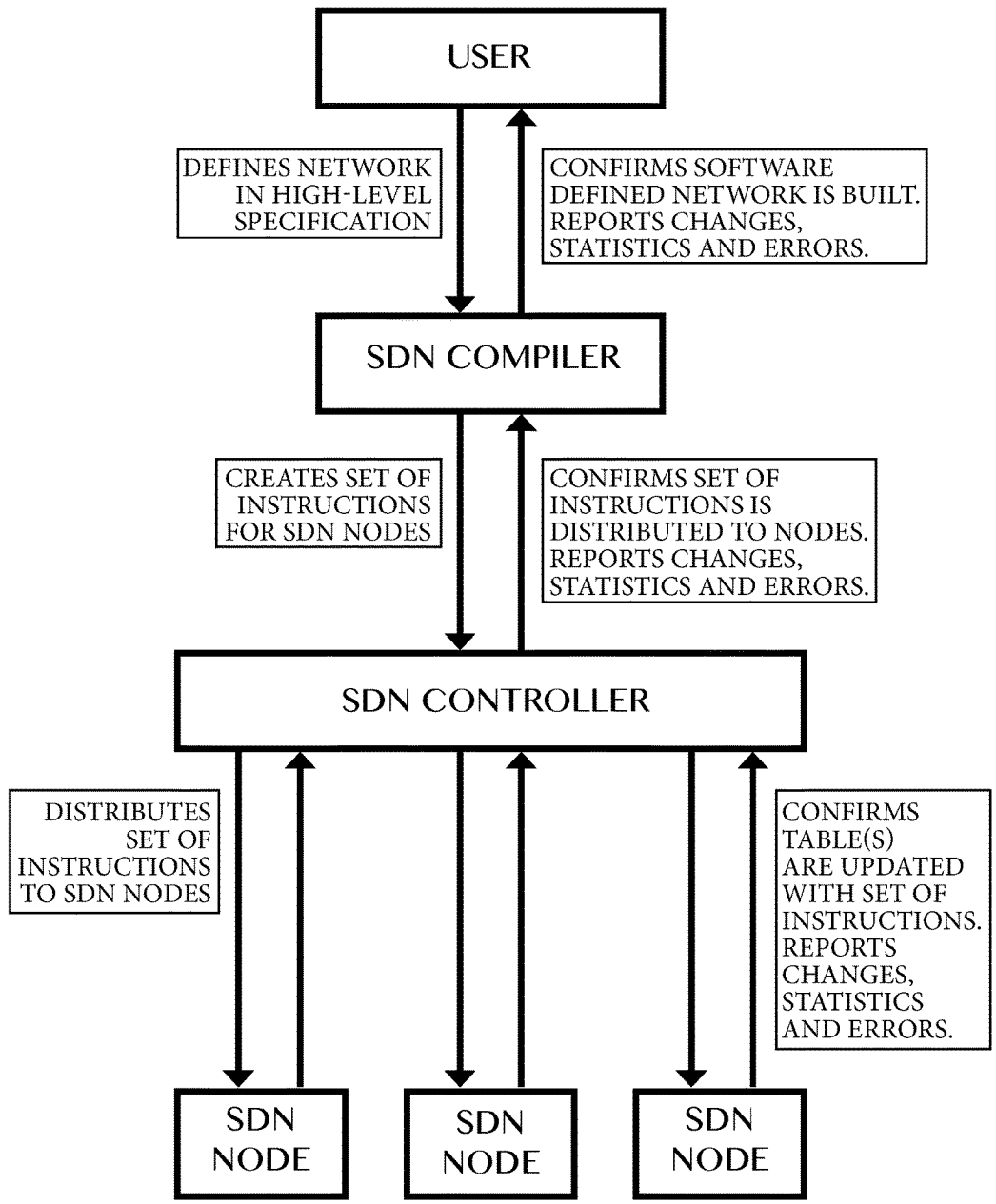
FIG. 1 is a diagram depicting the various components of a Software Defined Network

The definition of SDN as given in the introduction above, has lead the inventor of the present invention to a system comprising the following components, as depicted in FIG. 1 (cf. PCT/EP2014/055640 FIG. 1, page 35).

1. A User defining a network in a high-level network specification.

2. A SDN Compiler translating the high-level network specification into a set of instructions for physical and virtual networking and computing resources.

3. A SDN Controller distributing this set of instructions to physical and virtual networking and computing resources.

4. Physical and virtual networking and computing resources performing an action on an incoming packet in accordance with the received set of instructions. In FIG. 1, they are indicated with the term "SDN node".

Figure 10:
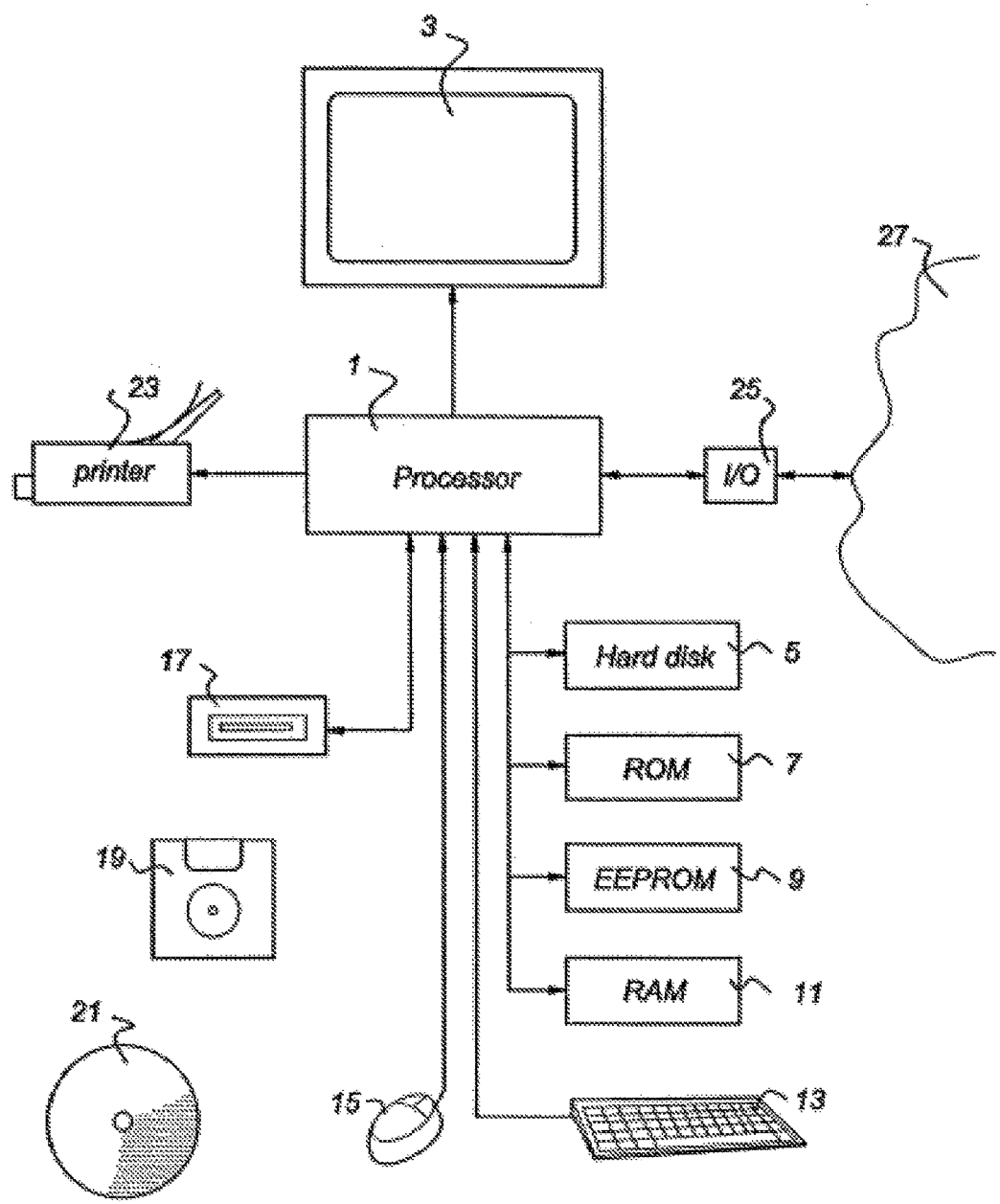
FIG. 10 is a diagram of a general outline of a computer arrangement

A user mentioned at point 1 above could be, but is not limited to, a person, a network management system, a cloud management system, an application, another SDN Compiler. So, a User may refer to "user equipment", i.e., any suitable computer equipment like a computer work station that may be stand-alone or part of a larger network. An example of such a computer equipment is shown in FIG. 10 and will be described later.

In FIG. 1, in the direction from bottom to top, the various components report on their northbound interface that particular tasks have been performed and report changes, statistics and errors.

The resources mentioned at point 4 comprise typical networking and computing resources such as, but not limited to:

Physical packet forwarding devices (such as, but not limited to, layer 2 switch, layer 3 router, firewall, deep packet inspection device, caching node, or other type of middleboxes).

Physical devices acting as network host, such as but not limited to physical server, personal computer, laptop, tablet, mobile phone, Physical Network Interface Cards (NICs), Virtual switches in virtualized physical servers, Virtual machines in virtualized physical servers, Virtual NICs, IPv4-capable routers, IPv6-capable routers, MPLS-switches [MPLS=Multi Protocol Label Switching], application processes providing packet-switching, Circuit-switching nodes as an example, but not limited to, Fiber Cross-Connects cross-connecting optical fibers, Remote-Optical Add/Drop Multiplexers (ROADMs) or Optical Cross-Connects cross-connecting optical wavelengths, Synchronous Digital Hierarchy (SDH) multiplexers or Synchronous Optical NETwork (SONET) multiplexers cross-connecting time-slots, OS (Operating System) kernel, Application processes, Input-buffers and output-buffers of a physical or virtual node, Storage equipment, as an example, but not limited to, storage equipment supporting Fibre Channel over Ethernet (FCoE) or storage equipment supporting Fibre Channel over IP (FCIP), A Wavelength Division Multiplexing (WDM) multiplexer, Physical and/or virtual nodes in each of the above mentioned layers are either packet-switching or circuit-switching nodes. For both packet-switching nodes and circuit-switching nodes a set of instructions is created by the SDN Compiler. In case of a packet-switching node, these instructions comprise forwarding table entries. In case of a circuit-switching node, these instructions comprise cross-connect settings.

Note that above mentioned resources include both components of physical devices, such as for example but not limited to a physical NIC and entire physical devices, such as for example but not limited to a physical packet forwarding device. Therefore, a set of instructions, referred to at point 4, can be created for a component of a physical device or for an entire physical device.

Note that virtual nodes, representing virtual resources such as a Virtual Machine are represented as physical nodes in the method (cf. PCT/EP2014/055640 page 186).

The specification of a logical network abstraction is the 'high-level network specification' inputted by the user and mentioned at point 1 above. Ideally, this specification specifies an arbitrary logical network, consisting of an arbitrary number of logical nodes in an arbitrary topology, the logical nodes being mapped to arbitrary physical and virtual network and computing resources. Multiple logical networks can be defined and created simultaneously on the same physical and virtual networking and computing resources.

Point 2 above refers to 'Translation of the high-level network specification into a set of instructions for networking and computing resources'. In case of a packet forwarding switch, these instructions are the forwarding table entries of that switch according to which packets should be forwarded. In case of a host, these instructions are the filter table entries according to which packets should be accepted or dropped and instructions to which output port to send packets originating from that host node to a particular destination node. In case of a NIC these instructions are the filter table entries according to which packets should be forwarded or dropped. Point 2 referred to above provides the translation or compilation from a high-level network specification into a set of instructions for the appropriate physical and virtual networking and computing resources. We have termed this process an 'SDN Compiler' process in analogy with compilers used in computing, translating a high-level language into lower-level instructions. Please note that the above process should provide instructions to both the physical and virtual networking and computing resources, in contrast to so-called 'overlay' virtual networks (such as proposed e.g. by Nicira/VMWare) which essentially create a virtual tunnel on top of the physical network, without configuring the physical switches, except for the tunnel in- and egress switches. The desired SDN Compiler method should provide an integral approach including both the virtual and physical resources, including the entire physical network. Further, the desired SDN Compiler method should also instruct non-switching network devices, referred to above, with the required instructions. Moreover, as current OpenFlow implementations are available in software (e.g. Open vSwitch providing a Virtual Switch running in a virtualized physical server) as well as in hardware (e.g. NEC ProgrammableFlow PF5240 Switch), there is a need to determine the aforementioned instructions across virtual and physical networking and computing resources. In an implementation, functionality of the 'SDN Compiler', or at least part of it, and functionality of the 'SDN Controller', or at least part of it, could be combined into a single system.

We will now first describe the physical and virtual resources for which the SDN compiler creates the appropriate instructions, using a functional representation. FIGS. 2A, 2B, 2C and 2D (cf. PCT/EP2014/055640 FIG. 2A, 2B, 2F, 2G page 37) depict the components of a physical network. Example physical nodes are shown in FIG. 2A and are considered physical resources onto which a logical network is created. As such the name of the physical node (BA through BD in FIG. 2A) is only used to identify the physical resource and not used to make any forwarding decision upon. As depicted in FIG. 2B, we define a physical network (identified with BAA in FIG. 2B) as a collection of physical nodes. Physical nodes are interconnected by physical links (denoted by a solid line).

In case a physical link is bidirectional, a physical link creates a pair of adjacencies between a pair of physical nodes, one adjacency in each direction. In case a physical link is unidirectional, a physical link creates a single adjacency between a pair of physical nodes. The physical link can be any physical medium, including but not limited to, fiber optic cable, copper cable, air. The physical link can also be a path provided by another networking technology, such as but not limited to an optical wavelength, a Time Division Multiplexing (TDM) circuit, a multi protocol label switching (MPLS) path. The set of physical nodes combined with the set of physical links determines the physical topology of the network. The physical network can consist of an arbitrary number of nodes, with arbitrary links, resulting in an arbitrary topology.

A typical representation of a physical network is illustrated in FIG. 2C showing the physical network BAA and physical nodes BA through BD. As depicted in FIG. 2C, the interface between the physical node and the physical link is referred to as Physical 'Point-of-Attachment' (PoA), indicated by p101 to p108. A typical example of a Physical PoA identifier in currently deployed networks is an Ethernet Media Access Control (MAC) Address, but our invention is not limited to this. The PoA identifier has to be unique within the collection of networks that is under control of the SDN Compiler. The PoA identifies both the 'Input Port' of a node when a packet or signal is received by a node and the 'Output Port' of a node when a packet or signal is sent from a node. As depicted in FIG. 2C, each physical link has one or multiple cost types and a cost value(s) associated with each cost type in each direction. A typical cost type used in physical networks is the delay of the link, with cost values typically expressed in milliseconds, but any type of cost can be used, representing a property of said link. Each bidirectional physical link has 2 cost values, one for each direction. Each unidirectional physical link has 1 cost value for each cost type. The cost value of a physical link in a particular direction is shown closest to the physical node from which the packets originate for that particular direction. E.g. the link from BA to BB has a cost value of 1. The link from BB to BA has a cost value of 3. While a physical link denotes the adjacency-relationship(s) between a pair of physical nodes, a physical path denotes a physical route a packet or signal follows from a physical source node to a physical destination node, in case of unicast networking. In case of multicast or broadcast networking there are physical path relationships between a single physical source node and multiple physical destination nodes. Then, a physical node is mapped to more than one logical node through a depth-mapping resulting in multicasting Physical paths can have multiple cost types in each direction with typically a cost value equal to the sum of the cost values of that particular cost type in that particular direction of the physical links it consists of. A physical path is a sequence of physical. PoAs through which the packet traverses from source node to destination node. Alternative terminology for a 'path' is a 'flow', e.g. the OpenFlow specification uses the terminology 'flow'.

We represent the network also as a directed graph. Said directed graph may be weighted. The directed graph of network BAA is given in FIG. 2D, showing the vertices (nodes) BA through BD and the directed edges that connect pairs of vertices. In FIG. 2D, an "edge", is indicated with an arrow connecting one vertex with another vertex where the direction of the arrow indicates the direction of flow of data. When represented as a directed graph, a bi-directional physical link between two vertices is represented by two edges. Each edge corresponds to an adjacency.

PCT/EP2014/055640 (pages 39, 41, 42) describes properties of a physical switch node, a physical host node, a physical NIC, a virtual switch node and a virtual host node in accordance with common usage of these terms. An example, but not limited to, a host node is Computing Equipment or a storage equipment (cf. PCT/EP2014/055640 pages 155 and 204).

By now, we have provided a functional model of the physical and virtual networking and computing resources. Now, to illustrate the present invention, we consider a logical network that can be defined in a high-level specification and is independent from physical and virtual resources.

The logical network is defined by specifying:
1. Name of the logical network
2. Name of the logical nodes of which the logical network consists
3. Adjacencies between logical nodes
4. One or more Cost Types of the logical network
5. Cost(s) of logical adjacencies between logical nodes for each Cost Type
6. Forwarding policy of logical network
7. Mapping from physical and/or virtual nodes to logical nodes Cost types and values represent properties of links and can be used to determine a forwarding policy.

Figure 3A:
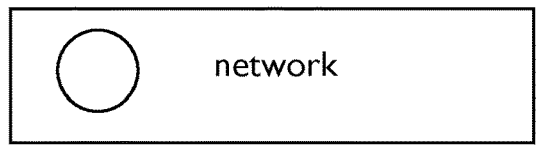
FIG. 3A is a diagram showing networks KA and KB and their topology-mapping relationships.
Figure 3B:
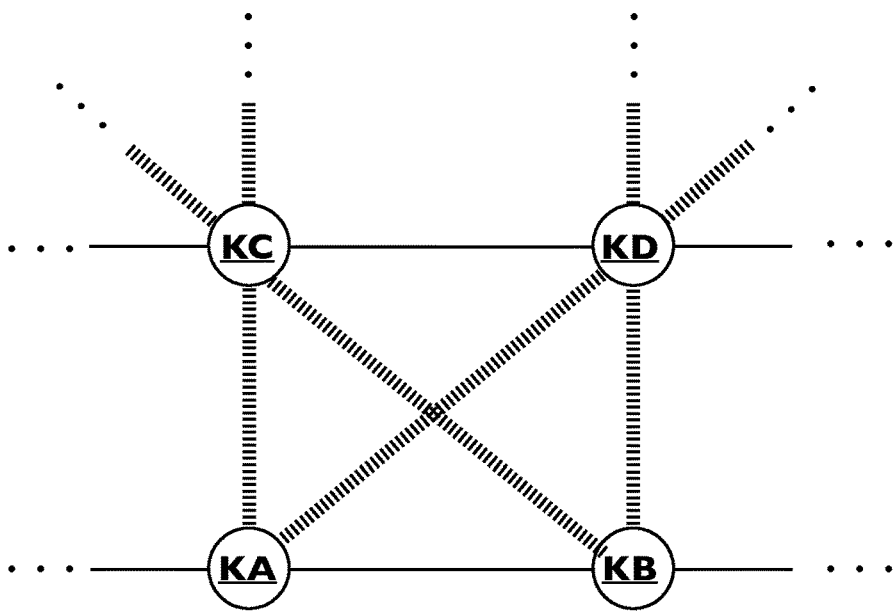
FIG. 3B is a diagram showing networks KA, KB, KC, KD and their mapping relationships either being a topology-mapping or a layer-mapping.
Figure 3C:
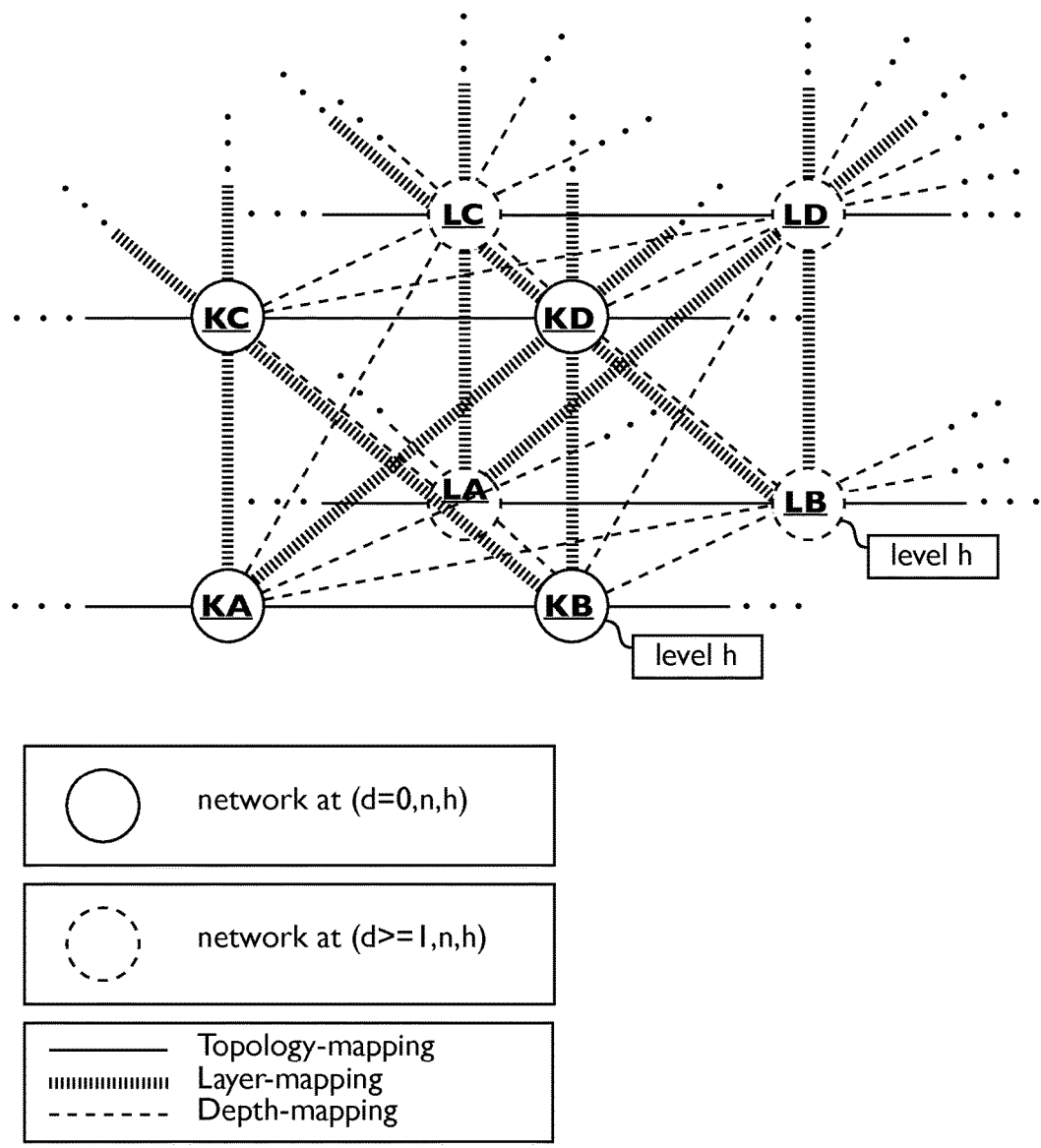
FIG. 3C is a diagram showing networks KA, KB, KC, KD, LA, LB, LC, LD and their mapping relationships either being a topology-mapping, a layer-mapping or a depth-mapping.

The physical and/or virtual nodes as explained above are mapped to logical nodes using a 1:1, 1:N or N:1 mapping, as follows:
1:1 physical to logical mapping
1:N physical to logical mapping
N:1 physical to logical mapping
1:1 virtual to logical mapping
1:N virtual to logical mapping
N:1 virtual to logical mapping
N:1 physical and virtual to logical mapping As mentioned above, virtual nodes are represented as physical nodes in the method (cf. PCT/EP2014/055640 page 186), reducing above mappings to:
1:1 physical to logical mapping
1:N physical to logical mapping
N:1 physical to logical mapping The functional representation of a logical node is a dashed circle, as depicted in FIG. 3C. A physical/virtual to logical mapping can have an optional cost value for each direction of the mapping.

The user of the SDN Compiler defines the logical network. The user could be, but is not limited to, a person, a network management system, a cloud management system, an application, another SDN Compiler. The logical network can consist of an arbitrary number of logical nodes, with arbitrary logical adjacencies, resulting in an arbitrary logical topology. As an example the logical network could be specified as a graph in a high-level programming language, with the physical and/or virtual node(s) to which the logical node has been mapped being an attribute of each logical node.

For the logical nodes, we use a logical name space that is independent from the namespace of the physical and virtual resources. The logical network can now be defined in terms of logical node names, which may be expressed in any suitable form with any suitable number of unique characters and are mapped to the appropriate virtual and physical resources as required. By changing this mapping, the logical network can be re-mapped to other virtual and physical resources.

1:N physical to logical mapping allows for naming a single physical resource with multiple logical names. 1:N virtual to logical mapping allows for naming a single virtual resource with multiple logical names. Please note that the logical network is independent from the physical network and virtual resources, of course with the constraint a path exists between physical and virtual resources, and as such provides an abstraction of the physical network and virtual resources.

The name of the logical node is used to make forwarding decisions upon (cf PCT/EP2014/055640 page 47). Please note that the logical node itself is named, not its interfaces. In analogy with the physical network, we define a logical network as a collection of logical nodes Logical nodes are interconnected by logical links (denoted by a solid line). In case a logical link is bidirectional, a logical link creates a pair of adjacencies between a pair of logical nodes. In case a logical link is unidirectional, a logical link creates a single adjacency between a pair of physical nodes. The set of logical nodes combined with the set of logical links determines the logical topology of the network. While a logical link denotes the adjacency-relationship(s) between a pair of logical nodes, a logical path denotes a logical route a packet follows from a logical source node to a logical destination node, in case of unicast networking. In case of multi-cast or broadcast networking there are logical path relationships between a single logical source node and multiple logical destination nodes. A logical path is a sequence of physical PoAs and/or virtual PoAs through which the packet traverses from logical source node to logical destination node. Here we have arrived at an important relationship: a relationship between logical source and logical destination nodes and a path described in terms of physical and virtual PoA's. This will allow us to define a network in logical node names and translate (compile) the defined network into instructions in terms of physical and/or virtual PoAs for the physical and/or virtual networking and/or computing resources.

A logical network can be created from a physical network, a virtual network or a combined physical/virtual network (cf. PCT/EP2014/055640 page 93). Also, a logical network can be created from another logical network. In order to avoid any ambiguity, hereafter we will reference to a network at depth d created from a network at depth (d−1). We refer to a particular depth as depth d, with d being a positive integer starting at 0 (zero). Depth d=0 is equal to a physical or virtual network referred to thus far. Depth d>=1 is equal to a logical network referred to thus far. The combined physical and virtual network is consisting of one or more layers (cf. PCT/EP2014/055640 page 91). At each layer nodes can be interconnected through physical and/or virtual links. The physical link can be any physical medium, including but not limited to, fiber optic cable, copper cable, air. The physical link can also be a path provided by another networking technology, such as but not limited to an optical wavelength, a Time Division Multiplexing (TDM) circuit, a Multi Protocol Label Switching (MPLS) path. The physical link can also be a tunnel provided by another networking technology such as but not limited to a GRE-tunnel [GRE=Generic Routing Encapsulation], NVGRE-tunnel [NVGRE=Network Virtualization using Generic Routing Encapsulation], VXLAN tunnel [VXLAN=Virtual Extensible Local Area Network]. The virtual link can be a virtual connection, including but not limited to, virtual links between virtual switches and virtual machines, virtual links between virtual machines, network sockets. A layer might provide services to a higher layer and might consume services from a lower layer. The lowest packet-switching layer provides for Media-Access Control (MAC). A logical network is consisting of one or more layers.

We refer to a particular layer as layer n, with n being a positive integer starting at n_min which may have a value of 0 (zero). We refer to layer n=n_min (d) as the 'lowest layer' at depth d. (cf. PCT/EP2014/055640 pages 93 and 141). Examples of layers in current networks are, but not limited to, physical medium layer, frequency- or wavelength-division multiplexing layer, time-division multiplexing layer, data link layer, network layer, transport layer, application layer. Within an overall network a layer n provides services to a layer (n+1) and a layer (n+1) consumes services provided by layer n.

Each layer consists of an arbitrary number of sub-networks within a hierarchy of sub-networks with arbitrary number of hierarchy-levels. A network can be abstracted to a node and can become a node within another network. As an example, but not limited to, network BAA, shown in FIG. 2C, can be abstracted to a node in a network-of-networks. In order to avoid any ambiguity, hereafter we will reference to a network at level h consisting of networks at level (h−1) and consider the lowest hierarchy level to be h_min(d, n) at depth d and layer n (cf. PCT/EP2014/055640 pages 93 and 146). A network at level h_min(d, n) is a node. This applies to physical networks and logical networks. Using this terminology, physical network BAA at level h, shown in FIG. 2D, consists of physical network BA, BB, BC, BD at level (h−1).

The above is illustrated in FIGS. 3A through 3D (cf. PCT/EP2014/055640 FIGS. 33A, 33B, 33C, 34A, page 94). FIG. 3A depicts networks KA and KB being at the same level h and being interconnected by a link. As indicated in FIG. 3A, network KA and KB could be interconnected to other networks as well. The relationships between networks are referred to as mappings. In order to have a consistent naming for the various mappings that will be introduced hereafter, we will reference to a topology-mapping rather than an adjacency in the modeling of a link in the text below. In case a link is bi-directional, a link creates a pair of topology-mappings between a pair of networks. In case a link is unidirectional, a link creates a single topology-mapping between a pair of networks. A topology-mapping is a mapping from a first network to a second network, the first and second network being at the same depth d and same layer n and same level h (cf PCT/EP2014/055640 FIG. 49, page 179)

FIG. 3B depicts networks KA, KB, KC, KD being at the same level h. Networks KA and KB are interconnected by links, represented as a topology-mapping. Networks KA and KC are interconnected by links, represented as a layer-mapping. Networks KB and KC are interconnected by links, represented as a layer-mapping. A layer-mapping is a mapping from a first network to a second network, the first and second network being at different layers n.

In FIG. 3C networks KA, KB, KC, KD, LA, LB, LC, LD are shown. Within this diagram each network has the same level h. In case the hierarchy level starts at h=0, a network at h=0 in FIG. 3C is equal to a 'node' referred to thus far, in case h=1 a network in FIG. 3C is equal to a 'network-of-nodes' referred to below, in case h=2 a network in FIG. 3 is equal to a 'network-of-networks-of-nodes' referred to below, etc. Each network is situated at a particular depth d and layer n. When networks KA and KB are at depth d, layer n, networks KC and KD are at depth d, layer (n+1), networks LA and LB are at depth (d+1), layer n, networks LC and LD are at depth (d+1), layer (n+1).

We distinguish between 3 types of mappings between networks at a particular level h (cf. PCT/EP2014/055640 pages 94, 128 and 129):

Topology-mappings are adjacencies between networks with the same depth d and layer n. Note that an adjacency is a mapping. We define a topology-mapping as a mapping from a network at (d, n, h) to a network at (d, n, h). FIG. 3A shows only topology-mappings between 2 networks (KA and KB, KC and KD, LA and LB, LC and LD) as our illustration is limited to 3 dimensions. In general topology-mappings can exist between an arbitrary number of networks and are typically presented as a 2-dimensional layout and are supported by the SDN Compiler method presented here. Topology-mappings are shown as solid lines. Physical to virtual mappings are a special type of topology-mappings between physical and virtual nodes.

Layer-mappings are relationships between networks at different layers n and same depth d. We define a layer-mapping as a mapping from a network at (d, n, h) to a network at (d, n−y, h) or a mapping from a network at (d, n−y, h) to a network at (d, n, h), with y being larger than zero and smaller than or equal to n−n_min (d), n_min(d) being the lowest layer at depth d. Layer-mappings are shown as stripes.

Depth-mappings are relationships between networks at different depths d. We define a depth-mapping as a mapping from a network at (d, n1, h) to a network at (d−x, n2, h) or a mapping from a network at (d−x, n1, h) to a network at (d, n2, h), with x being larger than zero and smaller than or equal to d, where n1 may be equal to n2. Depth-mappings are shown as dashed lines.

The functional representation of a physical node is a circle with a solid circle, as depicted in FIG. 3A. The functional representation of a logical node is a dashed circle, as depicted in FIG. 3A. In FIG. 3A depth-mappings between network KA and network LD, between network KB and network LC, between network KC and network LB, between network KD and network LA are not shown to keep the figure relatively simple. In FIG. 3A topology-, layer- and depth-mappings are shown that are connected to only a single network KA, KB, KC, KD, LA, LB, LC or LD and are open-ended with ' . . . ' on the other side. These layer-mappings illustrate that layer-mappings can be extended to an arbitrary number of layers. The depth-mappings connected to only a single network illustrate that depth-mappings can be extended to an arbitrary number of depths. The topology-mappings connected to only a single network at level h depict topology-mappings at level (h+1) as will be explained below.

Between networks at different levels we regard level-mappings:

Level-mappings are relationships between networks at different levels and same depth d and same layer n. We define a level-mapping as a mapping from a network at (d, n, h) to a network at (d, n, h−z) or a mapping from a network at (d, n, h−z) to a network at (d, n, h), with z larger than zero and smaller than or equal to h−h_min (d, n), h_min(d, n) being the lowest level at depth d and layer n. We will reference to a network at depth d=0, layer n, level h=h_min(d, n) rather than a physical node. We will reference to a network at depth d>=1, layer n, level h=h_min(d, n) rather than a logical node.

A level-mapping is illustrated in FIG. 3D. FIG. 3D shows networks KA, KB, KC, KD, LA, LB, LC, LD at level h and their topology-mapping, layer-mapping and depth-mapping relationships. Diagonal layer-mappings between nodes KA and KD, KB and KC, LA and LD, LB and LC which were shown in FIG. 3C have been omitted in this figure to simplify the figure. Diagonal depth-mappings between nodes KA and LA, KB and LA, KC and LD, KD and LC, KA and LC, KC and LA, KB and LD, KD and LB which were shown in FIG. 3C have been omitted in this figure to simplify the figure. FIG. 3D also shows networks KAA, KCC, LAA, LCC at level (h+1). Network KAA at (d,n,h+1) contains networks KA and KB both at (d,n,h), in other words network KAA is mapped through a level-mapping to networks KA and KB. Network KCC at (d,n+1,h+1) contains networks KC and KD both at (d,n+1,h), in other words network KCC is mapped through a level-mapping to networks KC and KD. Network LAA at (d+1,n,h+1) contains networks LA and LB both at (d+1,n,h), in other words network LAA is mapped through a level-mapping to networks LA and LB. Network LCC at (d+1,n+1,h+1) contains networks LC and LD both at (d+1,n+1,h), in other words network LCC is mapped through a level-mapping to networks LC and LD.

Figure 4A:
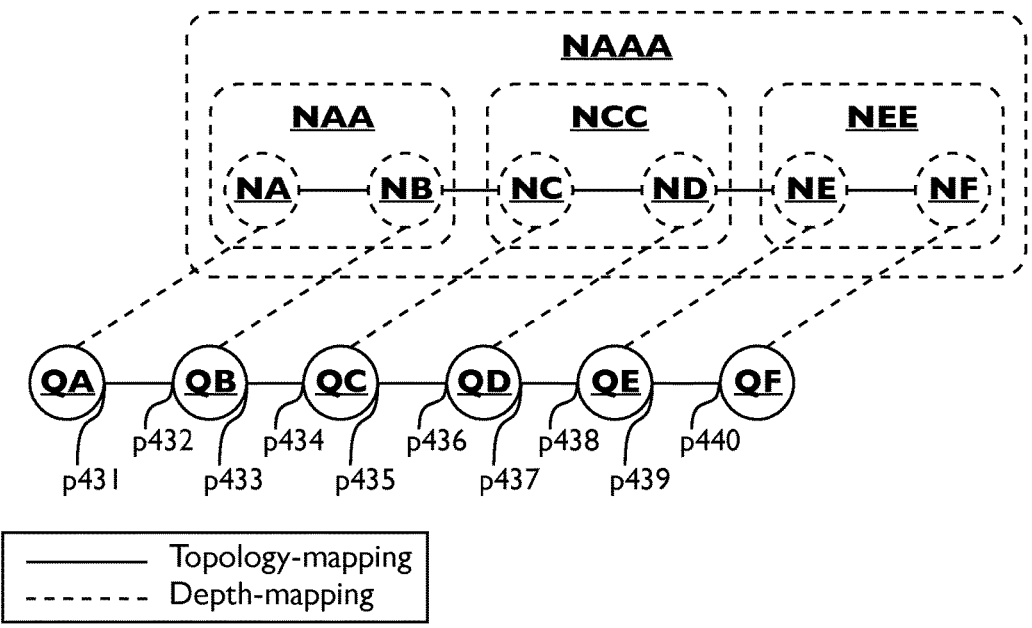
FIG. 4A is a diagram showing network NAAA at (d, n, h+2) consisting of networks NAA, NCC and NEE at (d, n, h+1). Network NAA consists of networks NA and NB at (d, n, h). Network NCC consists of networks NC and ND at (d, n, h). Network NEE consists of networks NE and NF at (d, n, h).
Figure 4B:
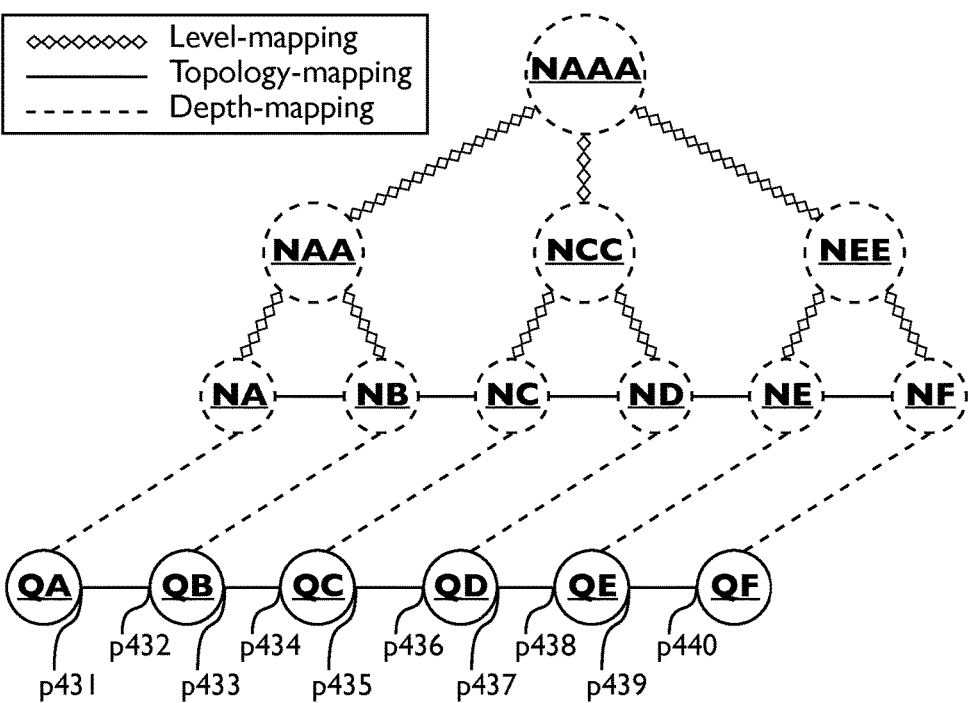
FIG. 4B is a diagram showing network NAAA at (d, n, h+2) consisting of networks NAA, NCC and NEE at (d, n, h+1). Network NAA consists of networks NA and NB at (d, n, h). Network NCC consists of networks NC and ND at (d, n, h). Network NEE consists of networks NE and NF at (d, n, h).

A level-mapping is illustrated in FIG. 4A (cf PCT/EP2014/055640 FIGS. 42A and 42, page 146). FIG. 4A shows network NAAA at (d, n, h+2) consisting of networks NAA, NCC and NEE at (d, n, h+1). Network NAA consists of networks NA and NB at (d, n, h). Network NCC consists of networks NC and ND at (d, n, h). Network NEE consists of networks NE and NF at (d, n, h). FIG. 4A also shows the topology-mappings between networks at (d, n, h). FIG. 4B shows an alternative representation of the set of networks NAAA, NAA, NCC, NEE, NA, NB, NC, ND, NE and NF of FIG. 4A by showing the level-mappings between networks at (d=1, n=0). As an example, network NAAA at (d=1, n=0, h=2) consists of networks NAA, NCC and NEE at (d=1, n=0, h=1). Therefore, a level-mapping is shown between network NAAA and network NAA, a level-mapping is shown between network NAAA and network NCC and a level-mapping is shown between network NAAA and network NEE. Note that in this way a hierarchical network, being a hierarchical graph, is represented as a non-hierarchical graph. A topology-mapping, layer-mapping, depth-mapping or level-mapping from a first network to a second network can be a 1:1, 1:N or N:1 mapping (first network: second network), (cf. PCT/EP2014/055640 page 96).

In order to make the proposed approach scalable, we introduce hierarchy in the logical naming of networks and nodes of the following form (cf PCT/EP2014/055640 page 80):

. . . . . Network-of-Networks-of-Networks. Network-of-Networks. Network. Node

The dot symbol "." separates the different elements the logical name consists of. We will refer to Network-of-Networks-of-Networks as NoNoNs and to Network-of-Networks as NoNs. The above naming structure introduces hierarchy in a recursive way:

A Network is a collection of Nodes

A NoNs is a collection of Networks

A NoNoNs is a collection of NoNs

And so on, as indicated by ' . . . .' in the above definition of the used naming form.

This creates an arbitrary number of hierarchy-levels in the network, obviously in a deployment limited to practical constraints.

Using the above structure a Node is located by:

. . . . . Network-of-Networks-of-Networks. Network-of-Networks. Network. Node

Similarly, a Network is located by:

. . . . . Network-of-Networks-of-Networks. Network-of-Networks. Network

Similarly, a NoNs is located by:

. . . . . Network-of-Networks-of-Networks. Network-of-Networks

And so on for various levels in the hierarchy.

Note that each dot symbol "." represents a level-mapping (cf PCT/EP2014/055640 page 119), therefore the address structure follows exactly the hierarchical structure of a network as represented by level-mappings. Note that also within a physical network hierarchical naming can be used.

We now extend the address to the following form:

. . . . . Network-of-Network-of-Networks. Network-of-Networks. Network. Node. Sub-identifier 1. Sub-identifier 2 . . . . .

In which each dot symbol "." within ". . . . . Network-of-Network-of-Networks. Network-of-Networks. Network" represents a level-mapping and in which each dot symbol "." within "Node. Sub-identifier 1. Sub-identifier 2 . . . . ." represents a layer-mapping. The ". . . ." before "Network-of-Network-of-Networks" identifies that the hierarchical naming can be extended to an arbitrary number of levels. The ". . . ." after "Sub-identifier 2" identifies that the address can include an arbitrary number of layers. A sub-identifier is a node. A sub-identifier at layer n provides a service to layer (n+1). An example but not limited to such a service is a multiplexing service. Using this approach logical naming of various layers can be combined into a single logical address-space. This makes it possible to perform forwarding using a logical address-space spanning multiple layers. This provides a means to locate the node, through it's address, within a hierarchical network. Further, the above approach abstracts every network to a node at its particular level in the naming hierarchy. E.g. A NoNs is consisting of a collection of Networks with adjacencies between Networks, in the same way as a Network is consisting of a collection of Nodes with adjacencies between nodes.

A topology-path is a concatenation of topology-mappings (cf PCT/EP2014/055640 page 174). A first topology-path can comprise of a second topology-path, creating a nesting of the first topology-path and the second topology-path. A topology-path can be created using the following method: Calculating and storing a topology-path from a first network at (d, n, h) to a second network at (d, n, h) as a concatenation of zero or more topology-mappings at (d, n, h) and zero or more topology-paths at (d, n, h), said number of topology-mappings and said number of topology-paths being such that their sum is at least one. This method is referred to as the method to calculate a topology-path. (cf. PCT/EP2014/055640 pages 181,182). Note that a concatenation of one topology-mapping refers to a situation in which said topology-path from a first network at (d, n, h) to a second network at (d, n, h) comprises of a single topology-mapping. The term 'a concatenation of one' is used to avoid the or-statement in order to keep the description relatively simple.

We define a level-path as a concatenation of level-mappings (cf PCT/EP2014/055640 page 146), A first level-path can comprise of a second level-path, creating a nesting of the first level-path and the second level-path (cf. PCT/EP2014/055640 page 174). A level-path can be created using the following method: Calculating and storing a level-path from a first network at (d, n, h1) to a second network at (d, n, h2) as a concatenation of zero or more level-mappings at (d, n) and zero or more level-paths at (d, n), said number of level-mappings and said number of level-paths being such that their sum is at least one. This method is referred to as the method to calculate a level-path. We refer to a level-path for which forwarding entries are requested by a user as a requested level-path.

As one or more topology-paths and one or more level-paths can be concatenated, we refer to a topology-level-path from a first network at (d, n, h1) to a second network at (d, n, h2) as a concatenation of zero or more topology-paths at (d, n) and zero or more level-paths at (d, n) and zero or more topology-level-paths at (d, n), said number of topology-paths and said number of level-paths and said number of topology-level-paths being such that their sum is at least one. This method is referred to as the method to calculate a topology-level-path. Note that a first topology-level-path can comprise of a second topology-level-path, creating a nesting of the first topology-level-path and the second topology-level-path. Note that a topology-level-path can be a single topology-path or can be a single level-path.

We refer to a topology-path, level-path and topology-level-path for which forwarding entries are requested as a requested topology-path, requested level-path and requested topology-level-path respectively (cf PCT/EP2014/055640 page 182). As an example, but not limited to, a requested topology-path could be requested by an SDN Controller, a physical node, a user of the SDN Compiler. Such request could be a proactive path-instantiation or a reactive path-instantiation. We refer to a topology-mapping, depth-mapping, layer-mapping, level-mapping, topology-path, level-path and topology-level-path as an edge.

Note that as an example, but not limited to a topology-level-path can comprise of a single topology-path, a single level-path, a single topology-mapping or a single level-mapping.

A topology-mapping can be created using any of the following methods:

A first method for calculating a topology-mapping, comprising the following actions:
Calculating and storing a topology-mapping from a first network at (d, n1, h) to a second network at (d, n1, h) as a concatenation of a depth-mapping from said first network to a third network at (d−x, n2, h), a topology-level-path from said third network to a fourth network at (d−x, n2, h) and a depth-mapping from said fourth network to said second network with x being larger than zero and smaller than or equal to d, where n1 may be equal to n2.

A second method for calculating a topology-mapping, comprising the following actions:
Calculating and storing a topology-mapping from a first network at (d, n, h) to a second network at (d, n, h) as a concatenation of a layer-mapping from said first network to a third network at (d, n-y, h), a topology-level-path from said third network to a fourth network at (d, n-y, h) and a layer-mapping from said fourth network to said second network with y being larger than zero and smaller than or equal to n−n_min(d), n_min(d) being a lowest layer at particular depth d and n_min(d) being=>0.

A third method for calculating a topology-mapping, comprising the following actions:
Calculating and storing a topology-mapping from a first network at (d, n, h) to a second network at (d, n, h) as a concatenation of one or more level-mappings with decreasing level from the first network to a third network at (d, n, h-z), a topology-path from the third network to a fourth network at (d, n, h-z) and one or more level-mappings with increasing level from the fourth network to the second network, with z larger than zero and smaller than or equal to h-h_min, h_min being the lowest level at depth d and layer n.

The topology-level-path used in the first method and second method to calculate a topology-mapping can be a topology-level-path, a topology-path or a level-path, as a topology-level-path can comprise of a single topology-path and a topology-level-path can comprise of a single level-path. When creating a topology-mapping the topology-level-path used in the calculation of the topology-mapping can either a topology-level-path that is explicitly created or can be concatenation of topology-mappings and level-mappings.

A layer-mapping can be created using any of the following methods:

A first method for calculating a layer-mapping, comprising the following actions:
Calculating and storing a layer-mapping from a first network at (d, n1, h) to a second network at (d, n1−y, h) as a concatenation of a depth-mapping from said first network to a third network at (d−x, n2, h), zero or more layer-mappings from said third network to a fourth network at (d−x, n2-y, h) and a depth-mapping from said fourth network to said second network with x larger than zero and smaller than or equal to d, with y larger than zero and smaller than or equal to n1−n1_min and smaller than or equal to n2−n2_min, n1_min being the lowest layer at depth d, n2_min being the lowest layer at depth d−x, A second method for calculating a layer-mapping, comprising the following actions:
Calculating and storing a layer-mapping from a first network at (d, n1, h) to a second network at (d, n1+y, h) as a concatenation of a depth-mapping from said first network to a third network at (d−x, n2, h), zero or more layer-mappings from said third network to a fourth network at (d−x, n2+y, h) and a depth-mapping from said fourth network to said second network with x larger than zero and smaller than or equal to d, with y larger than zero and smaller than or equal to n1_max−n1 and smaller than or equal to n2_max−n2, n1_max being the highest layer at depth d, n2_max being the highest layer at depth d−x.

Note that in the first method for calculating a layer-mapping, the third and fourth network can be the same network at (d−x, n2, h) or at (d−x, n2−y, h). Note that in the second method for calculating a layer-mapping, the third and fourth network can be the same network at (d−x, n2, h) or at (d−x, n2+y, h). Note that a layer-mapping from a first node at layer n to a second node at layer (n−1) followed by a topology-mapping results in a multiplexing action, such as for example but not limited to in node KA (cf PCT/EP2014/055640 page 236). Therefore, the SDN Compiler should be aware of the multiplexing and de-multiplexing capabilities of physical nodes when providing forwarding entries on component level rather than equipment level. As an example, but not limited to, the multiplexing and de-multiplexing capabilities could be provided to the SDN Compiler by an Element Management System (EMS).

We name each edge and we use the notation shown in FIGS. 6A through 6D to denote mappings and topology-level-paths (cf. PCT/EP2014/055640 FIGS. 51A through 51D, page 182). FIG. 6A shows the notation used for a first mapping with a first edge name, the first mapping being of a first mapping-type, the first mapping-type being a topology-mapping, depth-mapping, layer-mapping or level-mapping from a first network to a second network. The first network and the first mapping interface at the first Point-of-Attachment (PoA), the second network and the first mapping interface at the second PoA. The first PoA and the second PoA are optional. The '-( )->' sign indicating the direction of the mapping.

Figure 5A:
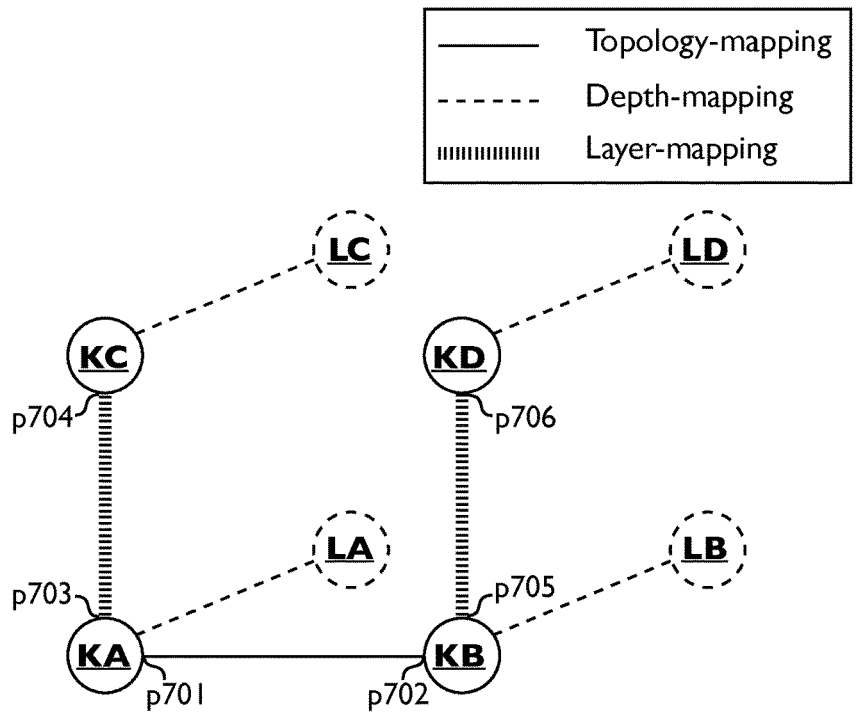
FIG. 5A is a diagram showing networks KA, KB, KC, KD, LA, LB, LC, LD and a topology-mapping between network KA and network KB, a layer-mapping between network KA and network KC, a layer-mapping between network KB and network KD, a depth-mapping between network KA and network LA, a depth-mapping between network KB and network LB, a depth-mapping between network KC and network LC, and a depth-mapping between network KD and network LD. Also the PoAs of the topology-mapping and layer-mappings are shown.
Figure 5B:
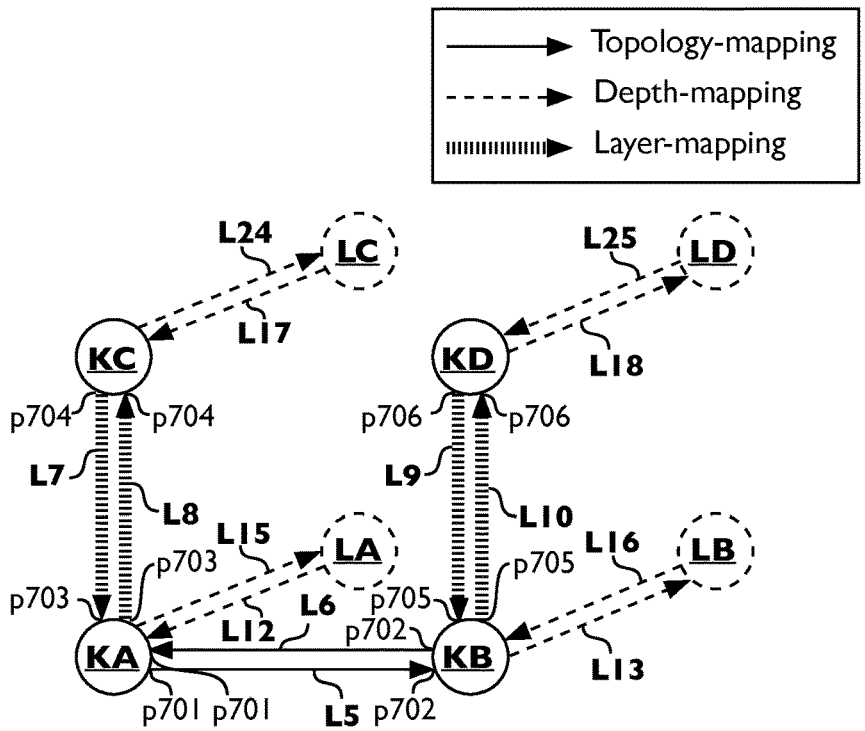
FIG. 5B is a diagram showing networks KA, KB, KC, KD, LA, LB, LC, LD and named topology-mappings, layer-mappings and depth-mappings. Also the PoAs of the topology-mappings and layer-mappings are shown.

We illustrate the naming of edges and notation with the example of FIG. 5A, which shows networks KA, KB, KC, KD, LA, LB, LC, LD, as shown in FIG. 3C above and a topology-mapping between network KA and network KB, a layer-mapping between network KA and network KC and a layer-mapping between network KB and network KD. FIG. 5A also shows Point-of-Attachments (PoAs) p701 through p706. As networks KA, KB, KC and KD are physical networks, the topology-mapping between network KA and network KB is representing a physical link, the layer-mapping between network KA and network KC is representing a physical link and the layer-mapping between network KB and network KD is representing a physical link. As a physical link can be uni-directional or bi-directional we represent a topology-mapping, depth-mapping, layer-mapping, level-mapping, topology-path, level-path or topology-level-path from a first network to a second network by a directed edge in a graph. This is shown in FIG. 5B, which shows networks KA, KB, KC, KD, LA, LB, LC, LD, topology-mappings, layer-mappings and depth-mappings. FIG. 7A shows the mappings of FIG. 5B in the notation of FIG. 6A. As an example, the topology-mapping named L5 from network KA to network KB is represented by: L5=KA-(topmap p701::p702)->KB, in which 'topmap' refers to 'topology-mapping'. Similarly, 'depmap' refers to 'depth-mapping', 'laymap' refers to 'layer-mapping', 'levmap' refers to 'level-mapping', 'toppath' refers to 'topology-path' and 'levpath' refers to 'level-path' in the notation used. Optionally, the direction of a depth-mapping, a layer-mapping and a level-mapping can be included in the mapping type (cf. PCT/EP2014/055640 page 180).

Figure 5C:
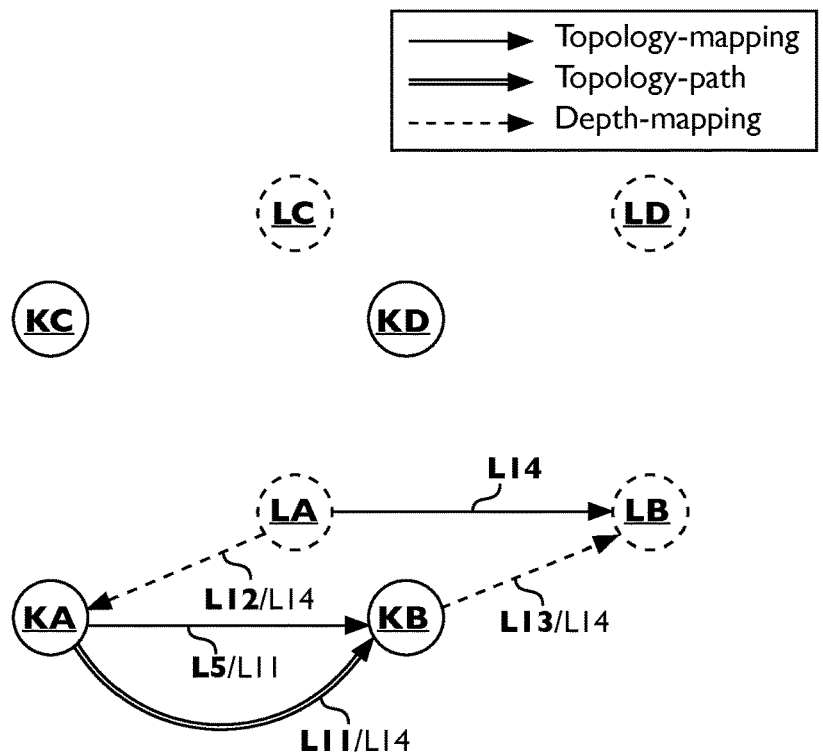
FIG. 5C is a diagram showing networks KA, KB, KC, KD, LA, LB, LC, LD and calculating and storing a topology-mapping named L14 from network LA to network LB as a concatenation of a depth-mapping named L12 from network LA to network KA, a topology-path named L11 from network KA network KB and a depth-mapping named L13 from network KB to network LB, the topology-path named L11 being a single topology-mapping named L5 from network KA to network KB

Using the same notation as FIG. 6A, FIG. 6B shows a second mapping with a second edge-name, the second mapping being of a second mapping-type from the second network to a third network. As shown in FIG. 5C, by applying the first method for calculating a topology-mapping described above, we calculate and store a topology-mapping named L14 from network LA to network LB as a concatenation of a depth-mapping named L12 from network LA to network KA, a topology-path named L11 from network KA network KB and a depth-mapping named L13 from network KB to network LB, the topology-path named L11 from network KA to network KB comprising of a single topology-mapping named L5 from network KA to network KB. Alternatively, creating the topology-path named L11 could also have been omitted and the topology-mapping named L14 could have been created from topology-mapping L5 directly. In FIG. 5C the topology-mapping named L5 from network KA to network KB is labeled with L5/L11 indicating that topology-mapping L5 is used to calculate topology-path L11 or in other words that topology-path L11 is mapped to topology-mapping L5.

We refer to a relationship between two edges as an edge-relationship, in which a second edge is multiplexed or mapped to a first edge and we represent such edge-relationship by "first edge/second edge", using a forward-slash symbol. As an example, we refer to L5/L11 as shown in FIG. 5C as an edge-relationship between a topology-mapping indicated by edge name L5 and a topology-path indicated by edge name L11, in which topology-path named L11 is mapped to topology-mapping named L5, or in other words, in which topology-mapping L5 is used to calculate topology-path L11. In FIG. 5C the name of an edge is shown in bold when labeling such edge.

FIG. 6C shows the notation of a third edge with a third edge-name, the third edge being of a third edge-type and being concatenation of a first edge and a second edge, the plus symbol indicating the concatenation and the forward-slash symbol representing an edge-relationship. As an example FIG. 7B shows the creation of the topology-mapping named L14 as "topmap L14=L12/L14+L11/L14+L13/L14" and the topology-path named L11 as "toppath L11=L5/L11", using the notation of FIG. 6C.

Figure 5D:
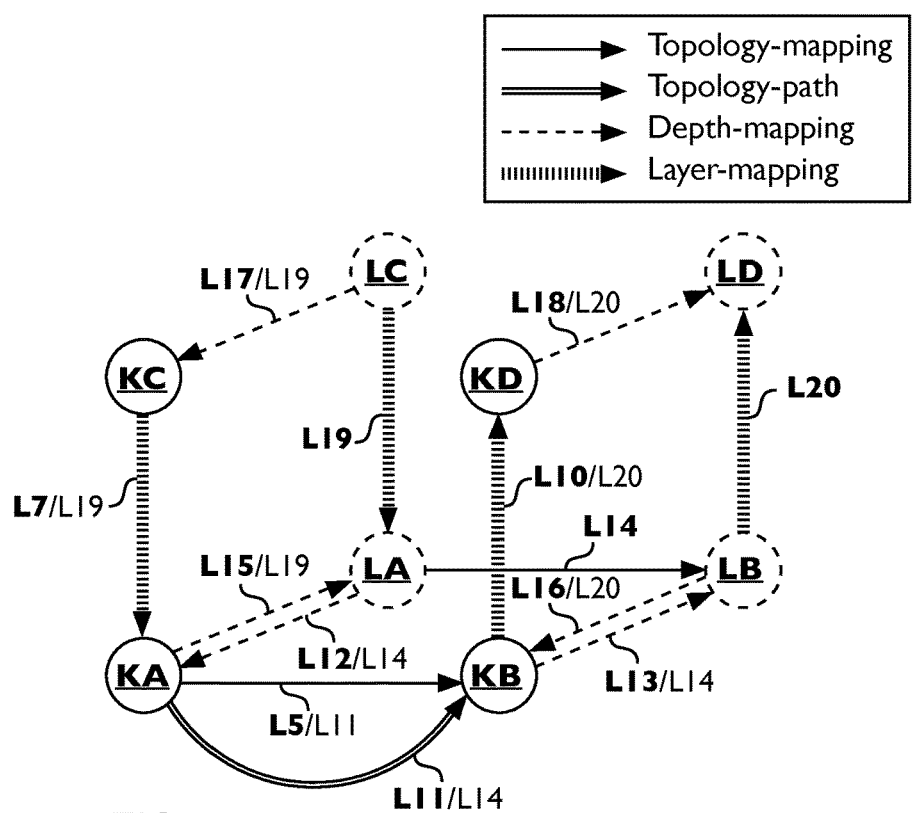
FIG. 5D is a diagram showing networks KA, KB, KC, KD, LA, LB, LC, LD and additional to FIG. 5C calculating and storing a layer-mapping named L19 from network LC to network LA as a concatenation of a depth-mapping named L17 from network LC to network KC, a layer-mapping named L7 from network KC network KA and a depth-mapping named L15 from network KA to network LA and calculating and storing a layer-mapping named L20 from network LB to network LD as a concatenation of a depth-mapping named L16 from network LB to network KB, a layer-mapping named L10 from network KB network KD and a depth-mapping named L18 from network KD to network LD.

As shown in FIG. 5D, by applying the first method and second method for calculating a layer-mapping, we calculate and store a layer-mapping named L19 from network LC to network LA as a concatenation of a depth-mapping named L17 from network LC to network KC, a layer-mapping named L7 from network KC network KA and a depth-mapping named L15 from network KA to network LA and we calculate and store a layer-mapping named L20 from network LB to network LD as a concatenation of a depth-mapping named L16 from network LB to network KB, a layer-mapping named L10 from network KB to network KD and a depth-mapping named L18 from network KD to network LD.

Figure 5E:
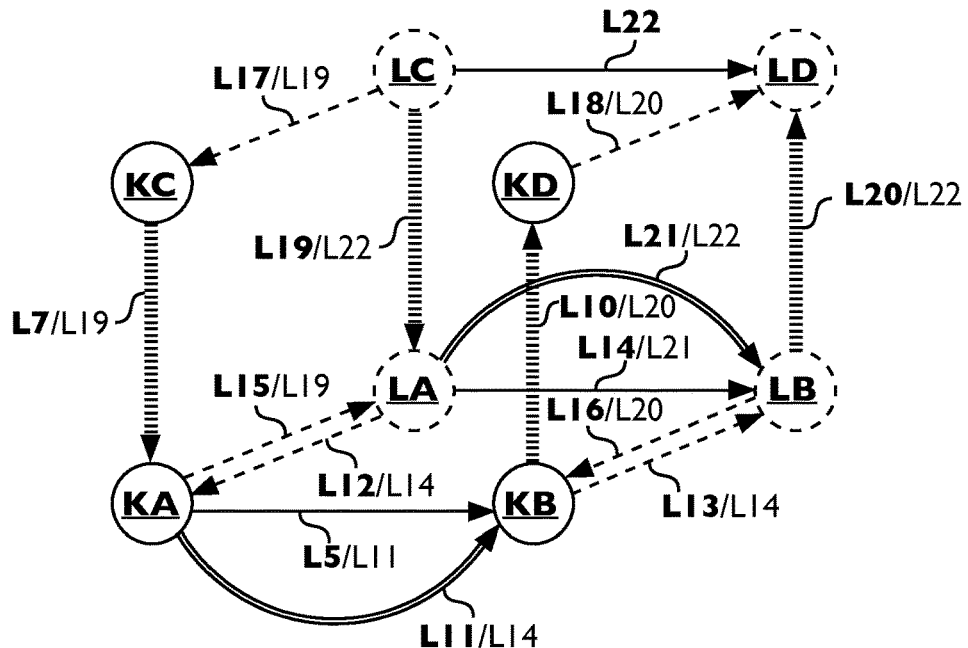
FIG. 5E is a diagram showing networks KA, KB, KC, KD, LA, LB, LC, LD and additional to FIG. 5D calculating and storing a topology-mapping named L22 from network LC to network LD as a concatenation of a layer-mapping named L19 from network LC to network LA, a topology-path named L21 from network LA network LB and a layer-mapping named L20 from network LB to network LD, the topology-path named L21 being a single topology-mapping named L14 from network LA to network LB.

As shown in FIG. 5E, by applying the second method for calculating a topology-mapping, we calculate and store a topology-mapping named L22 from network LC to network LD as a concatenation of a layer-mapping named L19 from network LC to network LA, a topology-path named L21 from network LA network LB and a layer-mapping named L20 from network LB to network LD, the topology-path named L21 from network LA to network LB comprising of a single topology-mapping named L14 from network LA to network LB.

Figure 5F:
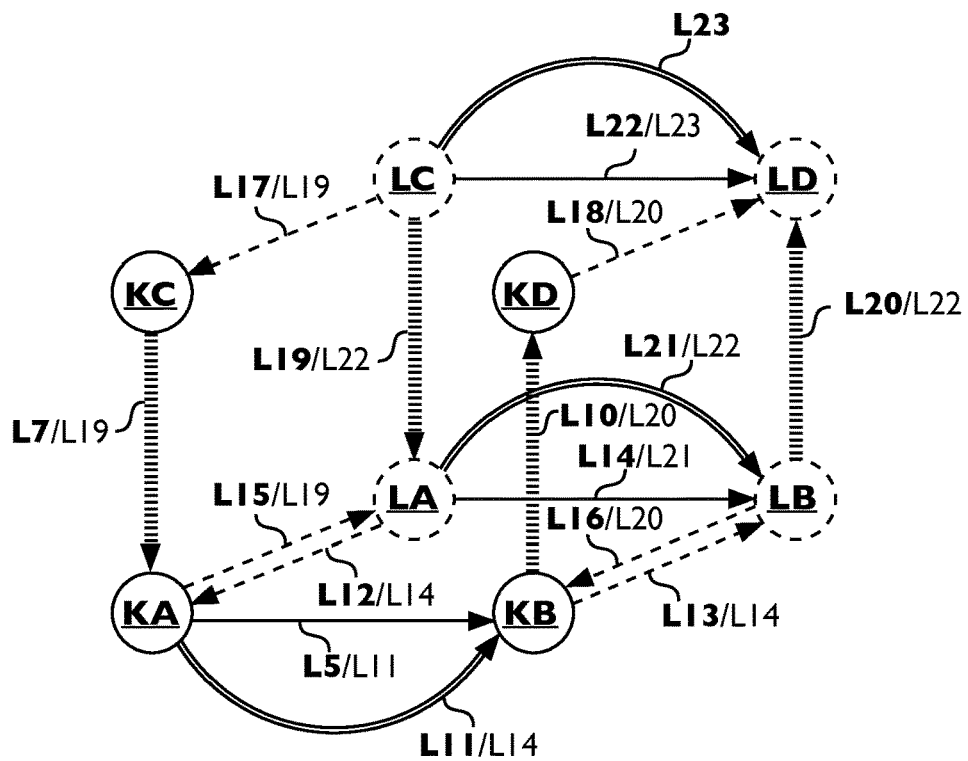
FIG. 5F is a diagram showing networks KA, KB, KC, KD, LA, LB, LC, LD and additional to FIG. 5E calculating and storing a topology-path named L23 from network LC to network LD as a single topology-mapping named L22 from network LC to network LD.

As shown in FIG. 5F, we calculate and store a topology-path named L23 from network LC to network LD as a single topology-mapping named L22 from network LC to network LD.

FIG. 7B shows the creation of topology-paths L11, L21 and L23, topology-mappings L14 and L22 and layer-mappings L19 and L20 using the notation of FIG. 6C. The edge-relationships shown in FIG. 5F can be used to calculate a set of edge-relationships through recursion. Here, the term "recursion" refers to a mathematical recursion operation. Said set of edge-relationships comprises of nested edge-relationships. Here, the term "nested" in "nested edge-relationship" refers to edge-relations having a mathematically nested format.

As an example but not limited to, the topology-mapping from network KA to network KB has edge-relationship L5/L11, the topology-path from network KA to network KB has edge-relationship L11/L14, the topology-mapping from network LA to network LB has edge-relationship L14/L21, the topology-path from network LA to network LB has edge-relationship L21/L22, the topology-mapping from network LC to network LD has edge-relationship L22/L23 and the topology-path from network LC to network LD has name L23, therefore the topology-mapping named L11 from network KA to network KB has an example set of edge-relationships L5/L11/L14/L21/L22/L23. We refer to a single edge-relationship and to two or more edge-relationships combined through recursion as a set of edge-relationships. A first example but not limited to of a set of edge-relationships of topology-mapping named L5 is L5/L11/L14/L21/L22/L23. A second example but not limited to of a set of edge-relationships of topology-mapping named L5 is L5/L14/L23.

Note that the first edge name in a set of edge-relationships is the name of said edge. We calculate the recursive-path of the requested topology-path L23 through recursion and store the nested edge-relationships in a set of edge-relationships for each edge. Here, a recursive-path is defined as a path that is calculated using recursion as a mathematical technique. An example of a recursive-path is L23 in FIG. 5F.

FIG. 7C illustrates the calculation of a recursive-path of the topology-path named L23 from network LC to network LD. As shown in FIG. 5F, above we calculated and stored a topology-path named L23 from network LC to network LD as the single topology-mapping named L22 from network LC to network LD, and represented the topology-path named L23 in FIG. 7B as "toppath L23=L22/L23", per the notation described above, shown in step 1. Using the relationships shown in FIG. 7B we recursively calculate the recursive-path and a set of edge-relationships comprising nested edge-relationships for each edge as shown in step 5 of FIG. 7C. Steps 2 through 4 of FIG. 7C are intermediate steps in the calculation. In FIG. 6D a notation for a topology-path, level-path or topology-level-path is shown, using the notations of FIGS. 6A, 6B and 6C. In step 6 of FIG. 7C the recursive-path of step 5 is shown using the notation of FIG. 6D by combining step 5 of FIG. 7C with FIG. 7A.

Figure 8:
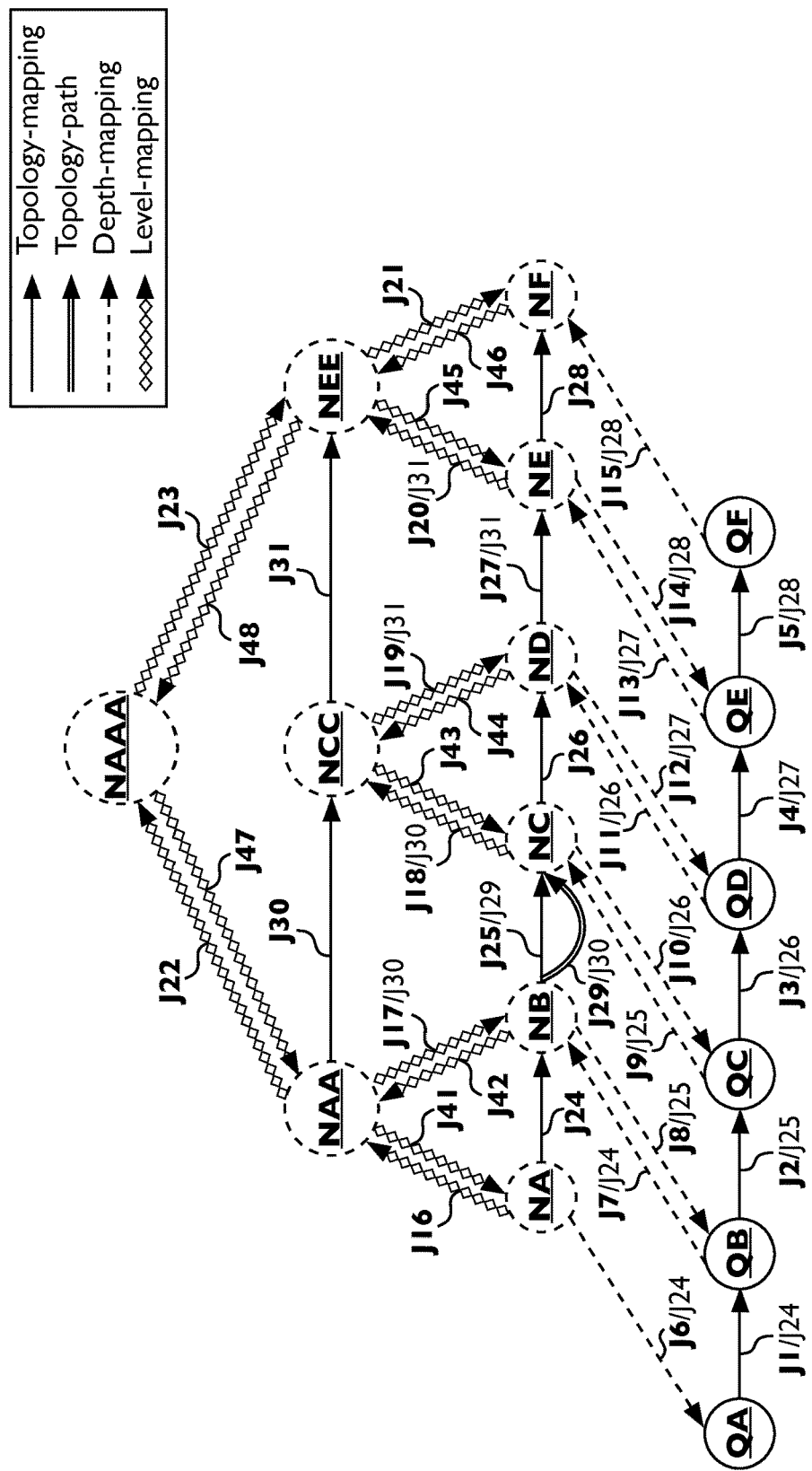
FIG. 8 is a diagram showing logical network NAAA at (d=1, n=0, h=2) consisting of logical networks NAA, NCC and NEE at (d=1, n=0, h=1). Logical Network NAA consisting of networks logical networks NA and NB at (d=1, n=0, h=0). Logical Network NCC consisting of logical networks NC and ND at (d=1, n=0, h=0). Logical network NEE consisting of networks NE and NF at (d=1, n=0, h=0).

We now include the naming of edges in a set of hierarchical networks. FIG. 8 shows networks NAAA, NAA, NCC, NEE, NA, NB, NC, ND, NE, NF, QA, QB, QC, QD, QE, QF and the topology-mappings at (d=0, n=0, h=0), the topology-mappings at (d=1, n=0, h=0) and the depth-mappings, being a representation using directed edges of the network shown in FIGS. 4A and 4B. Note that each a level-mapping of FIG. 4B being a relationship between a first network at level h and a second network at level h+1, such as but not limited to, the level-mapping between network NAA and network NAAA, is represented by a pair of level-mappings being directed edges, such as but not limited to, a level-mapping from network NAA to network NAAA and a level-mapping from network NAAA to network NAA. The level-mapping from network NAA to network NAAA is named J22 and is shown in FIG. 8. The level-mapping from network NAAA to network NAA is named J47 and is shown in FIG. 8. PCT/EP2014/055640 (FIG. 53E) describes physical topology-mappings, depth-mappings and level-mappings, per the notation of FIG. 6A. As shown in FIG. 8 we calculate and store a topology-mapping named J30 from network NAA to network NCC as a concatenation of a level-mapping named J17 from network NAA to network NB, a topology-path named J29 from network NB network NC and a level-mapping named J18 from network NC to network NCC, the topology-path named J29 from network NB to network NC comprising of a single topology-mapping named J25 from network NB to network NC, using the third method for calculating topology-mappings described above. We calculate and store a topology-mapping named J31 from network NCC to network NEE as a concatenation of a level-mapping named J19 from network NCC to network ND, a topology-mapping named J27 from network ND network NE and a level-mapping named J20 from network NE to network NEE, using the third method for calculating topology-mappings described above. By creating the topology-mappings named J30 and J31 we can specify forwarding behavior between networks-of-nodes NAA, NCC and NEE. As will be understood by a person skilled in the art, the creation of topology-mappings can be repeated at arbitrary number of hierarchy levels. PCT/EP2014/055640 (pages 213) describes how a level-path is changed to a topology-path.

In order to allow for packet forwarding or switching in a Packet Switched Network (PSN) comprising of packet-switching nodes or relaying or switching of a physical signal in a non-packet-switching network, above we assign zero or one switching-identifiers per topology-mapping, topology-path, level-path and topology-level-path. (cf. PCT/EP2014/055640 page 188). A switching-identifier depends on the depth d and layer n in which a topology is created comprising of networks and topology-mappings. Networks at a particular depth d and layer n are either all packet-switched networks or all non-packet-switched-networks. Nodes at a particular depth d and layer n are either all packet-switched nodes or all non-packet-switched-nodes. We distinguish between the following types, but not limited to, of switching-identifiers:

i. switching-identifiers at depth d=0 and at arbitrary layer n comprising of a physical signal, the nodes at depth d and layer n being non-packet-switching nodes.

ii . . . switching-identifiers at depth d=0 and a layer performing Media Access Control (MAC), the nodes at depth d and layer n being packet-switching nodes.

iii. switching-identifiers at arbitrary depth d and at arbitrary layer n comprising of logical identifiers, the nodes at depth d and layer n being packet-switching nodes.

PCT/EP2014/055640 (pages 189 through 192) describes examples of switching-identifiers of type i), type ii) and type iii).

Before or at creation a first network at a depth d, layer n the SDN Compiler should be instructed by a user, such as for example, but not limited to a network administrator (cf. PCT/EP2014/055640 page 191):

i. whether networks at said depth d and said layer n are packet-switching networks or non-packet-switching networks ii. how to construct switching-identifiers for said depth d and said layer n. PCT/EP2014/055640 (pages 192, 201 through 203) describes examples of how to construct switching-identifiers.

This is done at initialization of said depth d and said layer n, as this information is identical for each network at said depth d and said layer n. This is done at initialization of said depth d and said layer n, therefore a user of an SDN Compiler will not have to specify this information with each network that is created. The information at i) above is used by the SDN Compiler to select the method for creation of forwarding entries for a physical packet-switching node or of forwarding entries for a physical non-packet-switching node.

In the method we calculate from said recursive-path forwarding entries for a requested topology-level-path. The recursive-path contains the following information for each node at d=0, h=h_min being a physical node (cf. PCT/EP2014/055640 pages 192 and 193):

an input port, being a PoA between the physical or virtual node and a topology-mapping or a layer-mapping, with the exception of the first node in the recursive-path which does not have an input port as the packet or signal is created by the first node in the recursive-path an output port, being a PoA between the physical or virtual node and a topology-mapping or a layer-mapping, with the exception of the last node in the recursive-path which does not have an output port as the packet or signal is received by the last node in the recursive-path Additionally, when a set of edge-relationships has been calculated for each edge, the recursive-path also contains:

a set of incoming edge-relationships at the incoming topology-mapping or layer-mapping with the exception of the first node in the recursive-path which does not have an incoming topology-mapping or a layer-mapping a set of outgoing edge-relationships at the outgoing topology-mapping or layer-mapping with the exception of the last node in the recursive-path which does not have an outgoing topology-mapping or a layer-mapping The combination of above input port, output port, a set of incoming edge-relationships, a set of outgoing edge-relationships, and switching-identifiers result in forwarding entries for physical nodes, also referred to as forwarding instructions, will be further explained in an example below. Forwarding entries for each physical node in the recursive-path comprise of an input port, an output port, the switching-identifiers of incoming set of edge-relationships and the switching-identifiers of outgoing set of edge-relationships. Above forwarding entries, are send to the physical nodes in the recursive-path, either directly or indirectly, as an example but not limited to, through an SDN Controller.PCT/EP2014/055640 (page 197) describes that for a node the number of edges within a set of incoming edge-relationships may be reduced by determining a relevant incoming set of edge-relationships. For a node, the relevant incoming set of edge-relationships are the set of edge-relationships of an incoming topology-mapping or an incoming layer-mapping at depth, layer, level of said node and at depth, layer, level of all networks in the recursive-path mapped to said node through one or more depth-mappings. PCT/EP2014/055640 (page 197) describes that for a node the number of edges within a set of outgoing edge-relationships may be reduced by determining a relevant outgoing set of edge-relationships. For a node, the relevant outgoing set of edge-relationships are the set of edge-relationships of an outgoing topology-mapping or an outgoing layer-mapping at depth, layer, level of said node and at depth, layer, level of all networks in the recursive-path mapped to said node through one or more depth-mappings.

In order to create appropriate forwarding instructions we distinguish between a physical node in a Packet-Switching Network (PSN) and a physical node in a non-PSN. A physical node in a PSN, referred to as a physical packet-switching node, performs forwarding and statistical multiplexing of packets. A physical node in a non-PSN, referred to as physical non-packet-switching node, performs relaying and multiplexing of physical signals. An example, but not limited to, of a non-PSN is a Circuit-Switching Node (CSN). An example, but not limited to, of a non-PSN is a node in a wireless network performing multiplexing of physical signals. PCT/EP2014/055640 (pages 193 and 194) describes the calculation of forwarding entries for a physical packet-switching node. PCT/EP2014/055640 (pages 195 and 196) describes the calculation of forwarding entries for a physical non-packet-switching node. PCT/EP2014/055640 (pages 198 through 200) describes the creation of a single forwarding entry for a physical equipment comprising of two or more physical nodes.

When creating a topology-mapping, layer-mapping, topology-path, level-path or topology-level-path per above described method, optionally one or more requirements are taken into account when creating said topology-mapping, layer-mapping, topology-path, level-path or topology-level-path (cf PCT/EP2014/055640 page 221). Only if said topology-mapping, layer-mapping, topology-path, level-path or topology-level-path complies with said one or more requirements, said topology-mapping, layer-mapping, topology-path, level-path or topology-level-path is created. In other words, a topology-mapping, layer-mapping, topology-path, level-path or topology-level-path is only created when requirements for said topology-mapping, layer-mapping, topology-path, level-path or topology-level-path are met by the calculated said topology-mapping, layer-mapping, topology-path, level-path or topology-level-path. A requested topology-path, level-path or topology-level-path can be considered as a service for a user (cf. PCT/EP2014/055640 page 222). An example, but not limited to, of said user being a person, an organization, an application. Typically, the requirements of said service are stored in a contract, being a Service-Level-Agreement (SLA) between said user and the provider of said service. As will be understood be a person skilled in the art, the above method allows said provider of said service to offer much richer services, based on said more complex requirements that can be used when establishing said service. Edge-relationships are used to determine the impact of any changes in a set of networks. As an example, but not limited to, as shown in FIG. 50C the topology-mapping named L5 from network KA to network KB is with edge-relationship L5/L11, therefore if the first edge named L5 is changed, the second edge named L11 is impacted. In case the topology-mapping named L5 is deleted, for example but not limited to, the topology-mapping L5 being a physical fiber link which is cut, the topology-mapping named L11 is impacted, as per the edge-relationship L5/L11, and will have to be recalculated by the SDN Compiler. In case the topology-path L23 is a requested topology-path and the topology-path named L23 can not be recalculated, as in the example of FIG. 50F, the Service-Level-Agreement (SLA) of said requested topology-path is violated.

Note that the described method allows for multi-layer survivability in a set of networks. Also, note that the described method allows for a much deeper analysis of SLA's. As an example but not limited to a large number of failure scenario's could be simulated from the information stored by the method and the impact on one or more SLA's could be determined. As an example but not limited to this allows for checking SLA violation probability versus incurred penalties of said SLA violation. Note that the described method allows for storing each SLA violation, therefore building a record for said SLA.

Reference is made to forwarding entries also in the case of a non-packet-switching network as the SDN Compiler provides a uniform approach to create instructions for both packet-switching nodes and non-packet-switching nodes. A forwarding entry in case of a non-packet-switching network is an instruction specifying how an incoming signal at an input port should be relayed to an output port after optional modification of said incoming signal. As an example but not limited to, in case of a WDM ROADM, the SDN Compiler creates an instruction specifying how an incoming wavelength at an input port should be relayed, also referred to as cross-connected, to an output port after optional modification of said incoming wavelength, such as for example changing the frequency of the incoming wavelength. Forwarding entries, are send to the physical nodes in the recursive-path, either directly or indirectly, as an example but not limited to, through an SDN Controller.

Figure 9:
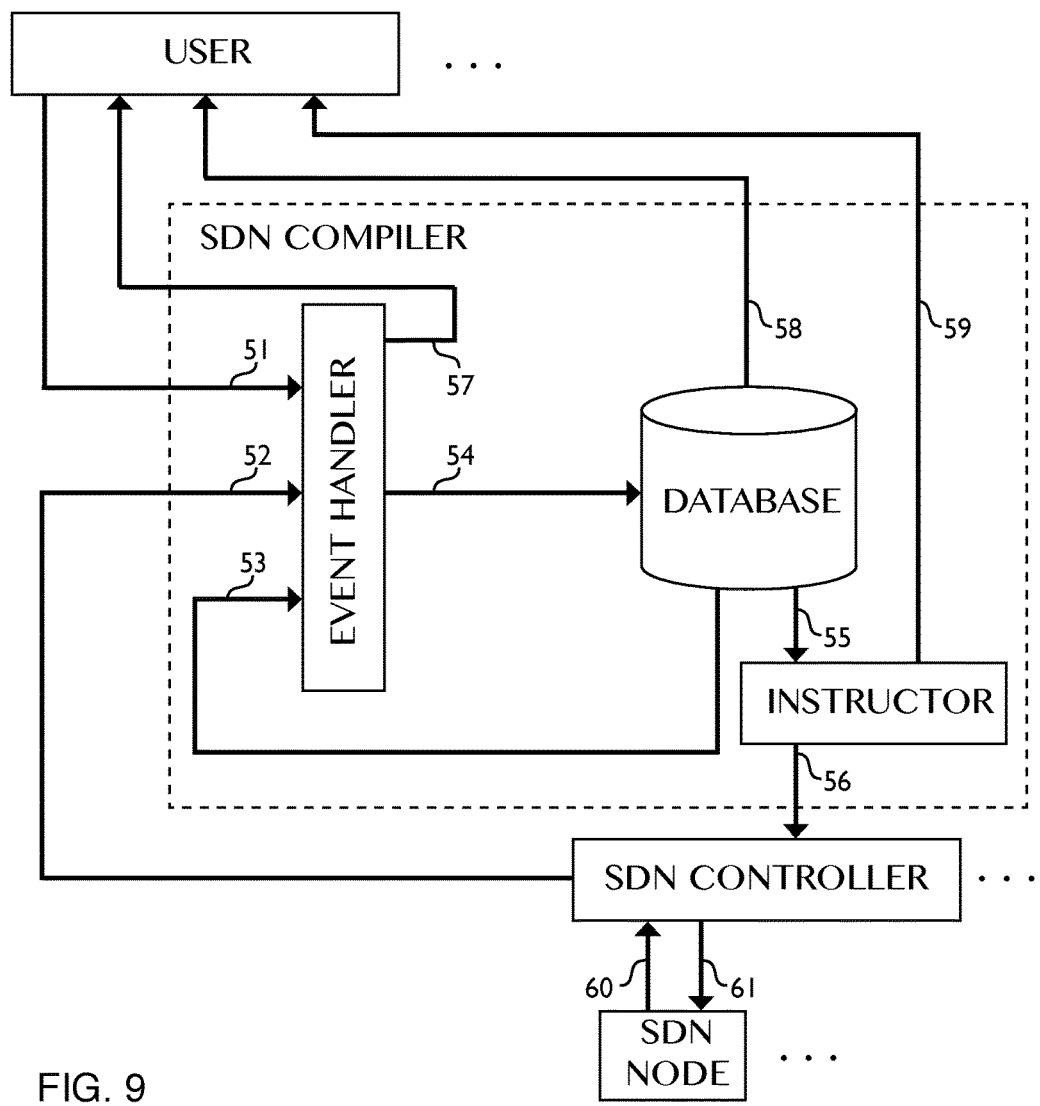
FIG. 9 is a diagram showing an example SDN Compiler apparatus comprising of a Database, an Event Handler and an Instructor.

The method described can be implemented using a graph database, wherein networks, mappings, topology-paths, level-paths and topology-level-paths are stored in a graph database, wherein a network is stored as a named vertex in a graph database, wherein a mapping, being a topology-mapping, depth-mapping, layer-mapping or level-mapping is stored as a named and directed edge in a graph database, wherein a topology-path, level-path or topology-level-path is stored as a named and directed edge in a graph database, wherein properties of said networks are stored as vertex attributes in said graph database, wherein properties of said mappings are stored as edge attributes in said graph database, wherein properties of said topology-paths, level-paths or topology-level-paths are stored as edge attributes in said graph database (cf PCT/EP2014/055640 FIG. 57, pages 145 and 230). The type of mapping and the direction of said mapping can be stored as an edge type in said graph database. The type of topology-level-path, being a topology-path, level-path or topology-level-path can be stored as an edge type in said graph database. An example of a type of mapping and a direction of said mapping is an increasing depth-mapping. A graph database supporting more than one edge type is typically referred to as a graph database supporting property graphs. A graph database is typically, but not limited to, based on a property graph model consisting of vertices having properties and directed edges having properties. The network properties within the SDN Compiler method can be stored as vertex properties. Such vertex properties, also referred to as vertex attributes, could comprise the network-related inputs of the SDN Compiler method described above as well as additional network information such as for example but not limited to geographic longitude of the physical or virtual node, geographic latitude of the physical or virtual node and uptime of the node. The topology-mapping, layer-mapping and depth-mapping properties within the SDN Compiler method can be stored as edge properties. The first method to calculate a topology-mapping, the second method to calculate a topology-mapping, the third method to calculate a topology-mapping, the first method to calculate a layer-mapping, the second method to calculate a layer-mapping, the method to calculate a topology-path, the method to calculate a level-path and the method to calculate a topology-level-path, used to create or recalculate a mapping or a topology-path, level-path or topology-level-path, can be implemented as a query in a graph database. Additional requirements as described above can be included in such query. As an example, but not limited to, a query of the first method to calculate a topology-mapping could be a graph database query for a path from a first node to a second node matching a depth-mapping decreasing in depth from said first node to a third node, matching a depth-mapping increasing in depth from a fourth node to said second node, matching a topology-path from said third node to a fourth node. Optionally, additional requirements could be specified in said example query. We now consider an example SDN Compiler apparatus comprising of a Database, an Event Handler and an Instructor, as shown in FIG. 9 (cf. PCT/EP2014/055640 FIG. 57, page 232). FIG. 9 also shows the USER of the SDN Compiler, one ore more SDN Controllers and one or more physical SDN nodes. All information of the networks, topology-mappings, depth-mappings, layer-mappings, level-mappings, topology-paths, level-paths, topology-level-paths in stored in a database. An example, but not limited to, such a database is a graph database. The event handler handles all incoming events from the USER, one or more SDN Controllers and from the database. Alternatively, the database could directly query itself, but to allow for event-handling and prioritization database requests from to database to the database flow through the event-handler. The event-handler allows for event prioritization and protects the database from query attacks.

The instructor is responsible for creating forwarding entries for a user-requested topology-path, level-path or topology-level-path after this topology-path, level-path or topology-level-path is created in the database. One or more SDN controllers can send requests to the event handler. Alternatively, an additional monitor could be used that polls one or more SDN Controllers.

In FIG. 9 the following message flows are shown:

51 USER to EVENT HANDLER, for example for GET request, scripting, command interface, GUI.

52 SDN CONTROLLER to EVENT HANDLER

53 DATABASE to EVENT HANDLER, for example for requirement violations triggering recalculation and error reporting.

54 DATABASE QUERY+ACTION from EVENT HANDLER TO DATBASE

55 DATABASE to INSTRUCTOR, comprising of requested topology-path, level-path or topology-level-path information 56 INSTRUCTOR to CONTROLLER, comprising forwarding instructions 57 EVENT HANDLER to USER, for example for error reporting 58 DATABASE to USER, for example for viewing, error reporting 59 INSTRUCTOR to USER, for example for error reporting, for statistics 60 NODE to CONTROLLER for example for error reporting, for status reporting 61 SDN CONTROLLER to NODE, comprising forwarding instructions Note that said event handler translates a logical network specification, specified by a user of an SDN Compiler, to a database query using any of the methods to create such logical network specification, such as for example but not limited to the first method to create a topology-mapping.

Reference is made to forwarding entries also in the case of a non-packet-switching network as the SDN Compiler provides a uniform approach to create instructions for both packet-switching nodes and non-packet-switching nodes (cf PCT/EP2014/055640 page 196). A forwarding entry in case of a non-packet-switching network is an instruction specifying how an incoming signal at an input port should be relayed to an output port after optional modification of said incoming signal. Note that in a non-packet-switched network in which no logical nodes and networks exist, to which above method applies, one or more topology-mappings can be created using the second method to create topology-mappings, forwarding entries can be calculated using the method to calculate forwarding entries for non-packet-switching nodes, edges can be recalculated, a service can be requested in accordance with a set of requirements. As an example, but not limited to, the above method can be implemented using a graph database.

PCT/EP2014/055640 (pages 207 through 211, FIG. 52N) describes that as an alternative to creating logical nodes, a logical name can be assigned to a physical node and/or a physical topology-mapping and/or a physical PoA.

PCT/EP2014/055640 (pages 234 through 240, FIG. 59B) describes an example of a non packet-switching network, with or without logical nodes.

In order to support multi-tenancy and to provide each tenant with its own address space, isolated from other tenants, the network at the highest hierarchy level in the namespace for each tenant should be globally unique to ensure isolation from other tenants. As an example, but not limited to, the highest hierarchy level could be an IPv6 flow label or could be an IPv4 identification field repurposed to denote a tenant. As will be understood by a person skilled in the art, much more complex topologies are supported by the SDN Compiler than the relatively simple topologies used in the examples above used to describe the SDN Compiler method. As will be understood by a person skilled in the art, various methods described above fall with the scope of the present invention, such as for example but not limited to, multicasting, tunneling, label-switching.

The SDN Compiler method described in PCT/EP2014/055640 is extended to determine depth-mappings, relating nodes at different depths, by an SDN Compiler based on requirements of logical nodes, logical-topology-mappings, and optionally logical layer-mappings, specified by a user of an SDN Compiler. Said extension allows a user of an SDN Compiler to specify logical nodes, requirements of logical nodes, logical topology-mappings and requirements of logical topology-mappings, and optionally logical layer-mappings and requirements of logical layer-mappings and have said SDN Compiler determine physical and/or virtual resources, comprising of physical nodes and physical links, against which said logical specification can be compiled, thereby determining the relationships between logical nodes and physical nodes as represented by depth-mappings, physical topology-paths, and optionally physical layer-mappings.

As an example, but not limited to, a user of an SDN Compiler could specify a first logical node denoting logical compute and a second logical node denoting logical compute and a topology-mapping from said first logical node to said second logical node, and nodes, topology-mappings and layer-mappings at one or more lower layers and have said SDN Compiler determine physical and/or virtual resources against which said logical specification can be compiled, thereby determining the relationships between logical nodes and physical nodes as represented by depth-mappings, physical topology-paths, and optionally physical layer-mappings.

Figure 11A:
FIG. 11A is a diagram showing a logical node FE, a logical node FF, and a logical node FG.

The method is explained using a first example shown in FIGS. 11A through 11I and FIGS. 12A through 12J. Note that the method can be applied to an arbitrary overall network, and is not limited to the examples presented. We consider three logical nodes named FE, FF and FG as shown in FIG. 11A. Logical nodes FE and FG are logical host nodes and logical node FF is a logical switch node. FIG. 11A also shows a topology-mapping from logical node FE to logical node FF and a topology-mapping from logical node FF to logical node FG, represented as directed edges in a graph. A user of an SDN Compiler would specify the logical nodes FE, FF and FG and the topology-mappings shown in FIG. 11A.

It is our objective to have an SDN Compiler determine physical and/or virtual resources, comprising of physical nodes and physical links, against which the logical specification shown in FIG. 11A can be compiled.

To do so, we define "known physical nodes" and "unknown physical nodes". In the network model, logical nodes can be mapped to "known" and/or "unknown" physical nodes through depth-mappings. "Known physical nodes" are "physical nodes" which are existing or still to be setup (virtual) nodes in the network and of which the physical node names are stored in one or more databases which are directly or indirectly accessible to the compiler. Below, the label "known" will not always be used if the context does not require so. The term "unknown physical node" is used to define an imaginary physical node to which logical nodes can be mapped through depth-mappings and which are to be substituted by a physical node of the network of which the physical node name is stored in said database(s). Such unknown physical nodes can advantageously be used in a method of building the network model in case of cloud computing, as will be explained in more detail below.

Also, we define "known physical topology-paths" and "unknown physical topology-paths". "Known physical topology-paths" are "physical topology-paths" which are existing or still to be setup topology-paths in the network between two physical nodes and of which the physical topology-path names are stored or to be stored in one or more databases which are directly or indirectly accessible to the compiler. Below, the label "known" will not always be used if the context does not require so. The term "unknown physical topology-path" is used to define an imaginary physical topology-path between either two "unknown physical nodes" or between one "unknown physical node" and a "known physical node". Such an "unknown physical topology-path" is to be substituted by a physical topology-path of the network of which the physical topology-path name is stored or to be stored in said database(s), said physical topology-path being a concatenation of one or more existing or still to be setup physical topology-mappings. Such unknown physical topology-paths can advantageously be used in a method of building the network model, as will be explained in more detail below.

Also, we define "known physical layer-mapping" and "unknown physical layer-mapping". "Known physical layer-mappings" are "physical layer-mappings" which are existing or still to be setup layer-mappings in the network between two physical nodes and of which the physical layer-mapping names are stored in one or more databases which are directly or indirectly accessible to the compiler. Below, the label "known" will not always be used if the context does not require so. The term "unknown physical layer-mapping" is used to define an imaginary physical layer-mapping between either two "unknown physical nodes" or between one "unknown physical node" and a "known physical node". Such an "unknown physical layer-mapping" is not (yet) linked to a physical layer-mapping of which the physical layer-mapping name is stored in said database(s). Such unknown physical layer-mappings can advantageously be used in a method of building the network model, as will be explained in more detail below.

It is observed that, for the sake of efficiency, apart from the terms "physical node", "known physical node", and "unknown physical node" as defined above, the term "known/unknown physical node" is used. This latter term refers to a set comprising all known and unknown physical nodes and each member of this set may either be a known or an unknown physical node. "Known/unknown physical node names" are names of these "known/unknown physical nodes".

Similarly, for the sake of efficiency, apart from the terms "physical topology-path", "known physical topology-path", and "unknown physical topology-path" as defined above, the term "known/unknown physical topology-path" is used. This latter term refers to a set comprising all known and unknown physical topology-paths and each member of this set may either be a known or an unknown physical topology-path. "Known/unknown physical topology-path names" are names of these "known/unknown physical topology-paths".

The following actions are performed:
a) For each logical node not mapped to a known physical node through one or more depth-mappings creating at least one unknown physical node and storing an unknown physical-node name of said unknown physical node. This action is relating to action b) of claim 1).
b) For each logical node not mapped to a physical node through one or more depth-mappings creating a depth-mapping from said logical node not mapped to a known physical node to said unknown physical node, and creating a depth-mapping from said unknown physical node to said logical node not mapped to a known physical node, said depth-mappings being based on a directed graph representation, This action is relating to action c) of claim 1).
c) Creating and storing one or more logical topology-mappings, each logical topology-mapping being a directed graph representation from a first logical node to a second logical node, calculated as a concatenation of a first depth-mapping from the first logical node to a first known/unknown physical node, a known/unknown physical topology-path from the first known/unknown physical node, to a second known/unknown physical node, and a second depth-mapping from the second known/unknown physical node to the second logical node, said known physical topology-path being a concatenation of one or more physical topology-mappings, said unknown physical topology-path being created and stored. Note that said one or more logical topology-mappings are calculated using the first method to calculate a topology-mapping, This action is relating to action d) of claim 1).
d) Determining a suitable physical node in the overall network for each unknown physical node and determining a suitable physical topology-path in the overall network for each unknown physical topology-path by performing a search comprising matching each unknown physical topology-path with one of a set of suitable physical topology-paths, and matching each unknown physical node with one of a set of suitable physical nodes, and replacing and storing each unknown physical topology-path by said one of said set of suitable physical topology-paths, said one of said suitable physical topology-paths being a concatenation of one or more physical topology-mappings, and replacing each unknown physical node by said one of said set of suitable physical nodes in accordance with a result of said search. Here, the "physical nodes" and "physical topology-paths" respectively are entities available for use. They may already be in existence or still to be set up on demand: e.g., a node can be implemented by a virtual machine that is not yet in existence but can be requested by the SDN compiler (or other unit) to be set up when necessary. This action is relating to action e) of claim 1).

Figure 11B:
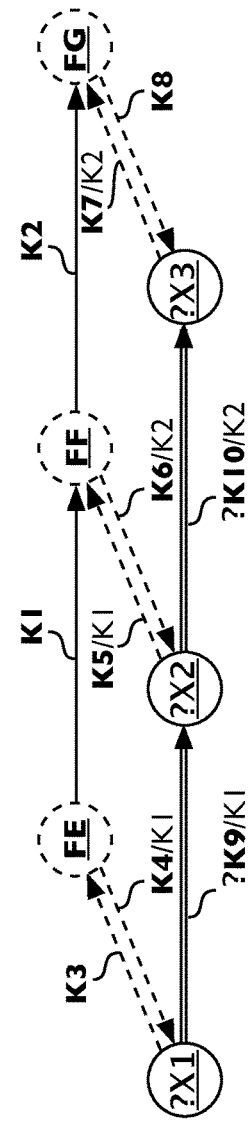
FIG. 11B is a diagram showing a logical node FE at (d=1, n=0, h=0), a logical node FF at (d=1, n=0, h=0) and a logical node FG at (d=1, n=0, h=0), an unknown physical node ?X1 at (d=0, n=0, h=0), an unknown physical node ?X2 at (d=0, n=0, h=0) and an unknown physical node ?X3 at (d=0, n=0, h=0).

Actions a), b) and c) are illustrated by FIG. 11B. FIG. 11B shows a logical node FE at (d=1, n=0, h=0), a logical node FF at (d=1, n=0, h=0) and a logical node FG at (d=1, n=0, h=0). Said logical nodes FE, FF and FG were shown in FIG. 11A as well. Per action a) above, as logical node FE is not mapped to a known physical node, we create an unknown physical node ?X1 at (d=0, n=0, h=0). In FIG. 11B the questions mark before X1 in "?X1" indicates that X1 is an unknown physical node. As logical node FF is not mapped to a known physical node, we create an unknown physical node ?X2 at (d=0, n=0, h=0). In FIG. 11B the questions mark before X2 in "?X2" indicates that X2 is an unknown physical node. As logical node FG is not mapped to a known physical node, we create an unknown physical node ?X3 at (d=0, n=0, h=0). In FIG. 11B the questions mark before X3 in "?X3" indicates that X3 is an unknown physical node. Note that in this example unknown physical nodes are created at d=0 and at identical layer n as the logical node said unknown physical node is mapped to through a depth-mapping and at identical level h as the logical node said unknown physical node is mapped to through a depth-mapping. In general, for a logical node at (d, n1, h1) an unknown physical node at (d−x, n2, h2) can be created with x being larger than zero and smaller than or equal to d, where n1 may be equal to n2 and where h1 may be equal to h2. Per action b) above, a depth-mapping named K3 is created from unknown physical node ?X1 to logical node FE, a depth-mapping named K4 is created from logical node FE to unknown physical node ?X1, a depth-mapping named K5 is created from unknown physical node ?X2 to logical node FF, a depth-mapping named K6 is created from logical node FF to unknown physical node ?X2, a depth-mapping named K7 is created from unknown physical node ?X3 to logical node FG, a depth-mapping named K8 is created from logical node FG to unknown physical node ?X3. FIG. 11B shows depth-mappings named K3 through K8. FIG. 11C shows depth-mappings named K3 through K8, per the notation of FIG. 6A. Therefore, actions a) and b) for the above described example is:
  a) For each logical node (FE; FF; FG) not mapped to a known physical node through one or more depth-mappings creating at least one unknown physical node (?X1; ?X2; ?X3) and storing an unknown-physical-node name of said unknown physical node (cf. FIG. 11B),
  b) For each logical node not mapped to a physical node through one or more depth-mappings creating a depth-mapping (K4; K6; K8) from said logical node (FE; FF; FG) not mapped to a known physical node to said unknown physical node (?X1; ?X2; ?X3), and creating a depth-mapping (K3; K5; K7) from said unknown physical node (?X1; ?X2; ?X3), to said logical node (FE; FF; FG) not mapped to a known physical node, said depth-mappings being based on a directed graph representation (cf. FIG. 11B), Per action c) above, a topology-mapping named K1 is created using the first method to calculate a topology-mapping, comprising of a concatenation of the depth-mapping named K4, an unknown topology-path named ?K9 and the depth-mapping named K5, as shown in FIG. 11B. In FIG. 11B the questions mark before K9 in "?K9/K1" indicates that K9 is an unknown physical topology-path. Note that the unknown physical topology-path named ?K9 is created and stored during this step. Also, a topology-mapping named K2 is created using the first method to calculate a topology-mapping, comprising of a concatenation of the depth-mapping named K6, an unknown topology-path named ?K10 and the depth-mapping named K7, as shown in FIG. 11B. In FIG. 11B the questions mark before K10 in "?K10/K2" indicates that K10 is an unknown physical topology-path. Note that the unknown physical topology-path named ?K10 is created and stored during this step. FIG. 11D shows topology-mappings K1 and K2, as described above, per the notation of FIG. 6C. In FIG. 11D the question marks denote that the edges named ?K9 and ?K10 are unknown topology-paths rather than topology-paths. Therefore, action c) for the above described example is:

c) Creating and storing one or more logical topology-mappings (K1; K2), each logical topology-mapping (K1; K2) being a directed graph representation from a first logical node (FE; FF) to a second logical node (FF; FG), calculated as a concatenation of a first depth-mapping (K4; K6) from the first logical node (FE; FF) to a first known/unknown physical node (?X1; ?X2), a known/unknown physical topology-path (?K9; ?K10) from the first known/unknown physical node (?X1; ?X2), to a second known/unknown physical node (?X2; ?X3), and a second depth-mapping (K5; K7) from the second known/unknown physical node (?X2; ?X3) to the second logical node (FF; FG), said known physical topology-path being a concatenation of one or more physical topology-mappings, said unknown physical topology-path (?K9; ?K10) being created and stored. Note that said one or more logical topology-mappings (K1; K2) are calculated using the first method to calculate a topology-mapping (cf. FIG. 11B).

As shown in of FIGS. 11E and 11F we now determine the physical entities of the topology-mappings K1 and K2 respectively, which will be used in a search at action d). Step 1) of FIG. 11E shows the topology-mapping named K1 per FIG. 11D. In step 2) of FIG. 11E, the values of the depth-mappings named K4 and K5 in step 1) of FIG. 11E have been replaced by the definition of the depth-mappings named K4 and K5 shown in FIG. 11C. Note that the topology-mapping named K1 comprises logical nodes named FE and FF, depth-mappings named K4 and K5, zero physical nodes, two unknown physical nodes named ?X1 and ?X2, one unknown physical topology-path named ?K9, zero physical topology-mappings, and zero physical point-of-attachments. Step 1) of FIG. 11F shows the topology-mapping named K2 per FIG. 11D. In step 2) of FIG. 11F, the values of the depth-mappings named K6 and K7 in step 1) of FIG. 11F have been replaced by the definition of the depth-mappings named K6 and K7 shown in FIG. 11C. Note that the topology-mapping named K2 comprises logical nodes named FF and FG, depth-mappings named K6 and K7, zero physical nodes, two unknown physical nodes named ?X2 and ?X3, one unknown physical topology-path named ?K10, zero physical topology-mappings, and zero physical point-of-attachments.

Per action d) above, we determine a suitable physical node for each unknown physical node and determine a suitable physical topology-path for each unknown physical topology-path by performing a search comprising matching each unknown physical topology-path with one of a set of suitable physical topology-paths, and matching each unknown physical node with one of a set of suitable physical nodes. As shown in FIG. 11G, we use the relationship between unknown physical nodes and unknown physical topology-paths of the topology-mapping named K1, being "?X1-?K9[toppath]/K1->?X2" as a first search statement, and we use the relationship between unknown physical nodes and unknown physical topology-paths of the topology-mapping named K2, being "?X2-?K10[toppath]/K2->?X3" as a second search statement. We create a third search statement comprising said first search statement, a logical AND, and said second search statement: "(?X1-?K9[toppath]/K1->?X2) AND (?X2-?K10[toppath]/K2->?X3)". Said third search statement is used in said search.

Note that said third search statement comprises a 'logical AND' of said first search statement and said second search statement as the objective of said search is to determine a physical node for each unknown physical node and a physical topology-path for each unknown physical topology-path, in accordance with the logical nodes and logical topology-mappings defined by the user of the SDN Compiler. Note that said search statement comprises of physical entities including nodes and topology-paths which comprise of topology-mappings being links in a single direction (including wireless links) and their relationships from multiple recursive paths, in this example unknown physical nodes ?X1, ?X2 and ?X3, and unknown physical topology-paths named ?K9 and ?K10. Said search is performed against a physical network layout comprising of physical nodes being interconnected by physical topology-mappings, said physical topology-mapping being based on a directed graph representation, as is described below.

PCT/EP2014/055640 (page 230) describes that the first method to calculate a topology-mapping, the second method to calculate a topology-mapping, the third method to calculate a topology-mapping, the fourth method to calculate a topology-mapping, the fifth method to calculate a topology-mapping, the first method to calculate a layer-mapping, the second method to calculate a layer-mapping, the method to calculate a topology-path, the method to calculate a level-path and the method to calculate a topology-level-path, used to create or recalculate a mapping or a topology-path, level-path or topology-level-path, can be implemented as a query in a graph database. Additional requirements as described above can be included in such query. As an example, but not limited to, said third search statement described above can be implemented as a query in a graph database.

In said search optionally requirements can be taken into account. Optionally, at action c) above requirements of said logical topology-mappings might be stored. Optionally, at action d) said requirements of each of said logical topology-mappings might be copied to said unknown physical topology-path used in the calculation of said logical topology-mapping, and said requirements of each of said unknown physical topology-paths might be matched with properties of a physical topology-path in said search, said properties of said physical topology-path being determined by properties of physical topology-mappings from which said physical topology-path is calculated.

As an example, but not limited to, we consider a requirement of the logical topology-mapping named K1 to be 'Requirement A' and store 'Requirement A' at action c) above as a requirement of the topology-mapping named K1. At action d) the requirement of the logical topology-mapping named K1 is copied to the unknown physical topology-path named ?K9 used in the calculation of the logical topology-mapping K1, as per the edge-relationships '?K9/K1' as shown in FIG. 11D, and the requirement of the unknown physical topology-path named ?K9, being 'Requirement A' is matched with properties of a physical topology-path in said search. FIG. 11H shows how requirements of the logical topology-mapping named K1 are related to requirements of the unknown physical topology-path named ?K9 per the edge-relationship '?K9/K1' as shown in FIG. 11D. FIG. 11H also shows how requirements of the logical topology-mapping named K2 are related to requirements of the unknown physical topology-path named ?K10 per the edge-relationship '?K10/K2' as shown in FIG. 11D.

Optionally, at action b) above requirements of one or more logical nodes might be stored. Optionally, at action d) of claim 1) said requirements of each of said logical nodes might be copied to said unknown physical node mapped to said logical node through one or more depth-mappings, and said requirements of each of said unknown physical nodes might be matched with properties of said physical node in said search.

As an example, but not limited to, we consider a requirement of the logical node FE to be 'type host' and store 'type host' at action b) above as a requirement of the logical node named FE, as logical node FE is a host node. At action d) the requirement of logical node FE is copied to the unknown physical node name ?X1 mapped to the logical node FE through the depth-mapping named K4 in the topology-mapping named K1, as shown in FIG. 11E, and said requirements of each of said unknown physical nodes might be matched with properties of said physical node in said search.

FIG. 11I shows how requirements of the logical node named FE are related to requirements of the unknown physical node named ?X1 per the depth-mapping named K4 in the topology-mapping named K1, as shown in FIG. 11E. FIG. 11I shows how requirements of the logical node named FF are related to requirements of the unknown physical node named ?X2 per the depth-mapping named K5 in the topology-mapping named K1, as shown in FIG. 11E, and per the depth-mapping named K6 in the topology-mapping named K2, as shown in FIG. 11F. FIG. 11I shows how requirements of the logical node named FG are related to requirements of the unknown physical node named ?X3 per the depth-mapping named K7 in the topology-mapping named K2, as shown in FIG. 11F.

Typical properties of a physical node include, but are not limited to:

A node type of said physical node. As an example, but not limited to, a node being a packet-switched node within a Packet Switched Network (PSN) or a node being non-packet-switch node within a non-Packet Switched Network (non-PSN). As an example, but not limited to, a node being a host type node, a switch type node, a multiplexer type node performing multiplexing or de-multiplexing. As an example, but not limited to, a node being a transmitting host, a receiving host, a multiplexing multiplexer, a de-multiplexing multiplexer.

Switching-characteristics of said physical node. As an example, but not limited to, such switching-characteristics may be ones as defined in IEEE 802.3 Ethernet Switching, Internet Protocol version 4 (IPv4) routing, Internet Protocol version 6 (IPv6) routing, or Internet Protocol version 6 (IPv6) routing based on a 3-tuple of the IPv6 Flow Label, IPv6 Source Address, and IPv6 Destination Address fields. As will be understood by a person skilled in the art switching-identifiers can be derived from switching-characteristics.

Capacity of said physical node.

Latency of said physical node.

Availability of said physical node.

Typical properties of a physical link include, but are not limited to:

capacity of said physical link in one direction, latency of said physical link in one direction, availability of said physical link in one direction.

The properties of a physical topology-mapping are the properties of a physical link in one direction. As will be understood by a person skilled in the art said properties of a physical topology-mapping determine the properties of a physical topology-path, said physical topology-path being a concatenation of zero or more physical topology-mappings and zero or more physical topology-paths, said number of topology-mappings and said number of topology-paths being such that their sum is at least one.

Figure 12A:
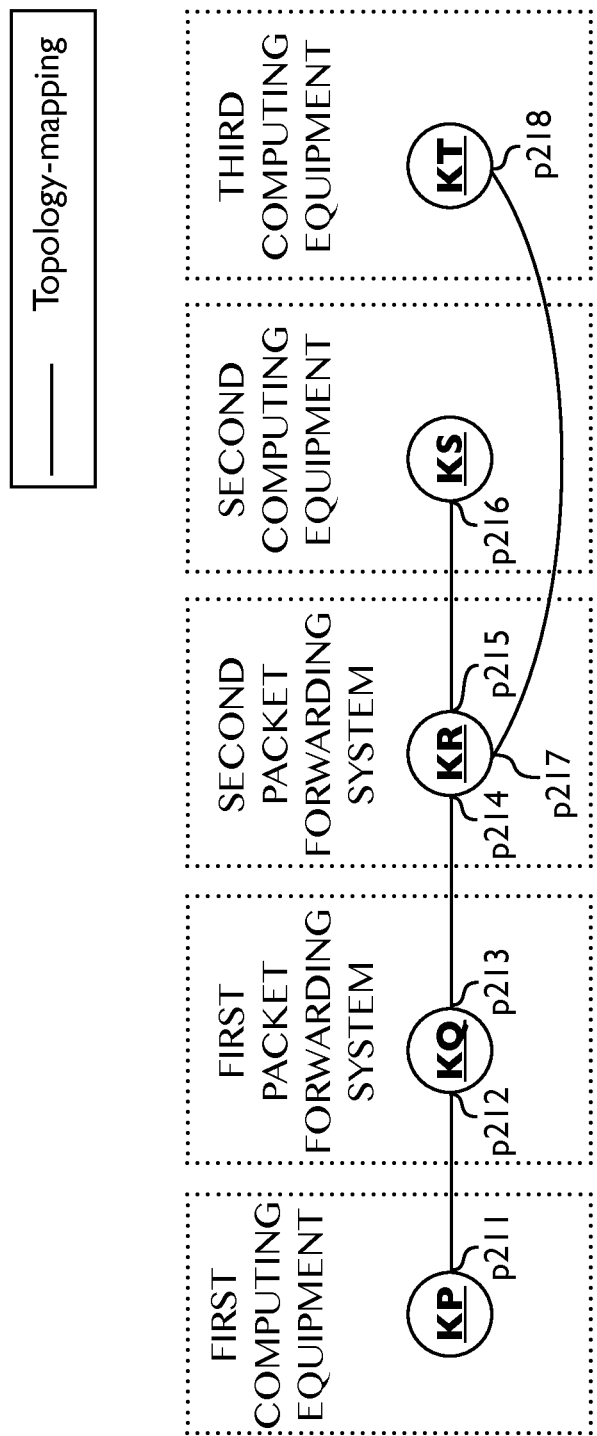
FIG. 12A is a diagram showing a first computing equipment, represented by physical node KP, a first packet forwarding system, represented by physical node KQ, a second packet forwarding system, represented by physical node KR, a second computing equipment, represented by physical node KS, and a third computing equipment, represented by physical node KT, connected by topology-mappings being physical links.

Typical requirement of a logical node include, but are not limited to:

type of said logical node, switching-characteristics of said logical node, capacity of said logical node, latency of said logical node, availability of said logical node, Typical properties of a logical topology-mapping include, but are not limited to:

capacity of said logical topology-mapping, latency of said logical topology-mapping, availability of said logical topology-mapping, We now consider a physical network layout against which said search is performed, as shown in FIG. 12A, said physical network layout comprising nodes and links available for use. FIG. 12A shows a first computing equipment, represented by physical node KP, a first packet forwarding system, represented by physical node KQ, a second packet forwarding system, represented by physical node KR, a second computing equipment, represented by physical node KS, and a third computing equipment, represented by physical node KT, connected by topology-mappings being physical links. FIG. 12A also shows Point-of-Attachment (PoA) p211 through p218.

Figure 12B:
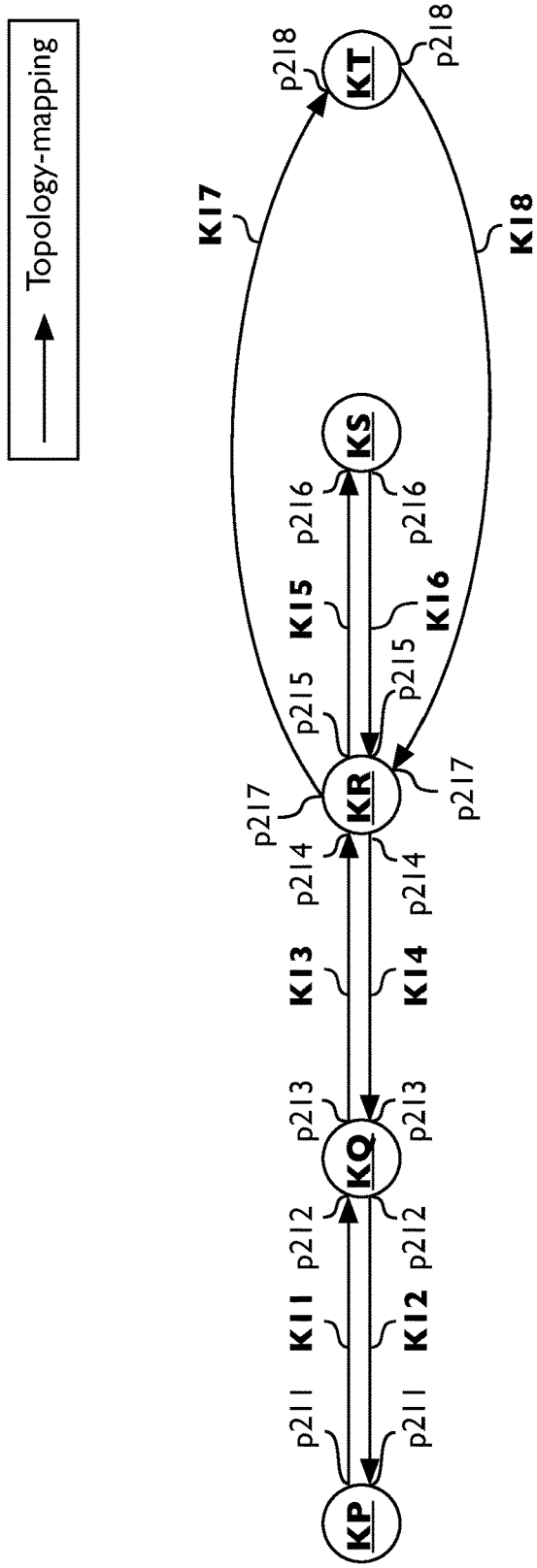
FIG. 12B is a diagram showing a physical node KP at (d=0, n=0, h=0), a physical node KQ at (d=0, n=0, h=0), a physical node KR at (d=0, n=0, h=0), a physical node KS at (d=0, n=0, h=0), and a physical node KT at (d=0, n=0, h=0).

We represent the topology-mappings as directed edges in a graph as shown in FIG. 12B. FIG. 12B shows said physical node KP at (d=0, n=0, h=0), said physical node KQ at (d=0, n=0, h=0), said physical node KR at (d=0, n=0, h=0), said physical node KS at (d=0, n=0, h=0), and said physical node KT at (d=0, n=0, h=0). FIG. 12B also shows topology-mappings named K11 through K18, represented as directed edges in a graph.

FIG. 12C shows topology-mappings named K11 through K18, per the notation of FIG. 6A. As an example, but not limited to, as physical nodes KP, KS and KT represent a first, second and third computing equipment respectively, we store a node type property with value 'host' for nodes KP, KS and KT. As an example, but not limited to, as physical nodes KQ and KR represent a first and second packet forwarding system respectively, we store a node type property with value 'switch' for nodes KQ and KR. We perform a search comprising of above described third search statement "(?X1-?K9[toppath]/K1->?X2) AND (?X2-?K10[toppath]/K2->?X3)" against the physical network layout shown in FIG. 12B and include requirements that logical nodes FE and FG are logical host nodes and logical node FF is a logical switch node. As shown in FIG. 11I and described above at action d) the requirements of logical nodes FE, FF, FG are copied to the unknown physical node name ?X1, ?X2, ?X3 respectively. We do not consider any requirements for the logical topology-mappings named K1 and K2, therefore the search statement can be reduced to "(?X1-?K9[toppath]->?X2) AND (?X2-?K10[toppath]->?X3)", omitting "/K1" and "/K2". The search statement including requirements is, written in pseudo-code:

MATCH (?X1-?K9[toppath]->?X2)
AND
MATCH (?X2-?K10[toppath]->?X3)
WHERE node-type ?X1 equals "host"
AND node-type ?X2 equals "switch"
AND node-type ?X3 equals "host"
RETURN ?X1, ?X2, ?X3, ?K9, ?K10

Above search statement will return a number of matches including the match shown in FIGS. 12D and 12E. FIG. 12D shows how unknown physical node ?X1 is matched against physical node KP, unknown physical node ?X2 is matched against physical node KQ, and unknown physical node ?X3 is matched against physical node KS.

FIG. 12E shows how the unknown physical topology-path named ?K9 is matched against a physical topology-path, which is named K9 for consistency, comprising of the physical topology-mapping named K11, as shown in FIG. 12E per the notation of FIG. 6C.

FIG. 12E shows how the unknown physical topology-path named ?K10 is matched against a physical topology-path, which is named K10 for consistency, comprising of a concatenation of physical topology-mappings named K13 and K15, as shown in FIG. 12E per the notation of FIG. 6C.

Per action d) above we replace and store each unknown physical topology-path by a physical topology-path, said physical topology-path being a concatenation of one or more physical topology-mappings, and we replace each unknown physical node by a physical node in accordance with a result of said search. In the example described above, we replace and store the unknown physical topology-path named ?K9 by a physical topology-path named K9, said physical topology-path named K9 comprising of a physical topology-mapping named K11, and we replace and store the unknown physical topology-path named ?K10 by a physical topology-path named K10, said physical topology-path named K10 being a concatenation of physical topology-mappings named K13 and K15, and we replace the unknown physical nodes ?X1, ?X2, ?X3 by the physical nodes KP, KQ, KS respectively, in accordance with a result of the search described above. As a result, the depth-mappings named K3 through K8 have become depth-mappings between logical nodes FE, FF, FG and physical nodes KP, KQ, KR respectively as shown in FIG. 12G, in comparison to FIG. 11C in which the depth-mappings named K3 through K8 were depth-mappings between logical nodes FE, FF, FG and unknown physical nodes ?X1, ?X2, ?X3.

As a result, the topology-mappings K1 and K2 have become "topmap K1=K4/K1+K9/K1+K5/K1" and "topmap K2=K6/K2+K10/K2+K7/K2" respectively, as shown in FIG. 12H, in comparison to FIG. 11D in which the topology-mappings K1 and K2 were "topmap K1=K4/K1+?K9[unknown toppath]/K1+K5/K1" and "topmap K2=K6/K2+?K10[unknown toppath]/K2+K7/K2" respectively. This is illustrated in FIG. 12F.

Figure 12F:
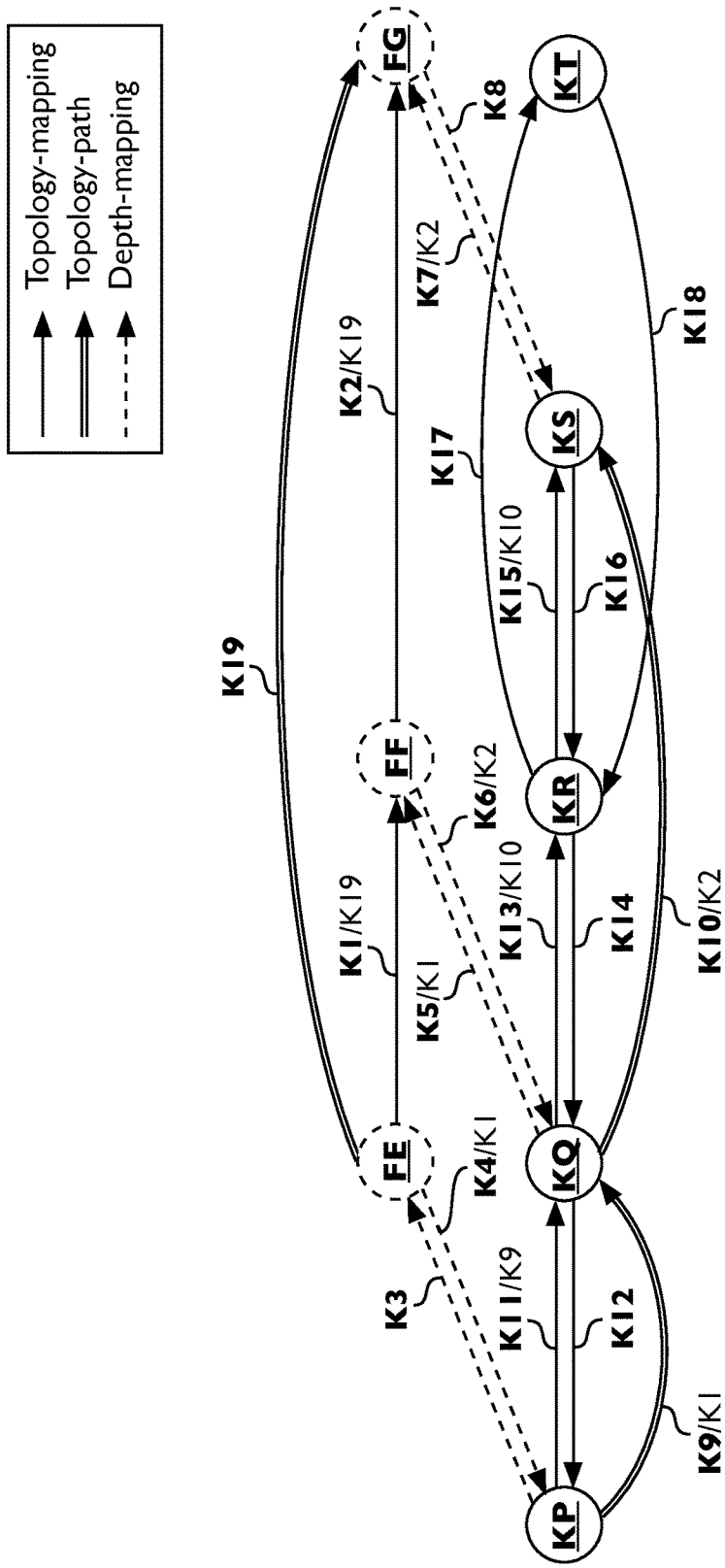
FIG. 12F is a diagram showing a logical node FE at (d=1, n=0, h=0), a logical node FF at (d=1, n=0, h=0), a logical node FG at (d=1, n=0, h=0), a physical node KP at (d=0, n=0, h=0), a physical node KQ at (d=0, n=0, h=0), a physical node KR at (d=0, n=0, h=0), a physical node KS at (d=0, n=0, h=0), and a physical node KT at (d=0, n=0, h=0).

FIG. 12F shows a logical node FE at (d=1, n=0, h=0), a logical node FF at (d=1, n=0, h=0), a logical node FG at (d=1, n=0, h=0), a physical node KP at (d=0, n=0, h=0), a physical node KQ at (d=0, n=0, h=0), a physical node KR at (d=0, n=0, h=0), a physical node KS at (d=0, n=0, h=0), and a physical node KT at (d=0, n=0, h=0). FIG. 12F also shows topology-mappings named K1, K2, K11 through K18, depth-mappings named K3 through K8, physical topology-paths named K9 and K10, and a logical topology-path named K19, represented as directed edges in a graph. Therefore, action d) for the above described example is:

d) Determining a suitable physical node (KP; KQ; KS) in the overall network for each unknown physical node (?X1; ?X2; ?X3) and determining a suitable physical topology-path (K9; K10) in the overall network for each unknown physical topology-path (?K9; ?K10) by performing a search comprising matching each unknown physical topology-path (?K9; ?K10) with one of a set of suitable physical topology-paths, and matching each unknown physical node with one (KP; KQ; KS) of a set of suitable physical nodes, and replacing and storing each unknown physical topology-path (?K9; ?K10) by said one of said set of suitable physical topology-paths (K9; K10), said one of said suitable physical topology-paths (K9; K10) being a concatenation of one or more physical topology-mappings (K11; K13, K15), and replacing each unknown physical node (?X1; ?X2; ?X3) by said one of said set of suitable physical nodes (KP; KQ; KS) in accordance with a result of said search (cf. FIG. 12F).

As an example, but not limited to, we create a requested topology-path named K19 being a concatenation of topology-mappings K1 and K2 as shown in FIG. 12F and as shown in FIG. 12I per the notation of FIG. 6C.

We calculate the recursive-path of the topology-path named K19 as described above. The recursive-path of the topology-path named K19 is shown in step 5 of FIG. 12J. Step 2 through step 4 are intermediate steps of the calculation. The recursive-path of the topology-path named K19 contains the following information for each physical network in said recursive-path, being physical nodes KP, KQ, KR and KS:

an input port,
an output port,
a set of incoming edge-relationships,
a set of outgoing edge-relationships.

Note that above input port, output port, a set of incoming edge-relationships, and a set of outgoing edge-relationships is the information contained in the topology-mappings named K11, K13 and K15. The combination of above input port, output port, a set of incoming edge-relationships, a set of outgoing edge-relationships, and switching-identifiers of incoming set of edge-relationships and switching-identifiers of outgoing set of edge-relationships results in forwarding entries for physical nodes KP, KQ, KR and KS. The switching-identifiers for edges K11 through K19 are shown in FIG. 12K.

The switching-identifiers of edges K11 through K18 denote physical PoA's at the datalink layer, performing Media Access Control (MAC). The switching-identifier of the edge named K19 is "Source FE, Destination FG", using the name of the source node FE of the topology-path named K19 as source and using the name of the destination node FG of the topology-path named K19 as destination. FIG. 12L shows for networks at (d=0, h=0), being physical nodes KP, KQ, KR, KS and KT, in the recursive-path calculated from the requested topology-path named K19 forwarding instructions comprising an input port, an output port, incoming set of edge-relationships and switching-identifiers of each edge in said incoming set of edge-relationships, and outgoing set of edge-relationships and switching-identifiers of each edge in said outgoing set of edge-relationships.

In the example shown in FIG. 11A and described above no depth-mappings were specified between a logical node and a physical node. As will be understood by a person skilled in the art, a user of an SDN Compiler might specify one or more depth-mappings between a logical node and a physical node, which would result in a search statement that might include said physical node used in the search at action d) above.

As an example, but not limited to, a logical node might be mapped to a physical node through a depth-mapping when said physical node is known to provide connectivity to other networks, also known as a gateway. FIGS. 13A through 13E show an example to which the above described method is applied with a single depth-mapping from a logical node to a physical node being known.

Figure 13A:
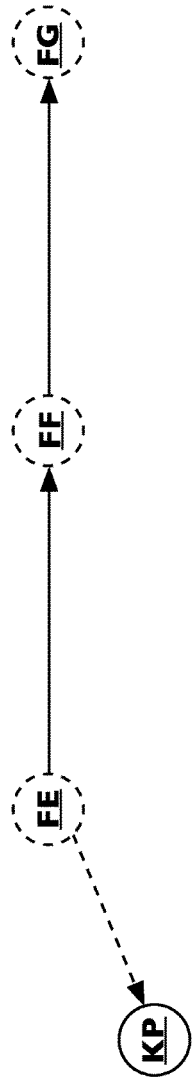
FIG. 13A is a diagram showing a logical node FE, a logical node FF, a logical node FG, and a physical node KP.

FIG. 13A shows logical node FE, logical node FF, logical node FG, as per FIG. 11A. FIG. 13A also shows a topology-mapping from logical node FE to logical node FF, a topology-mapping from logical node FF to logical node FG, as per FIG. 11A. FIG. 13A also shows a physical node KP and a depth-mapping from logical node FE to physical node KP represented as a directed edge in a graph.

Figure 13B:
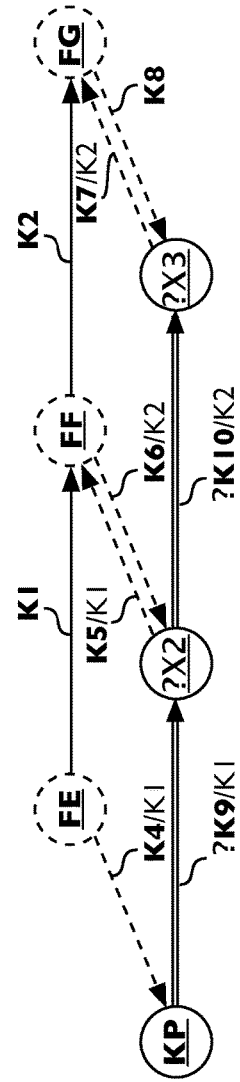
FIG. 13B is a diagram showing a logical node FE at (d=1, n=0, h=0), a logical node FF at (d=1, n=0, h=0) and a logical node FG at (d=1, n=0, h=0), a physical node KP at (d=0, n=0, h=0), an unknown physical node ?X2 at (d=0, n=0, h=0) and an unknown physical node ?X3 at (d=0, n=0, h=0).

FIG. 13B shows a logical node FE at (d=1, n=0, h=0), a logical node FF at (d=1, n=0, h=0) and a logical node FG at (d=1, n=0, h=0) and a physical node KP at (d=0, n=0, h=0). Per action a) above, as logical node FE is mapped to physical node KP, no unknown physical node is created to be mapped to logical node FE through one or more depth-mappings.

Per action a) above as logical node FF is not mapped to a physical node, we create unknown physical node ?X2 at (d=0, n=0, h=0). In FIG. 13B the questions mark before X2 in "?X2" indicates that X2 is an unknown physical node. As logical node FG is not mapped to a physical node, we create unknown physical node ?X3 at (d=0, n=0, h=0). In FIG. 13B the questions mark before X3 in "?X3" indicates that X3 is an unknown physical node.

Per action b) above, depth-mapping named K5 is created from unknown physical node ?X2 to logical node FF, depth-mapping named K6 is created from logical node FF to unknown physical node ?X2, depth-mapping named K7 is created from unknown physical node ?X3 to logical node FG, depth-mapping named K8 is created from logical node FG to unknown physical node ?X3. FIG. 13B shows depth-mappings named K4 through K8. FIG. 13C shows depth-mappings named K4 through K8, per the notation of FIG. 6A.

Per action c) above, topology-mapping named K1 is created using the first method to calculate a topology-mapping, comprising of a concatenation of the depth-mapping named K4, unknown topology-path named ?K9 and the depth-mapping named K5, as shown in FIG. 13B. In FIG. 13B the questions mark before K9 in "?K9/K1" indicates that K9 is an unknown physical topology-path. Note that the unknown physical topology-path named ?K9 is created and stored during this step. Also, topology-mapping named K2 is created using the first method to calculate a topology-mapping, comprising of a concatenation of the depth-mapping named K6, unknown topology-path named ?K10 and the depth-mapping named K7, as shown in FIG. 11B. In FIG. 11B the questions mark before K10 in "?K10/K2" indicates that K10 is an unknown physical topology-path. Note that the unknown physical topology-path named K10 is created and stored during this step. FIG. 11D shows topology-mappings K1 and K2, per the notation of FIG. 6C as described above.

As shown in of FIGS. 13D and 11F we now determine the physical entities of the topology-mappings K1 and K2 respectively, which will be used in a search at action d). Step 1) of FIG. 13D shows the topology-mapping named K1 per FIG. 11D. In step 2) of FIG. 13D, the values of the depth-mappings named K4 and K5 in step 1) of FIG. 13D have been replaced by the definition of the depth-mappings named K4 and K5 shown in FIG. 13C. The topology-mapping K2, as shown in FIG. 11F, was described above.

Per action d) above, we determine a suitable physical node for each unknown physical node and determine a suitable physical topology-path for each unknown physical topology-path by performing a search comprising matching each unknown physical topology-path with one of a set of suitable physical topology-paths, and matching each unknown physical node with one of a set of suitable physical. As shown in FIG. 13E, we use the relationship between unknown physical nodes and unknown physical topology-paths of the topology-mapping named K1, being "KP-?K9[toppath]/K1->?X2" as a first search statement, and we use the relationship between unknown physical nodes and unknown physical topology-paths of the topology-mapping named K2, being "?X2-?K10[toppath]/K2->?X3" as a second search statement, to create a third search statement "(?X1-?K9[toppath]/K1->?X2) AND (?X2-?K10[toppath]/K2->?X3)". Said third search statement is used in said search as described above. Note that said search statement comprises of unknown physical nodes ?X2 and ?X3, and unknown physical topology-paths named ?K9 and K10. Said search is performed against a physical network layout comprising of physical nodes being interconnected by physical topology-mappings, said physical topology-mapping being based on a directed graph representation.

In said search optionally requirements can be taken into account as described above. As an example, but not limited to, said search can be performed against physical network layout shown in FIG. 12B as described above. Said search will return a number of matches including the match comprising of unknown physical node ?X2 matching physical node KQ, unknown physical node ?X3 matching physical node KS, unknown physical topology-path named ?K9 matching against a physical topology-path named K9, comprising of the physical topology-mapping named K11, as shown in FIG. 12E per the notation of FIG. 6C, and unknown physical topology-path named K10 matching against a physical topology-path named K10, comprising of a concatenation of physical topology-mappings named K13 and K15, as shown in FIG. 12E per the notation of FIG. 6C. Per action d) above we replace and store the unknown physical topology-path named ?K9 by a physical topology-path named K9, said physical topology-path named K9 comprising of a physical topology-mapping named K11, and we replace and store the unknown physical topology-path named K10 by a physical topology-path named K10, said physical topology-path named K10 being a concatenation of physical topology-mappings named K13 and K15, and we replace the unknown physical nodes ?X2 and ?X3 by the physical nodes KQ and KS respectively, in accordance with a result of the search described above.

As a result, the depth-mapping named K5 has become a depth-mapping from physical node KQ to logical node FF, the depth-mapping named K6 has become a depth-mapping from logical node FF to physical node KQ, the depth-mapping named K7 has become a depth-mapping from physical node KS to logical node FG, and the depth-mapping named K8 has become a depth-mapping from logical node FG to physical node KS. As a result, the topology-mappings K1 and K2 have become "topmap K1=K4/K1+K9/K1+K5/K1" and "topmap K2=K6/K2+K10/K2+K7/K2" respectively, as shown in FIG. 12H, as illustrated in FIG. 12F and described above.

As an example, but not limited to, we create a requested topology-path named K19 being a concatenation is topology-mappings K1 and K2 as shown in FIG. 12F and as shown in FIG. 12I per the notation of FIG. 6C. We calculate the recursive-path of the topology-path named K19 as described above. The recursive-path of the topology-path named K19 is shown in step 5 of FIG. 12J, from which forwarding entries can be created as described above.

In the example shown in FIG. 11A and described above a topology-mapping from logical node FE to logical node FF and a topology-mapping from logical node FF to logical node FG was considered. As will be understood by a person skilled in the art, a user of an SDN Compiler would typically specify topology-mappings between a first logical node and a second logical node in both directions: in the direction from the first logical node to the second logical node and in the direction from the second logical node to the first logical node. FIGS. 14A through 14F show an example to which the above described method is applied and in which topology-mappings between logical nodes have been specified in both directions.

Figure 14A:
FIG. 14A is a diagram showing a logical node FE, a logical node FF, a logical node FG, and a physical node KP.

FIG. 14A shows logical node FE, logical node FF, logical node FG. FIG. 14A also shows a topology-mapping from logical node FE to logical node FF, a topology-mapping from logical node FF to logical node FE, and a topology-mapping from logical node FF to logical node FG, a topology-mapping from logical node FG to logical node FF, represented as directed edges in a graph.

Figure 14B:
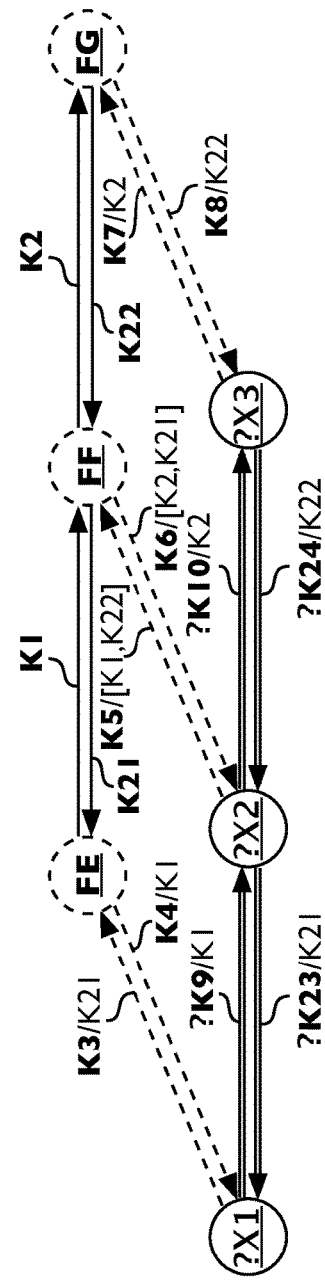
FIG. 14B is a diagram showing a logical node FE at (d=1, n=0, h=0), a logical node FF at (d=1, n=0, h=0) and a logical node FG at (d=1, n=0, h=0), an unknown physical node ?X1 at (d=0, n=0, h=0), an unknown physical node ?X2 at (d=0, n=0, h=0) and an unknown physical node ?X3 at (d=0, n=0, h=0).

FIG. 14B shows logical node FE at (d=1, n=0, h=0), logical node FF at (d=1, n=0, h=0) and logical node FG at (d=1, n=0, h=0), unknown physical node ?X1 at (d=0, n=0, h=0), unknown physical node ?X2 at (d=0, n=0, h=0) and unknown physical node ?X3 at (d=0, n=0, h=0). FIG. 14B also shows topology-mappings named K1, K2, K21 and K22, depth-mappings named K3 through K8, and unknown physical topology-paths named ?K9, ?K10, ?K23 and ?K24, represented as directed edges in a graph. In FIG. 14B questions marks indicate unknown physical nodes and unknown physical topology-paths.

Actions a), b) and c) are illustrated by FIG. 14B, with the following differences compared to FIG. 11B, as described above.

Per action c) above, topology-mappings named K1, K2, K21 and K22 are created using the first method to calculate a topology-mapping. The topology-mapping named K21 is comprising of a concatenation of the depth-mapping named K6, an unknown topology-path named ?K23 and the depth-mapping named K3, as shown in FIGS. 14B and 14C. In FIG. 14B the questions mark before K23 in "?K23/K21" indicates that K23 is an unknown physical topology-path. The topology-mapping named K22 is comprising of a concatenation of the depth-mapping named K8, an unknown topology-path named ?K24 and the depth-mapping named K5, as shown in FIGS. 14B and 14C. In FIG. 14B the questions mark before K24 in "?K24/K22" indicates that K24 is an unknown physical topology-path.

As shown in of FIGS. 11E, 11F, 14D and 14E we now determine the physical entities of the topology-mappings K1, K2, K21 and K22 respectively, which will be used in a search at action d). Per action d) above, we determine a suitable physical node for each unknown physical node and determine a suitable physical topology-path for each unknown physical topology-path by performing a search comprising matching each unknown physical topology-path with one of a set of suitable physical topology-paths, and matching each unknown physical node with one of a set of suitable physical nodes. As shown in FIG. 14F, we use the relationship between unknown physical nodes and unknown physical topology-paths of the topology-mapping named K1, being "?X1-?K9[toppath]/K1->?X2" as a first search statement, we use the relationship between unknown physical nodes and unknown physical topology-paths of the topology-mapping named K2, being "?X2-?K10[toppath]/K2->?X3" as a second search statement, we use the relationship between unknown physical nodes and unknown physical topology-paths of the topology-mapping named K21, being "?X2-?K23[toppath]/K21->?X1" as a third search statement, and we use the relationship between unknown physical nodes and unknown physical topology-paths of the topology-mapping named K22, being "?X3-?K24[toppath]/K22->?X2" as a fourth search statement, to create a fifth search statement "(?X1-?K9[toppath]/K1->?X2) AND (?X2-?K10[toppath]/K2->?X3) AND (?X2-?K23[toppath]/K21->?X1) AND (?X3-?K24[toppath]/K22->?X2)". Said fifth search statement is used in said search. Note that said search statement comprises of unknown physical nodes ?X1, ?X2 and ?X3, and unknown physical topology-paths named ?K9, ?K10, ?K23 and ?K24.

Said search is performed against a physical network layout comprising of physical nodes being interconnected by physical topology-mappings, said physical topology-mapping being based on a directed graph representation. In said search optionally requirements can be taken into account as described above. As an example, but not limited to, said search can be performed against physical network layout shown in FIG. 12B as described above. Said search will return a number of matches including the match comprising of unknown physical node ?X1 matching physical node KP, unknown physical node ?X2 matching physical node KQ, unknown physical node ?X3 matching physical node KS, unknown physical topology-path named ?K9 matching against a physical topology-path named K9, comprising of the physical topology-mapping named K11, and unknown physical topology-path named ?K10 matching against a physical topology-path named K10, comprising of a concatenation of physical topology-mappings named K13 and K15, unknown physical topology-path named ?K23 matching against a physical topology-path named K23, comprising of the physical topology-mapping named K12, and unknown physical topology-path named ?K24 matching against a physical topology-path named K24, comprising of a concatenation of physical topology-mappings named K16 and K14.

Per action d) above we replace and store the unknown physical topology-path named ?K9 by a physical topology-path named K9, we replace and store the unknown physical topology-path named ?K10 by a physical topology-path named K10, we replace and store the unknown physical topology-path named ?K23 by a physical topology-path named K23, we replace and store the unknown physical topology-path named ?K24 by a physical topology-path named K24, and we replace the unknown physical nodes ?X1, ?X2 and ?X3 by the physical nodes KP, KQ and KS respectively, in accordance with a result of the search described above.

As a result, the depth-mappings named K3 through K8 have become depth-mappings between logical nodes FE, FF, FG and physical nodes KP, KQ, KR respectively as shown in FIG. 12G. As a result, the topology-mappings K1 and K2 have become "topmap K1=K4/K1+K9/K1+K5/K1", "topmap K2=K6/K2+K10/K2+K7/K2", "topmap K21=K6/K21+K23/K21+K3/K21", and "topmap K22=K8/K22+K24/K22+K5/K22", respectively.

We now extend the above described method to a network layout including multiple layers:

e) Creating and storing one or more logical layer-mappings, each logical layer-mapping being a directed graph representation from a third logical node to a fourth logical node, calculated as a concatenation of a third depth-mapping from the third logical node to a third known/unknown physical node, a first known/unknown physical layer-mapping from said third known/unknown physical node to a fourth known/unknown physical node, and a fourth depth-mapping from the fourth known/unknown physical node to the fourth logical node.

Note that said one or more logical layer-mappings are calculated using the first or second method to calculate a layer-mapping.

Said logical layer-mappings can be used to create and store one or more second logical topology-mappings, using the second method to calculate a topology-mapping, each second logical topology-mapping being a directed graph representation from a fifth logical node to a second sixth logical node, calculated as a concatenation of a second layer-mapping decreasing in layer from the fifth logical node to a seventh logical node, a first logical topology-path from the seventh logical node to an eighth logical node and a third layer-mapping increasing in layer from the eighth logical node to the sixth logical node, said first logical topology-path being a concatenation of one or more third logical topology-mappings.

It is observed that, for the sake of efficiency, apart from the terms "physical layer-mapping", "known physical layer-mapping", and "unknown physical layer-mapping" as defined above, the term "known/unknown physical layer-mapping" is used. This latter term refers to a set comprising all known and unknown physical layer-mappings and each member of this set may either be a known or an unknown physical layer-mapping. "Known/unknown physical layer-mapping names" are names of these "known/unknown physical layer-mappings".

The search at action d) is now extended by including layer-mappings:

d) (extended) [Determining a suitable physical node in the overall network for each unknown physical node and determining a suitable physical topology-path in the overall network for each unknown physical topology-path and determining a suitable physical layer-mapping in the overall network for each unknown physical layer-mapping by performing a search comprising matching each unknown physical topology-path with one of a set of suitable physical topology-paths, and matching each unknown physical layer-mapping with one of a set of suitable physical layer-mappings and matching each unknown physical node with one of a set of suitable physical nodes, and replacing and storing each unknown physical topology-path by said one of said set of suitable physical topology-paths, said one of said suitable physical topology-paths being a concatenation of one or more physical topology-mappings, and replacing and storing each unknown physical layer-mapping by said one of said set of suitable physical layer-mappings, and replacing each unknown physical node by said one of said set of suitable physical nodes in accordance with a result of said search. Here, the "physical nodes" and "physical topology-paths" and "physical layer-mappings" respectively are entities available for use. They may already be in existence or still to be set up on demand: e.g., a node can be implemented by a virtual machine that is not yet in existence but can be requested by the SDN compiler (or other unit) to be set up when necessary. This action is relating to action d) of claim 1) and to claim 11.

Figure 15A:
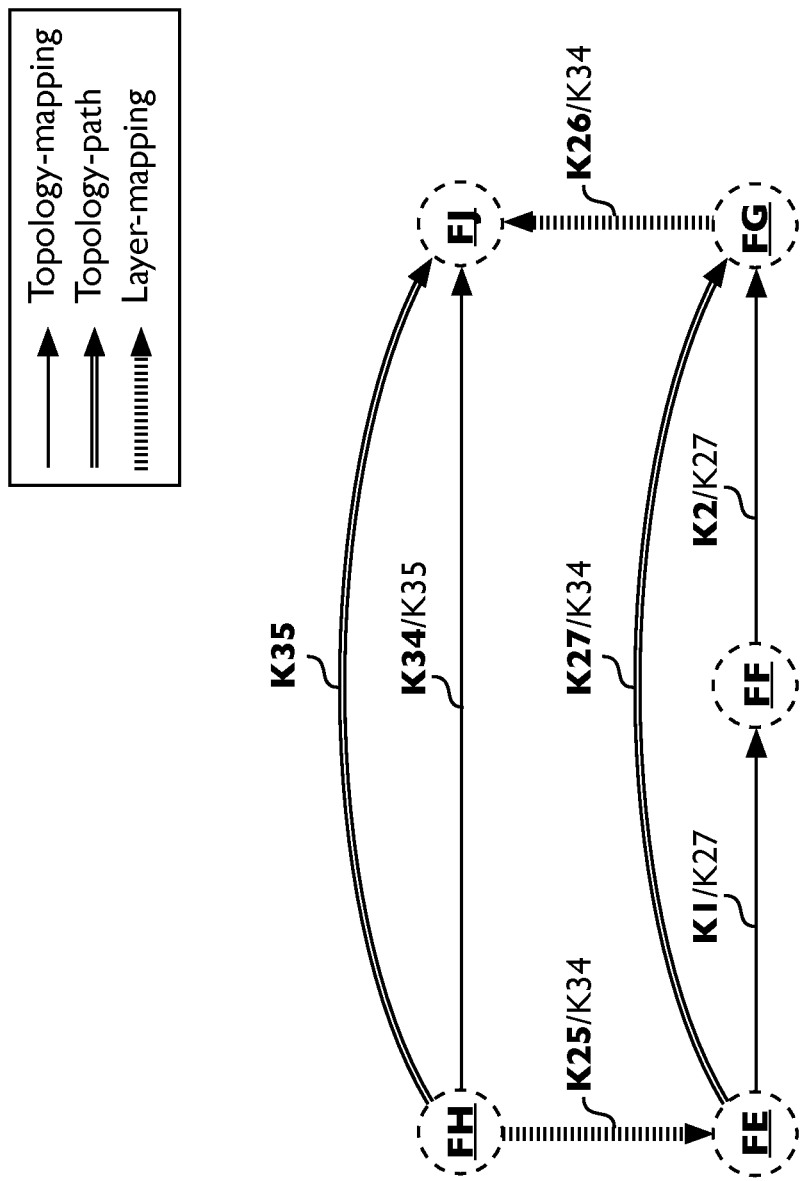
FIG. 15A is a diagram showing logical nodes FE, FF, FG, FH and FJ, topology-mappings, layer-mappings and topology-paths.

FIGS. 15A through 16J show an example in which the above additional actions are applied. Note that the method is can be applied to an arbitrary overall network, and is not limited to the examples presented. We consider a logical network specification as shown in FIG. 15A. FIG. 15A shows logical nodes named FE, FF, FG, FH and FJ. Logical nodes FE, FF and FG are at a depth d=1, a first layer n=0 and level h=0, and logical nodes FH and FJ are at a depth d=1, a second layer n=1 and level h=0, said second layer being higher than said first layer. FIG. 15A also shows a topology-mapping named K1 from logical node FE to logical node FF, a topology-mapping named K2 from logical node FF to logical node FG, a topology-mapping named K34 from logical node FH to logical node FJ, a layer-mapping named K25 from logical node FH to logical node FE, a layer-mapping named K26 from logical node FG to logical node FJ, a topology-path named K27 from logical node FE to logical node FG, and a topology-path named K35 from logical node FH to logical node FJ, represented as directed edges in a graph. A user of an SDN Compiler would specify the logical nodes FE, FF and FG and the topology-mappings, layer-mappings and topology-paths shown in FIG. 15A.

Logical nodes FH and FJ are logical host nodes, logical node FF is a logical switch node. As will be understood by a person skilled in the art, a layer-mapping named K25 decreasing in layer followed by a topology-path named K27, comprising of topology-mappings named K1 and K2, results in a multiplexing action in logical node FE, therefore logical node FE is a multiplexing multiplexer node. A topology-path named K27, comprising of topology-mappings named K1 and K2, followed by a layer-mapping named K26 increasing in layer results in a de-multiplexing action in logical node FG, therefore logical node FG is a de-multiplexing multiplexer node. As a multiplexer node typically provides both multiplexing and de-multiplexing, we refer to logical nodes FE and FG as multiplexer nodes. It is our objective to have an SDN Compiler determine physical and/or virtual resources, comprising of physical nodes and physical links, against which the logical specification shown in FIG. 15A can be compiled.

Figure 15B:
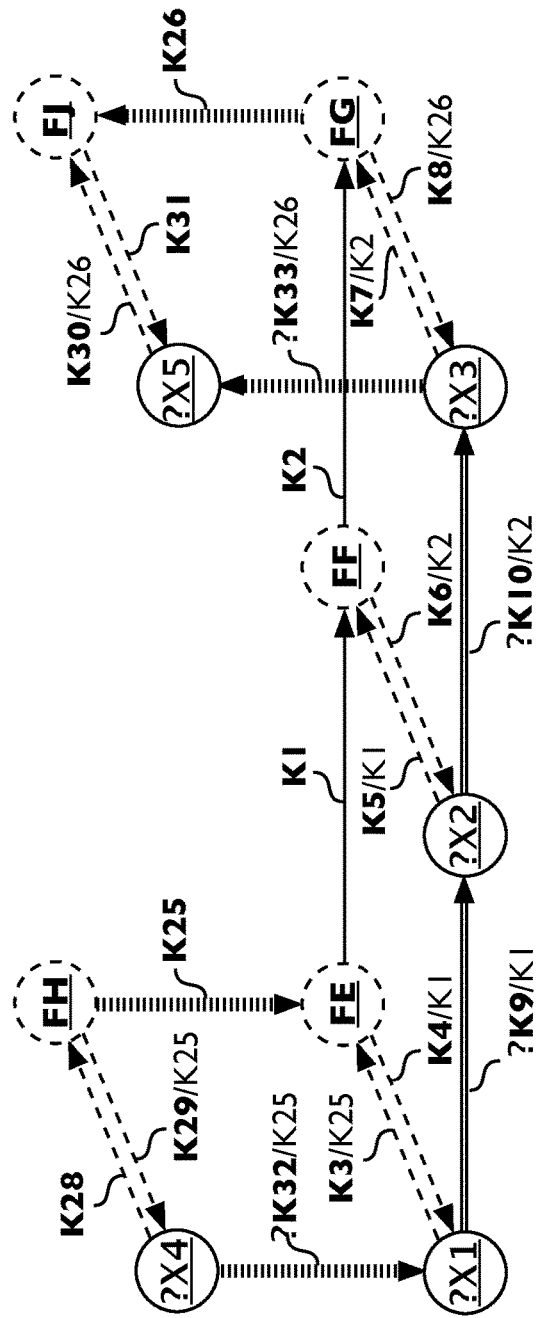
FIG. 15B is a diagram showing logical nodes FE, FF and FG at (d=1, n=0, h=0), and logical nodes FH and FJ at (d=1, n=1, h=0), an unknown physical node ?X1 at (d=0, n=0, h=0), an unknown physical node ?X2 at (d=0, n=0, h=0), an unknown physical node ?X3 at (d=0, n=0, h=0), an unknown physical node ?X4 at (d=0, n=1, h=0), and an unknown physical node ?X5 at (d=0, n=1, h=0).

We apply action a) and for each logical node not mapped to a physical node through one or more depth-mappings we create an unknown physical node and store a physical node name of said unknown physical node. As shown in FIG. 15B, we create unknown physical nodes named ?X1, ?X2, ?X3, ?X4 and ?X5 as logical nodes FE, FF, FG, FH and FJ respectively are not mapped to a physical node through one or more depth-mappings.

We apply action b) and for each logical node not mapped to a physical node through one or more depth-mappings we create a depth-mapping from said logical node not mapped to a physical node to said unknown physical node, and create a depth-mapping from said unknown physical node to said logical node not mapped to a physical node. As shown in FIGS. 15B and 15C depth-mappings named K3 through K8 and K28 through K31 are created. FIG. 15C shows depth-mappings named K3 through K8, and K28 through K31 per the notation of FIG. 6A.

We apply action c) and create and store topology-mappings named K1 and K2, using the first method to calculate a topology-mapping, as shown in FIGS. 15B and 15D, and explained above. In FIG. 15D '?K9[toppath]' denotes that K9 is an unknown topology-path, '?K10[toppath]' denotes that K10 is an unknown topology-path.

As described above, at action e) we additionally create and store logical layer-mappings named K25 and K26. Logical layer-mapping named K25 is a directed graph representation from logical node FH to logical node FE and is calculated using the first method to calculate a layer-mapping as a concatenation of a depth-mapping named K29 from logical node FH to unknown physical node ?X4, an unknown physical layer-mapping named ?K32 from unknown physical node ?X4 to unknown physical node ?X1 and a depth-mapping named K3 from the unknown physical node named ?X1 to the logical node FE, and creating and storing said unknown physical layer-mapping named ?K32. Logical layer-mapping named K26 is a directed graph representation from logical node FG to logical node FJ and is calculated using the second method to calculate a layer-mapping as a concatenation of the depth-mapping named K8 from logical node FG to unknown physical node ?X3, an unknown physical layer-mapping named ?K33 from unknown physical node ?X3 to unknown physical node ?X5 and a depth-mapping named K30 from the unknown physical node named ?X5 to the logical node FJ, and creating and storing said unknown physical layer-mapping named ?K33. The logical layer-mappings named K25 and K26 are shown in FIGS. 15B and 15D.

In FIG. 15D '?K32[laymap]' denotes that ?K32 is an unknown layer-mapping, and '?K33[laymap]' denotes that ?K33 is an unknown layer-mapping.

As shown in of FIGS. 11E, 11F, 15E and 15F we now determine the physical entities of the topology-mappings K1 and K2 and the layer-mappings K25 and K26 respectively, which will be used in a search at action d). Step 1) of FIG. 15E shows the layer-mapping named K25 per FIG. 15D. In step 2) of FIG. 15E, the values of the depth-mappings named K3 and K29 in step 1) of FIG. 15E have been replaced by the definition of the depth-mappings named K3 and K29 shown in FIG. 15C. Step 1) of FIG. 15F shows the layer-mapping named K26 per FIG. 15D. In step 2) of FIG. 15F, the values of the depth-mappings named K8 and K30 in step 1) of FIG. 15F have been replaced by the definition of the depth-mappings named K8 and K30 shown in FIG. 15C.

Per action d) above, we determine a suitable physical node for each unknown physical node and determine a suitable physical topology-path for each unknown physical topology-path and determine a suitable physical layer-mapping for each unknown physical layer-mapping by performing a search comprising matching each unknown physical topology-path with one of a set of suitable physical topology-paths, and matching each unknown physical layer-mapping with one of a set of suitable physical layer-mappings, and matching each unknown physical node with one of a set of suitable physical nodes.

As shown in FIG. 15G, we use the relationship between unknown physical nodes and unknown physical topology-path of the topology-mapping named K1, being "?X1-?K9[toppath]/K1->?X2" as a first search statement, we use the relationship between unknown physical nodes and unknown physical topology-path of the topology-mapping named K2, being "?X2-?K10[toppath]/K2->?X3" as a second search statement, we use the relationship between unknown physical nodes and unknown physical layer-mapping of the layer-mapping named K25, being "?X4-?K32[laymap]/K25->?X1" as a third search statement, and we use the relationship between unknown physical nodes and unknown physical layer-mapping of the layer-mapping named K26, being "?X3-?K33[laymap]/K26->?X5" as a fourth search statement, to create a fifth search statement "(?X1-?K9[toppath]/K1->?X2) AND (?X2-?K10[toppath]/K2->?X3) AND (?X4-?K32[laymap]/K25->?X1) AND (?X3-?K33[laymap]/K26->?X5)". Said fifth search statement is used in said search. Note that said search statement comprises of unknown physical nodes ?X1, ?X2, ?X3, ?X4 and ?X5, and unknown physical topology-paths named ?K9, ?K10, and unknown physical layer-mappings named ?K32 and ?K33. Said search is performed against a physical network layout comprising of physical nodes being interconnected by physical topology-mappings, said physical topology-mapping being based on a directed graph representation. In said search optionally requirements can be taken into account as described above.

Optionally, the following action may be applied after action d) of claim 1) and before action e) of claim 1):

Calculating through recursion and storing a recursive-path for each of one or more logical topology-mappings at the highest layer n=n_max.

As an example but not limited to, we calculate the recursive-path of the topology-mapping named K34, using the relationships shown in FIG. 15D, resulting in:

"K29/K25/K34/K35+?K32[laymap]/K25/K34/K35+K3/K25/K34/K35+K4/K1/K27/K34/K35+?K9[toppath]/K1/K27/K34/K35+K5/K1/K27/K34/K35+K6/K2/K27/K34/K35+?K10[toppath]/K2/K27/K34/K35+K7/K2/K27/K34/K35+K8/K26/K34/K35+?K33 [lay map]/K26/K34/K35+K30/K26/K34/K35"

Per the method described above we now determine the physical entities which will be used in a search statement at action e) of claim 1), thereby removing the depth-mappings from the recursive-path of the topology-mapping named K34, resulting in:

"?X4-?K32[laymap]/K25/K34/K35->
?X1-?K9[toppath]/K1/K27/K34/K35->
?X2-?K10[toppath]/K2/K27/K34/K35->
?X3-?K33 [laymap]/K26/K34/K35->?X5"

Note that this search statement is identical to the search statement shown in FIG. 15G.

Figure 16A:
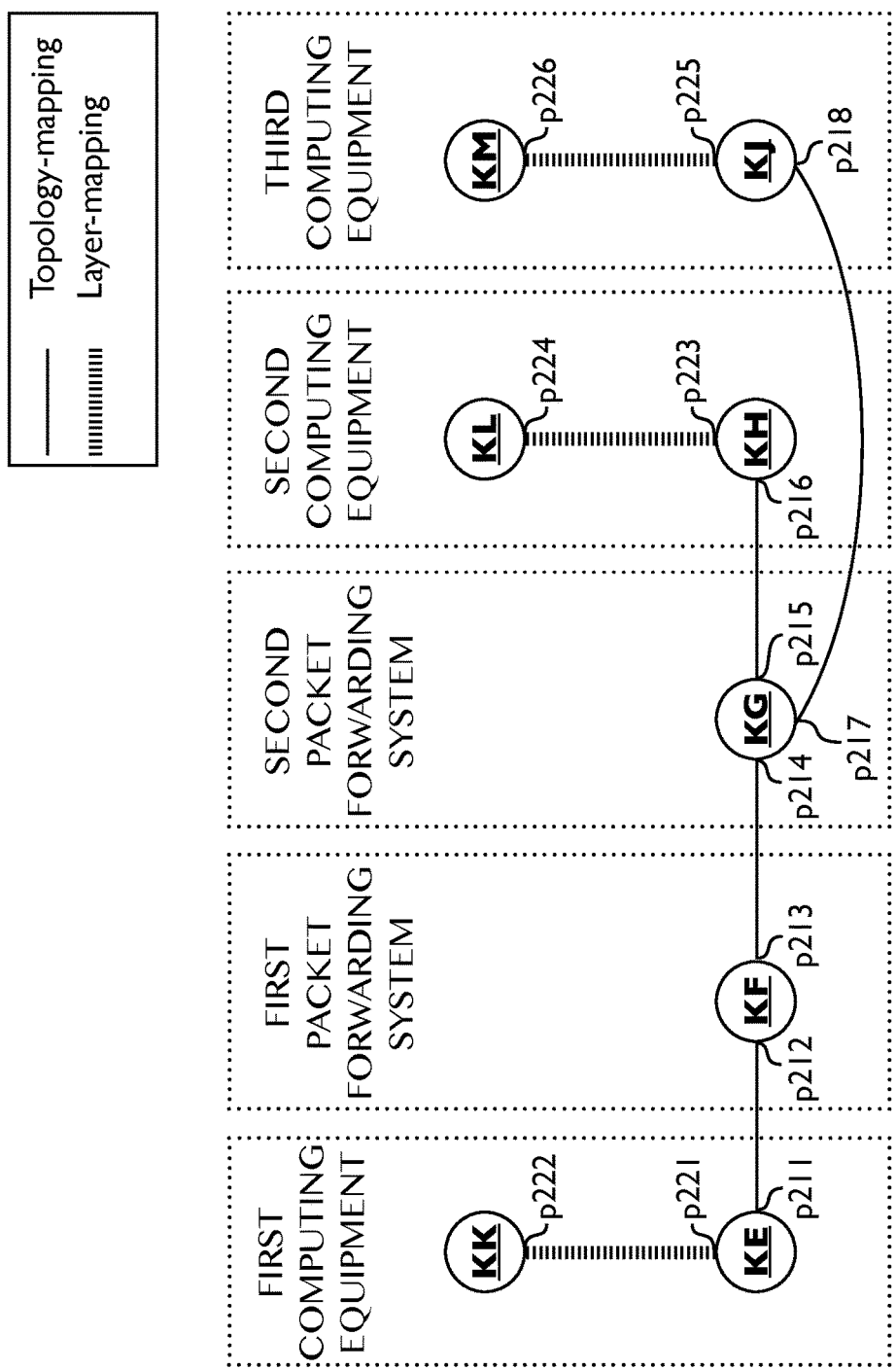
FIG. 16A is a diagram showing a first computing equipment, represented by physical nodes KE and KK, a first packet forwarding system, represented by physical node KF, a second packet forwarding system, represented by physical node KG, a second computing equipment, represented by physical nodes KH and KL, and a third computing equipment, represented by physical nodes KJ and KM, connected by topology-mappings and layer-mappings being physical links.

As an example, but not limited to, said search can be performed against physical network layout shown in FIG. 16A. FIG. 16A shows a first computing equipment, represented by physical nodes KE and KK, a first packet forwarding system, represented by physical node KF, a second packet forwarding system, represented by physical node KG, a second computing equipment, represented by physical nodes KH and KL, and a third computing equipment, represented by physical nodes KJ and KM, connected by topology-mappings and layer-mappings being physical links. FIG. 16A also shows Point-of-Attachment (PoA) p211 through p218 and p221 through p226.

Figure 16B:
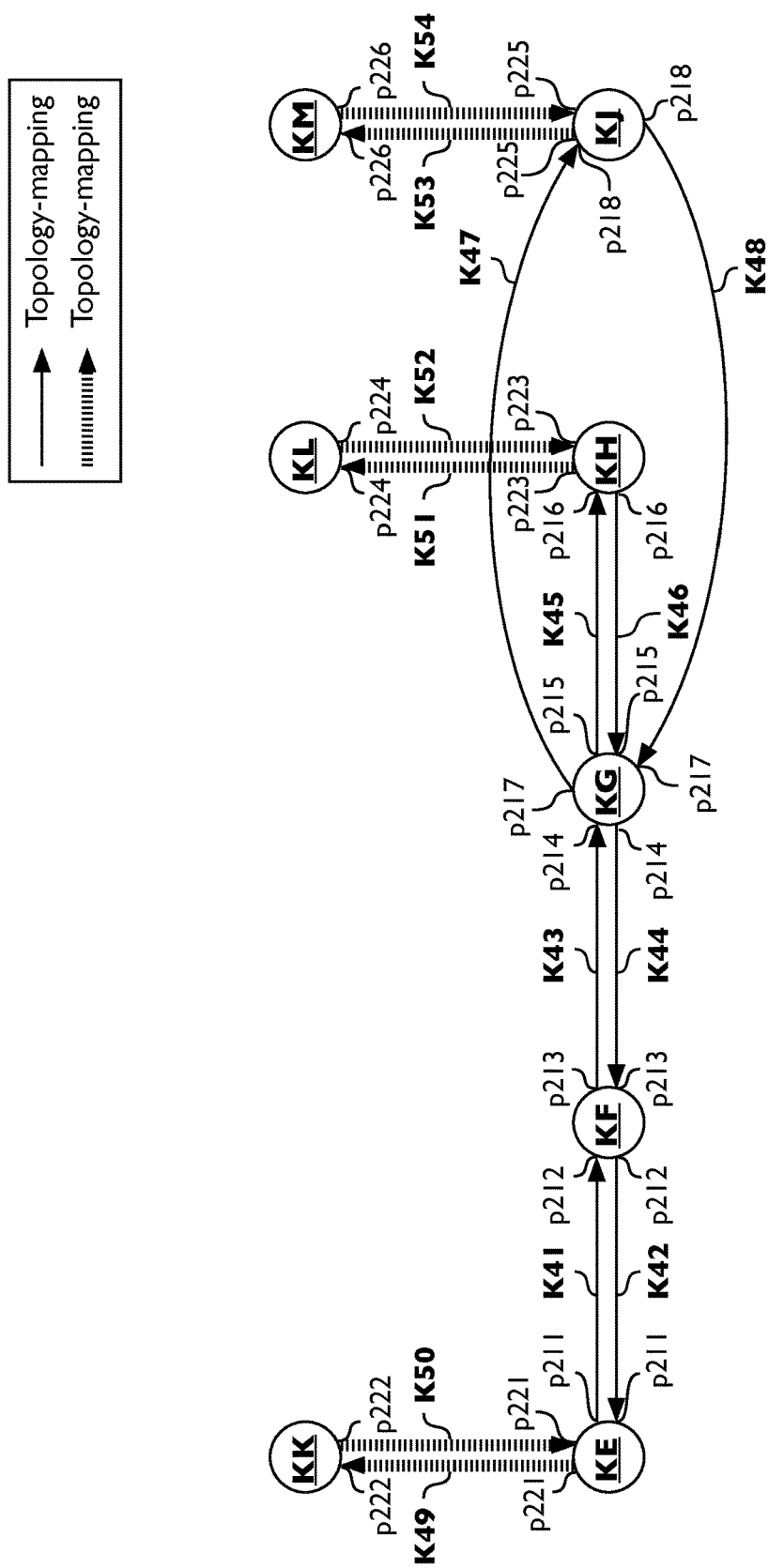
FIG. 16B is a diagram showing physical nodes KE, KF, KG, KH and KJ at (d=0, n=0, h=0) and physical nodes KK, KL and KM at (d=0, n=1, h=0).

We represent the topology-mappings and layer-mappings as directed edges in a graph as shown in FIG. 16B. FIG. 16B shows physical nodes KE, KF, KG, KH and KJ at (d=0, n=0, h=0) and physical nodes KK, KL and KM at (d=0, n=1, h=0). FIG. 16B also shows topology-mappings named K41 through K48 and layer-mappings K49 through K54, represented as directed edges in a graph.

As will be understood by a person skilled in the art, a signal may be switched, multiplexed, de-multiplexed, transmitted or received in a node, depending on the combination of type of an incoming edge of said node and type of an outgoing edge of said node as follows (reference to FIG. 16J):

IF an incoming edge (K43; K1) of a node (KG; FF) is a topology-mapping AND an outgoing edge (K45; K2) of said node is a topology-mapping, perform a switch operation, IF an incoming edge of a node is a layer-mapping increasing in layer AND an outgoing edge of said node is a layer-mapping decreasing in layer, perform a switch operation, IF an incoming edge of a node is a topology-mapping AND an outgoing edge of said node is a layer-mapping decreasing in layer, perform a switch operation, IF an incoming edge of a node is a layer-mapping increasing in layer AND an outgoing edge of said node is a topology-mapping, perform a switch operation, IF an incoming edge (K50; K25) of a node (KE; FE) is a layer-mapping decreasing in layer AND an outgoing edge (K41; K1) of said node is a topology-mapping, perform a multiplex operation, IF an incoming edge of a node is a layer-mapping decreasing in layer AND an outgoing edge of said node is a layer-mapping decreasing in layer, perform a multiplex operation, IF an incoming edge (K47; K2) of a node (KJ; FG) is a topology-mapping AND an outgoing edge (K53; K26) of said node is a layer-mapping increasing in layer, perform a de-multiplex operation, IF an incoming edge of a node is a layer-mapping increasing in layer AND an outgoing edge of said node is a layer-mapping increasing in layer, perform a de-multiplex operation, IF a node has no incoming edge AND an outgoing edge (K50; K25) of said node (KK; FH) is a topology-mapping OR a layer-mapping (K50; K25) decreasing in layer perform a transmit operation, IF an incoming edge (K53; K26) of a node (KM; FJ) is a topology-mapping OR a layer-mapping (K53; K26) increasing in layer AND said node has no outgoing edge perform a receive operation.

We refer to switch operation, multiplex operation, de-multiplex operation, transmit operation and receive operation as 'networking operations'. A networking operation performed by a physical node in a recursive-path can be determined by removing depth-mappings from said recursive-path and using above IF-statements to determine a networking operation performed by said physical node.

A networking operation performed by a logical node can be determined using above IF-statements to determine a networking operation performed by said logical node. One or more of said networking operations, being switch operation, multiplex operation, de-multiplex operation, transmit operation and receive operation, may be stored as a capability of a physical node in the method described above. One or more of said networking operations, being switch operation, multiplex operation, de-multiplex operation, transmit operation and receive operation, may be stored as a requirement of a logical node, and may be included as a requirement in a search statement in the method described above. We refer to a node performing a transmit and/or receive operation as a 'host' node. We refer to a node performing a switch operation as a 'switch' node. We refer to a node performing a multiplex and/or de-multiplex operation as a 'multiplexer' node.

FIG. 16C shows topology-mappings named K41 through K48, and layer-mappings named K49 through K54 per the notation of FIG. 6A. As an example, but not limited to, as physical nodes KK, KL and KM are at the highest layer of a first, second and third computing equipment respectively, we store a node type property with value 'host' for nodes KK, KL and KM. As an example, but not limited to, as physical nodes KE, KH and KJ are not at the highest layer of a first, second and third computing equipment respectively, we store a node type property with value 'multiplexer' for nodes KE, KH and KJ. As an example, but not limited to, as physical nodes KF and KG represent a first and second packet forwarding system respectively, we store a node type property with value 'switch' for nodes KF and KG.

We perform a search comprising of above described fifth search statement "(?X1-?K9[toppath]/K1->?X2) AND (?X2-?K10[toppath]/K2->?X3) AND (?X4-?K32[laymap]/K25->?X1) AND (?X3-?K33[laymap]/K26->?X5)" against the physical network layout shown in FIG. 16B and include requirements that logical nodes FH and FJ are logical host nodes, logical node FF is a logical switch node, and logical nodes FE and FG are multiplexer nodes.

As described above at action d) the requirements of logical nodes FE, FF, FG. FH, FJ are copied to the unknown physical node name ?X1, ?X2, ?X3, ?X4, ?X5 respectively. We do not consider any requirements for the logical topology-mappings named K1 and K2, and we do not consider any requirements for the logical layer-mappings named K25 and K26, therefore the search statement can be reduced to"(?X1-?K9[toppath]->?X2) AND (?X2-?K10[toppath]->?X3) AND (?X4-?K32[laymap]->?X1) AND (?X3-?K33 [laymap]->?X5)", omitting "/K1" and "/K2" and "/K25" and "/K26". The search statement including requirements is, written in pseudo-code:

MATCH (?X1-?K9[toppath]->?X2)
AND
MATCH (?X2-?K10 [toppath]->?X3)
AND
MATCH (?X4-?K32[laymap]->?X1)
AND
MATCH (?X3-?K33[laymap]->?X5)
WHERE node-type ?X1 equals "multiplexer"
AND node-type ?X2 equals "switch"
AND node-type ?X3 equals "multiplexer"
AND node-type ?X4 equals "host"
AND node-type ?X5 equals "host"
RETURN ?X1, ?X2, ?X3, ?X4, ?X5, ?K9, ?K10, ?K32, ?K33

Note that above node-types of unknown physical nodes ?X1 through ?X5 may be determined by above described IF-statements determining networking operations performed by said unknown physical nodes. As an example but not limited to, unknown physical node ?X4 has no incoming edge AND an outgoing edge (?K32) of said unknown physical node (?X4) is a topology-mapping OR a layer-mapping (?K32) decreasing in layer therefore a transmit operation is performed in unknown physical node ?X4 and therefore unknown physical node ?X4 has node-type 'host'.

Above search statement will return a number of matches including the match shown in FIGS. 16D, 16E and 16F. FIG. 16D shows how unknown physical nodes ?X1, ?X2, ?X3, ?X4, ?X5 are matched against physical nodes KE, KG, KJ, KK, KM, respectively. FIG. 16E shows how the unknown physical topology-path named ?K9 is matched against a physical topology-path, which is named K9 for consistency, comprising of a concatenation of the physical topology-mappings named K41 and K43. FIG. 16E shows how the unknown physical topology-path named ?K10 is matched against a physical topology-path, which is named K10 for consistency, comprising of the physical topology-mapping named K47. FIG. 16F shows how the unknown physical layer-mappings named ?K32 and ?K33 are matched against a physical layer-mappings named K50 and K53, respectively.

Per action d) (extended) above we replace and store each unknown physical topology-path by a physical topology-path, said physical topology-path being a concatenation of one or more physical topology-mappings, and we replace and store each unknown physical layer-mapping by a physical layer-mapping, and we replace each unknown physical node by a physical node in accordance with a result of said search. In the example described above, we replace and store the unknown physical topology-path named ?K9 by a physical topology-path named K9, we replace and store the unknown physical topology-path named ?K10 by a physical topology-path named K10, we replace and store the unknown physical layer-mapping named ?K32 by a physical layer-mapping named K50, we replace and store the unknown physical layer-mapping named ?K33 by a physical layer-mapping named K53, and we replace the unknown physical nodes ?X1, ?X2, ?X3, ?X4, ?X5 by the physical nodes KE, KG, KJ, KK, KM respectively, in accordance with a result of the search described above.

As a result, the depth-mappings named K3 through K8 and K28 through K31 have become depth-mappings between logical nodes FE, FF, FG, FH, FJ and physical nodes KE, KG, KJ, KK, KM respectively as shown in FIG. 16G, in comparison to FIG. 15C in which the depth-mappings named K3 through K8 and K28 through K31 were depth-mappings between logical nodes FE, FF, FG, FH, FJ and unknown physical nodes ?X1, ?X2, ?X3, ?X4, ?X5. As a result, the topology-mappings K1 and K2 have become "topmap K1=K4/K1+K9/K1+K5/K1" and "topmap K2=K6/K2+K10/K2+K7/K2" respectively, as shown in FIG. 16H, in comparison to FIG. 15D.

Figure 16I:
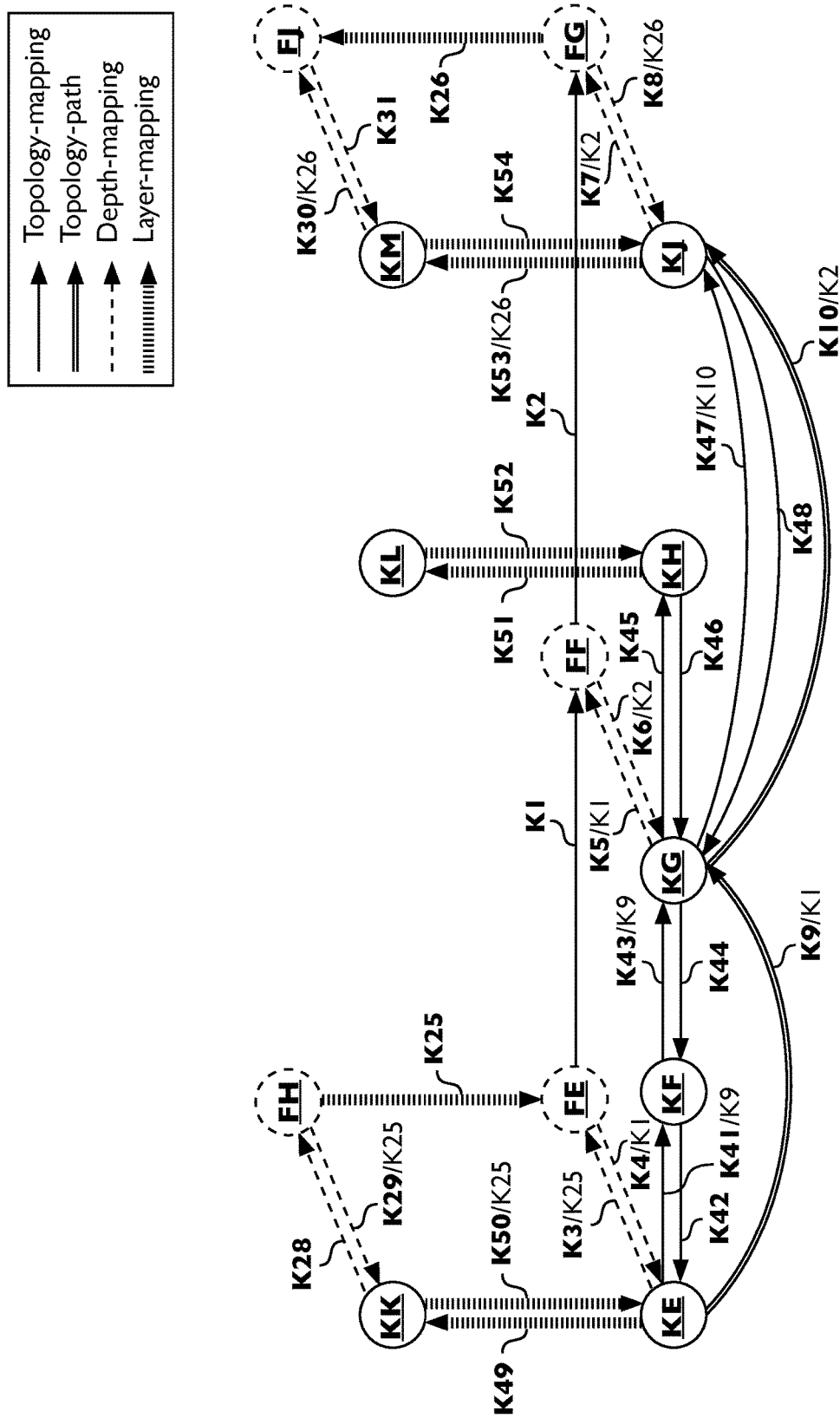
FIG. 16I is a diagram showing logical nodes FE, FF and FG at (d=1, n=0, h=0), logical nodes FH and FJ at (d=1, n=1, h=0), physical nodes KE, KF, KG, KH, KJ at (d=0, n=0, h=0), and physical nodes KK, KL and KM at (d=0, n=1, h=0).

As a result, the layer-mappings K25 and K26 have become "laymap K25=K29/K25+K50/K25+K3/K25" and "laymap K26=K8/K26+K53/K26+K30/K26" respectively, as shown in FIG. 16H, in comparison to FIG. 15D. This is illustrated in FIG. 16I. FIG. 16I shows logical nodes FE, FF and FG at (d=1, n=0, h=0), logical nodes FH and FJ at (d=1, n=1, h=0), physical nodes KE, KF, KG, KH, KJ at (d=0, n=0, h=0), and physical nodes KK, KL and KM at (d=0, n=1, h=0). FIG. 16I also shows topology-mappings named K1, K2, K41 through K48, depth-mappings named K3 through K8 and K28 through K31, layer-mappings named K25, K26 and K49 through K54, and physical topology-paths named K9 and K10, represented as directed edges in a graph.

PCT/EP2014/055640 (page 175) describes a second method for calculating a topology-mapping, comprising the following actions (in slightly modified wording):

Calculating and storing a first topology-mapping from a first network at (d, n, h1) to a second network at (d, n, h1) as a concatenation of a first layer-mapping from said first network to a third network at (d, n-y, h2), a topology-path from said third network to a fourth network at (d, n-y, h2) and a second layer-mapping from said fourth network to said second network with y being larger than zero and smaller than or equal to n-n_min(d), n_min(d) being a lowest layer at particular depth d and n_min(d) being=>0, said topology-path being a concatenation of one or more second topology-mappings, optionally storing for each of said topology-mappings edge-relationships comprising a first edge-relationship being a relationship between the first layer-mapping and said first topology-mapping, one or more second edge-relationships each second edge-relationship being a relationship between one of said one or more second topology-mappings in said topology-path and said first topology-mapping or a second edge-relationship being a relationship between said topology-path and said first topology-mapping and one or more fourth edge-relationships each fourth edge-relationship being a relationship between one of said one or more second topology-mappings and said topology-path, and a third edge-relationship being a relationship between the second layer-mapping and said first topology-mapping, Note that in the above description of said second method for calculating a topology-mapping a topology-path is used instead of a topology-level-path to aid the explanation. The described method can also be applied when using a topology-level-path in the second method for calculating a topology-mapping.

Figure 16J:
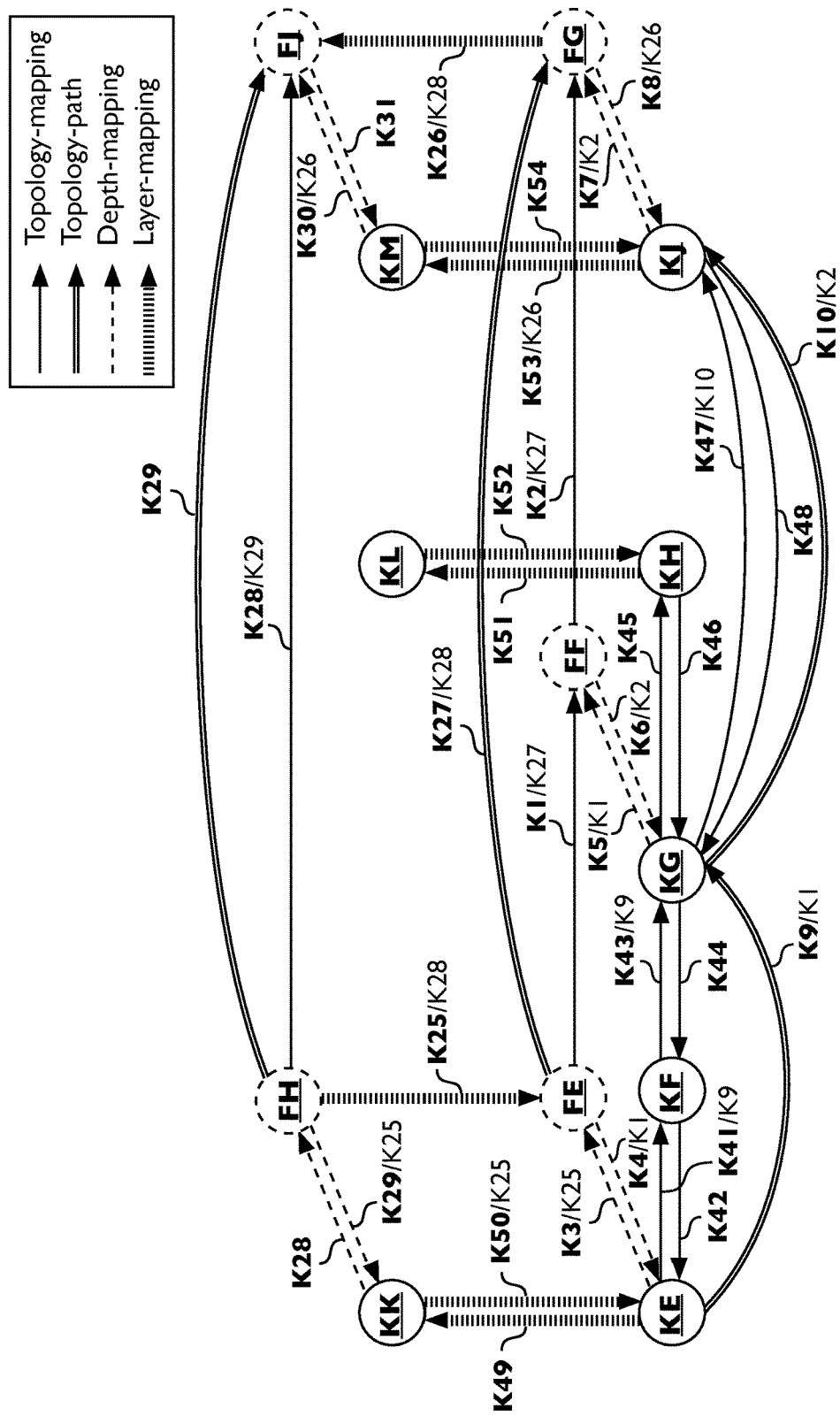
FIG. 16J is a diagram showing logical nodes FE, FF and FG at (d=1, n=0, h=0), logical nodes FH and FJ at (d=1, n=1, h=0), physical nodes KE, KF, KG, KH, KJ at (d=0, n=0, h=0), and physical nodes KK, KL and KM at (d=0, n=1, h=0).

As described above, we additionally create and store a logical topology-mapping named K34, per the logical network diagram shown in FIG. 15A, using the second method to calculate a topology-mapping. The topology-mapping named K34 is calculated as a concatenation of a layer-mapping named K25, a topology-path named K27 and a layer-mapping named K26. The topology-path named K27 comprises of a concatenation of topology-mappings named K1 and K2, as shown in FIGS. 15A, 15D and 16J. FIG. 15D uses the notation of FIG. 6C.

We consider a topology-path K35, per the logical network diagram shown in FIG. 15A, to be a requested topology-path for which forwarding entries should be created. We calculate the recursive-path of a requested topology-path named K35, as described above. Using edges K1, K2, K25, K6 shown in FIG. 16H, edges K27, K34, K35 shown in FIG. 15D, and edges K9 and K10 shown in FIG. 16E, we recursively calculate said recursive-path and a set of edge-relationships comprising nested edge-relationships for each edge, as shown in FIG. 17A. PCT/EP2014/055640 (page 197) describes that as only a subset of the set of switching-identifiers is used, not all nested edge-relationships have to be calculated.

In the method we calculate from said recursive-path forwarding entries for a requested topology-level-path. The recursive-path contains the following information for each node at d=0, h=h_min being a physical node (cf. PCT/EP2014/055640 pages 192 and 193):

an input port, being a PoA between the physical or virtual node and a topology-mapping or a layer-mapping, with the exception of the first node in the recursive-path which does not have an input port as the packet or signal is created by the first node in the recursive-path an output port, being a PoA between the physical or virtual node and a topology-mapping or a layer-mapping, with the exception of the last node in the recursive-path which does not have an output port as the packet or signal is received by the last node in the recursive-path Additionally, when a set of edge-relationships has been calculated for each edge, the recursive-path also contains:

a set of incoming edge-relationships at the incoming topology-mapping or layer-mapping with the exception of the first node in the recursive-path which does not have an incoming topology-mapping or a layer-mapping a set of outgoing edge-relationships at the outgoing topology-mapping or layer-mapping with the exception of the last node in the recursive-path which does not have an outgoing topology-mapping or a layer-mapping The number of edges within a set of incoming and/or outgoing edge-relationships may be reduced by determining a relevant incoming and/or outgoing set of edge-relationships as described above (cf PCT/EP2014/055640, page 197). The combination of above input port, output port, a set of incoming edge-relationships, a set of outgoing edge-relationships, and switching-identifiers of incoming set of edge-relationships and switching-identifiers of outgoing set of edge-relationships results in forwarding entries for physical nodes KE, KF, KG, KJ, KK, KM. As an example but not limited to, the switching-identifiers for edges K27, K35 and K41 through K48 shown in FIG. 17C may be used.

We present in alternative method to create forwarding entries, in which the amount of recursively calculated and stored nested edge-relationships is reduced. As will be understood by a person skilled in the art, typically different layers use different identifiers and forwarding or switching is performed based on the identifiers of said layer. We perform the following action:

a) Calculating through recursion and storing a recursive-path for said requested-topology-path (K35), and calculating and storing nested edge-relationships except said second edge-relationship (K27/K34) calculated using the second method for calculating topology-mappings, and any following edge-relationships (K34/K35).

Note that any following second edge-relationships of a first edge-relationship denotes any second edge-relationships multiplexed or mapped to said first edge-relationship. For example, but not limited to, in the edge-relationship "x/y/z", the edge-relationship "y/z" is a following edge-relationship of the edge-relationship "x/y".

This is illustrated in FIGS. 15D and 17A. In FIG. 15D the topology-mapping named K34 is calculated using the second method for calculating topology-mappings. As shown in step 2 of FIG. 17A, in the calculation of a recursive-path of the requested topology-path named K35, as the topology-mapping K34 is calculated using the second method for calculating topology-mappings, not calculating and storing nested edge-relationships for the topology-path named K27 and any further edge-relationships, as denoted by crossing out of "/K34/K35". Note that a topology-level-path can be a single topology-path or can be a single level-path. Note that when creating a topology-mapping the topology-level-path used in the calculation of the topology-mapping can either be a topology-level-path that is explicitly created or can be concatenation of topology-mappings and level-mappings. Note that using above method reduces the amount of recursively calculated and stored nested edge-relationships, having the advantage of speeding up the calculation process. In step 6 of FIG. 17A results from combining step 5 of FIG. 17A with the edges in FIGS. 16C and 16G.

FIG. 17B shows for each physical node in the recursive-path calculated from the requested topology-path named K35 an input port, an output port, incoming set of edge-relationships and outgoing set of edge-relationships.

We perform the following actions:

b) After the calculation of a recursive-path of a requested-path, removing from an incoming set of edge-relationships of all incoming layer-mappings decreasing in layer of all physical nodes in said recursive-path, said first edge-relationship calculated using the second method for calculating topology-mappings, and any following edge-relationships, c) After the calculation of a recursive-path of a requested-path, removing from an outgoing set of edge-relationships of all outgoing layer-mappings increasing in layer of all physical nodes in said recursive-path, said third edge-relationship calculated using the second method for calculating topology-mappings, and any following edge-relationships, This is illustrated in FIG. 17B.

Per action b) at physical node KE from the incoming layer-mapping decreasing in layer named K50 removing from an incoming set of edge-relationships, edge-relationships calculated using the second method for calculating topology-mappings "K25/K34", as shown in the third row of FIG. 17B, and any following edge-relationships, "K34/K35", as denoted by crossing out of "/K34/K35".

Per action c) at physical node KJ from the incoming layer-mapping increasing in layer named K53 removing from an incoming set of edge-relationships, nested edge-relationships calculated using the second method for calculating topology-mappings "K26/K34", as shown in the sixth row of FIG. 17B, and any following edge-relationships, "K34/K35", as denoted by crossing out of "/K34/K35".

In FIG. 17B edges for which a switching-identifier exists, per FIG. 17C, are shown in bold. As a first example, but not limited to, we consider physical nodes named KE, KF, KG, KH, KJ to have physical datalink layer (OSI layer 2) Media Access Control (MAC) and network layer (OSI layer 3) functionality. Also, we consider an user of an SDN compiler to have specified, in combination with the specification of the logical network diagram shown in FIG. 15A, which switching characteristics apply at a particular depth d>0 and layer n. As an example, but not limited to, such switching-characteristic might be to consider a particular depth d>0, layer n to be a network layer (OSI layer 3), forwarding on IPv4 source and IPv6 destination addresses. As an example, but not limited to, such switching-characteristic might be to consider a particular depth d>0, layer n to be a network layer (OSI layer 3) using a 3-tuple of an IPv6 Source Address, an IPv6 Destination Address and a IPv6 Flow Label, providing IPv6 flow classification. As an example, but not limited to, such switching-characteristic might be to consider a particular depth d>0, layer n to be a transport layer (OSI layer 4) using a protocol number. As an example, but not limited to, such switching-characteristic might be to consider a particular depth d>0, layer n to be a combined transport layer (OSI layer 4) and application layer (OSI layer 7) using a 3-tuple of a protocol number, a source well known port and a destination well known port. As will be understood by a person skilled in the art, said switching-characteristics apply to all nodes and networks at a particular depth d>0 and layer n. Said switching-characteristics may include naming and addressing, a packet format and expected forwarding behavior. As will be understood by a person skilled in the art, switching-identifiers are determined by applying switching-characteristics to particular networks and nodes. As an example, in case switching-characteristics at a particular depth d>0, layer n are a network layer (OSI layer 3) using forwarding on IPv4 source and IPv6 destination addresses, to a first node a first IPv4 address might be assigned by for example but not limited to a Dynamic Host Control Protocol (DHCP) server, and to a second node an second IPv4 address might be assigned by for example but not limited to a DHCP server. Now, for example but not limited to a switching-identifier of a topology-path from said first node to said second node could now comprise of said first address as source node and said second address as destination node.

As described above, requirements logical nodes may be copied to an unknown physical node mapped to said logical node through one or more depth-mappings. Said requirements might include switching-characteristics.

As a first example, but not limited to, we consider physical nodes named KK and KM have transport layer (OSI layer 4) and application layer (OSI layer 7) functionality. We consider nodes at (d=1, n=0, h=0) to represent logical nodes at the networking layer (OSI layer 3). And consider nodes at (d=1, n=1, h=0) to represent logical nodes at the transport layer (OSI layer 4) and application layer combined (OSI layer 7). FIG. 17C shows, as an example but not limited to, switching-identifiers for the edges named K41 through K48, K27 and K35. The switching-identifier of edge K41 is 'Source p211, Destination p212', at (d=0, n=0, h=0), denoting physical PoA's at the datalink layer, performing Media Access Control (MAC). As will be understood by a person skilled in the art, in an implementation an Ethernet MAC address could be used as Point-of-Attachment (PoA), instead of the example PoAs p211 and p212 used in this example. The switching-identifier of edges K42 through K48 also denote physical PoA's at the datalink layer, performing MAC. At (d=1, n=0, h=0) we use the 3-tuple of an IPv6 Source Address, an IPv6 Destination Address and a IPv6 Flow Label, providing IPv6 flow classification. We use an IPv6 address denoting a Point-of-Attachment, being an interface, of logical node FE and the topology-mapping named K1 with value '1:2:3:4:11:11:11:10'. We use an IPv6 address denoting a Point-of-Attachment, being an interface, of logical node FG and the topology-mapping named K2 with value '1:2:3:5:11:11:11:13. The switching-identifier of edge K27 is 'Source 1:2:3:4:11:11:11:10, Destination 1:2:3:5:11:11:11:13, FLOW-LABEL 100', as shown in FIG. 17C. Note that in the representation of the Source and Destination IPv6 addresses leading zeroes have been omitted. A value '100' is used for the IPv6 Flow Label. Alternatively, as described in PCT/EP2014/055640 (page 245), within an IPv6 address the Interface Identifier of an IPv6 address could be used to identify the logical node, while the remainder of the address, consisting of networks that are not nodes, could be denoted by subnetting of the IPv6 Global Routing Prefix and/or Subnet Identifier address.

To allow for mobility, in general terms, a first topology-mapping between a first physical node and a second physical node is removed and a second topology-mapping between said second physical node and a third physical node is created resulting in mobility of said second physical node. For instance, a node could use as its IPv6 address an IPv6 Interface Identifier identifying the node and a special value denoting 'unspecified' as IPv6 Global Routing Prefix or Subnet Identifier. In other words, the address only specifies the node, not the network the node is residing in. Therefore, higher layer protocols such as, but not limited to, TCP as well as applications are not impacted in case of migration of the node to another network. Alternatively, as described in PCT/EP2014/055640 (page 250), an IPv6 address can be used to identify a node and an IPv6 address can be used to identify a network which is not a node, allowing for mobility. At (d=1, n=1, h=0) we use the 3-tuple of a Protocol (being a transport identifier), a Source Port and a Destination Port. The switching-identifier of edge K35 is the 3-tuple of 'TCP, Source port 80, Destination port 80' denoting the combination of 'Transmission Control Protocol' and well-known port 80 used for HTTP, as both source and destination. Alternatively, 'PROTOCOL=6' could have been used instead of 'TCP', denoting the TCP protocol.

Note that edges other than edges K41 through K48, K27 and K35 do not have a switching-identifier assigned.

The resulting forwarding entries are shown in FIG. 17D. FIG. 17D shows for each physical node KE, KF, KG, KJ, KK, KM in the recursive-path calculated from the requested topology-path named K35 an input port, an output port, incoming set of edge-relationships with switching-identifier and outgoing set of edge-relationships with switching-identifier. Note that only edges of an incoming set of edge-relationships and edges of an outgoing set of edge-relationships are shown which have a switching-identifier assigned, per FIG. 17C.

Note that as an alternative to action a) above, the following action could be performed all nested edge-relationships could be calculated and stored and the following action could be performed:

a) After the calculation of a recursive-path of a requested-path, removing from all sets of edge-relationships containing said second edge-relationship said second edge-relationship (K27/K34) calculated using the second method for calculating topology-mappings of all physical nodes in said recursive-path (KE; KF; KG; KJ; KK; KM), and any following edge-relationships (K34/K35), We present a method to calculate forwarding instructions for a physical node in a Packet-Switching Network (PSN) and for a physical node in a non-PSN We distinguish between a physical node in a Packet-Switching Network (PSN) and a physical node in a non-PSN. A physical node in a PSN, referred to as a physical packet-switching node, performs forwarding and statistical multiplexing of packets. A physical node in a non-PSN, referred to as physical non-packet-switching node, performs relaying and multiplexing of physical signals. An example, but not limited to, of a non-PSN is a Circuit-Switching Node (CSN). An example, but not limited to, of a non-PSN is a node in a wireless network performing multiplexing of physical signals. Forwarding entries are calculated for a physical packet-switching node, referred to as node in below method, within the recursive-path of a requested topology-path, level-path or topology-level-path by performing the below method comprising the following actions:

i. if the recursive-path does not contain an incoming topology-mapping or an incoming layer-mapping for said node, and said node is mapped to a source network of the recursive-path through one or more depth-mappings, creating for each outgoing topology-mapping and each outgoing layer-mapping of said node in said recursive-path a forwarding entry instructing said physical packet-switching node to create a packet with a packet overhead containing the switching-identifiers of the outgoing set of edge-relationships of said outgoing topology-mapping or said outgoing layer-mapping, and to send said packet out of an output port, said output port being a point-of-attachment between said node and said outgoing topology-mapping or said outgoing layer-mapping, ii. else if the recursive-path does not contain an outgoing topology-mapping or an outgoing layer-mapping for said node, and said node is mapped to a destination network of the recursive-path through one or more depth-mappings, creating for each incoming topology-mapping and each incoming layer-mapping of said node in said recursive-path a forwarding entry instructing said node to receive at an input port a packet in accordance with the switching-identifiers of the incoming set of edge-relationships of said incoming topology-mapping or said incoming layer-mapping, said input port being a point-of-attachment between said node and said incoming topology-mapping or said incoming layer-mapping, iii. else if the recursive-path does contain one incoming topology-mapping or one incoming layer-mapping for said node and the recursive-path does contain one or more outgoing topology-mappings or outgoing layer-mappings for said node, creating for each outgoing topology-mapping and each outgoing layer-mapping of said node in said recursive-path a forwarding entry instructing said node to receive an incoming packet at an input port, said input port being a point-of-attachment between said node and said incoming topology-mapping or said incoming layer-mapping specified by the recursive-path, said packet in accordance with the switching-identifiers of the incoming set of edge-relationships of said incoming topology-mapping or said incoming layer-mapping and to modify said packet in accordance with the switching-identifiers of the outgoing set of edge-relationships of said outgoing topology-mapping or said outgoing layer-mapping, and to forward said packet out of an output port, said output port being a point-of-attachment between said node and said outgoing topology-mapping or said outgoing layer-mapping.

We refer to a physical packet-switching node at action i) above as a sending host node. We refer to a physical packet-switching node at action ii) above as a receiving host node. We refer to a physical packet-switching node at action iii) above as a switching node. For a topology-mapping from a first network to a second network, we refer to said topology-mapping as an outgoing topology-mapping of the first network and we refer to said topology-mapping as an incoming topology-mapping of the second network. For a layer-mapping from a first network to a second network, we refer to said layer-mapping as an outgoing layer-mapping of the first network and we refer to said layer-mapping as an incoming layer-mapping of the second network.

Forwarding entries are calculated for a physical non-packet-switching node, referred to as node in below method, within the recursive-path of a requested topology-path, level-path or topology-level-path by performing the below method comprising the following actions:

i. if the recursive-path does not contain an incoming topology-mapping or an incoming layer-mapping for said node, and said node is mapped to a source network of the recursive-path through one or more depth-mappings, creating for each outgoing topology-mapping and each outgoing layer-mapping of said node in said recursive-path an instruction instructing said node to create a signal in accordance with the switching-identifiers of the outgoing set of edge-relationships of said outgoing topology-mapping or said outgoing layer-mapping, and to send said signal out of an output port, said output port being a point-of-attachment between said node and said outgoing topology-mapping or said outgoing layer-mapping, ii. else if the recursive-path does not contain an outgoing topology-mapping or an outgoing layer-mapping for said node, and said node is mapped to a destination network of the recursive-path through one or more depth-mappings, creating for each incoming topology-mapping and each incoming layer-mapping of said node in said recursive-path an instruction instructing said node to receive at an input port a signal in accordance with the switching-identifiers of the incoming set of edge-relationships of said incoming topology-mapping or said incoming layer-mapping, said input port being a point-of-attachment between said node and said incoming topology-mapping or said incoming layer-mapping, iii. else if the recursive-path does contain one incoming topology-mapping or one incoming layer-mapping for said node and the recursive-path does contain one or more outgoing topology-mappings or outgoing layer-mappings for said node, creating for each outgoing topology-mapping and each outgoing layer-mapping of said node in said recursive-path an instruction instructing said node to receive an incoming signal at an input port, said input port being a point-of-attachment between said node and said incoming topology-mapping or said incoming layer-mapping specified by the recursive-path, said signal in accordance with the switching-identifiers of the incoming set of edge-relationships of said incoming topology-mapping or said incoming layer-mapping and modify said signal in accordance with the switching-identifiers of the outgoing set of edge-relationships of said outgoing topology-mapping or said outgoing layer-mapping, and forward said signal out of an output port, said output port being a point-of-attachment between said node and said outgoing topology-mapping or said outgoing layer-mapping Reference is made to forwarding entries also in the case of a non-packet-switching network as the SDN Compiler provides a uniform approach to create instructions for both packet-switching nodes and non-packet-switching nodes. A forwarding entry in case of a non-packet-switching network is an instruction specifying how an incoming signal at an input port should be relayed to an output port after optional modification of said incoming signal.

As an example but not limited to, in case of a WDM ROADM, the SDN Compiler creates an instruction specifying how an incoming wavelength at an input port should be relayed, also referred to as cross-connected, to an output port after optional modification of said incoming wavelength, such as for example changing the frequency of the incoming wavelength.

Note that in case of action iii) and more than one output port, the incoming signal is duplicated and send out of more than one output ports. In step i) and step iii) of the method to create forwarding entries for a physical non-packet-switching node described above, in case of two or more outgoing topology-mappings or outgoing layer-mappings, an instruction is created for each outgoing topology-mapping or outgoing layer-mapping. As will be understood by a person skilled in the art, alternatively a single instruction can be created specifying output port and switching-identifiers of two or more outgoing topology-mappings or outgoing layer-mappings.

We apply the method described above for creating forwarding entries for a physical packet-switching to physical node KE, KF, KG, KJ, KK and KM as shown in FIG. 17D. Above forwarding entries are sent to the physical nodes in the recursive-path, either directly or indirectly, as an example but not limited to, through an SDN Controller.

In present IT (Information Technology) deployments there is a loose coupling between networking on one hand, and storage and compute on the other hand. As a result, networks have limited visibility of applications and applications have limited visibility of networks, resulting in sub-optimal performance op IT resources. Also, network operators have limited visibility of applications and their requirements and application developers have limited visibility of networking capabilities, resulting in sub-optimal software development, and application and network operations. PCT/EP2014/055640 describes a SDN Compiler method. A tighter coupling between networking, storage and compute is created by applying said SDN Compiler method to an overall network in which a logical node at a highest layer denotes logical storage or logical compute and in which a requested topology-level-path denotes a logical message-stream. Note that said highest layer is the layer comprising of logical nodes denoting logical storage or logical compute, not the 'application layer' (OSI layer 7).

Figure 20:
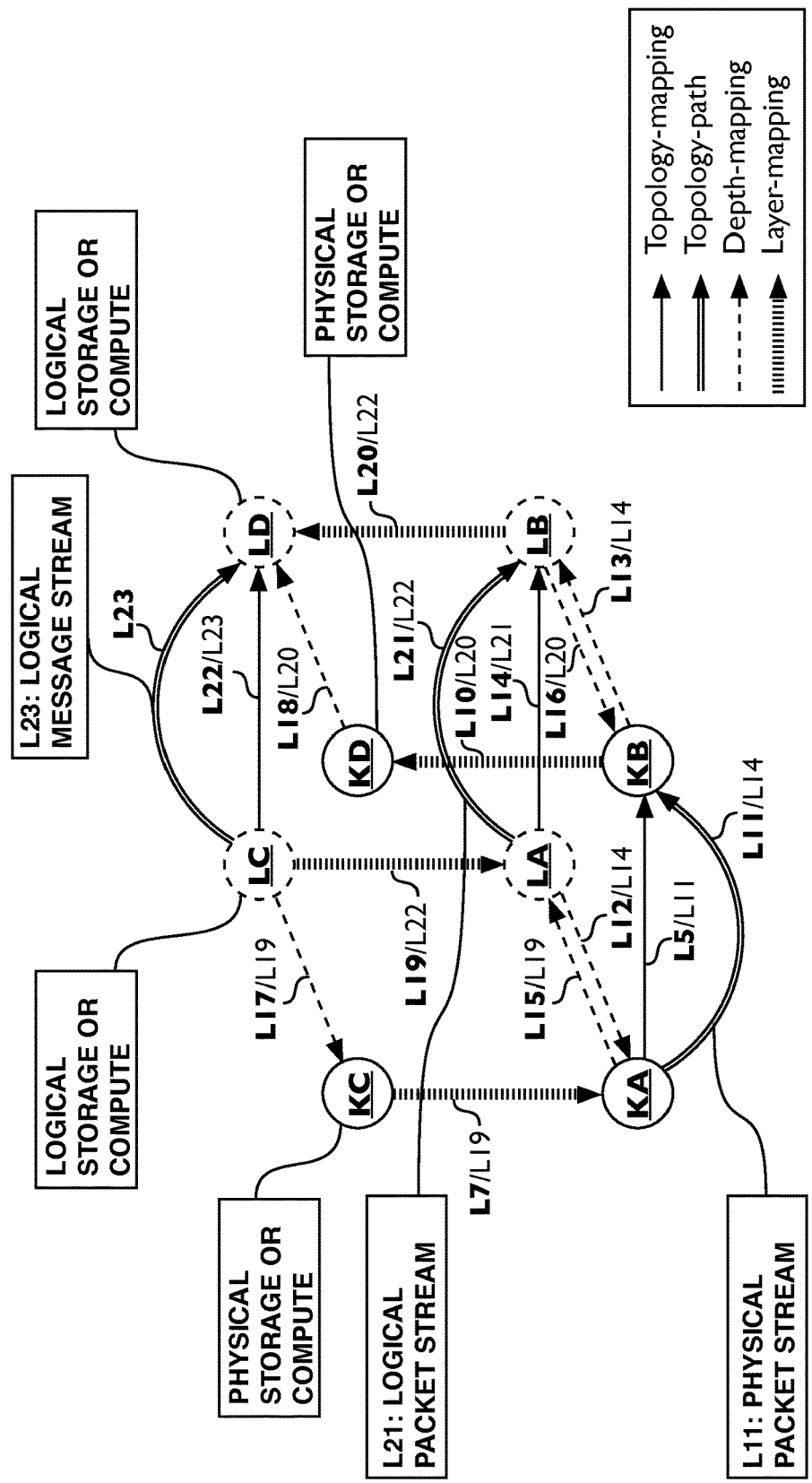
FIG. 20 is a diagram showing networks KA, KB, KC, KD, LA, LB, LC, LD and topology-mappings named L5, L14 and L22, depth-mappings named L12, L13, L15, L16, L17 and L18, layer-mappings named L7, L10, L19 and L20 and topology-paths named L11, L21 and L23, and edge-relationships.

The method described in PCT/EP2014/055640 is applied to an overall network in which a logical node at a highest layer denotes logical storage or logical compute and in which a requested-topology-level-path denotes a logical message-stream. This is illustrated in FIG. 20. FIG. 20 shows networks KA, KB, KC, KD, LA, LB, LC, LD and topology-mappings named L5, L14 and L22, depth-mappings named L12, L13, L15, L16, L17 and L18, layer-mappings named L7, L10, L19 and L20 and topology-paths named L11, L21 and L23, and edge-relationships. Note that FIG. 20 is identical to FIG. 5F, except for the commenting text. FIG. 20 shows a topology-path named L23 denoting a logical message stream. As will be understood by a person skilled in the art a logical message stream is created from a first logical abstraction of a first physical storage or compute resource, to a second logical abstraction of a second physical storage or compute resource. In the example of FIG. 20, but not limited to, said first logical abstraction of said first physical storage or compute resource is logical node LC, said second logical abstraction of said second physical storage or compute resource is logical node LD, said first physical storage or compute resource is physical node KC, and said second physical storage or compute resource is physical node KD. As will be understood by a person skilled in the art messages exchanged over said message-stream are created by a first logical node denoting storage or compute and are acted upon a by second logical node denoting storage or compute. Examples of acting upon a message by a logical node denoting storage or compute include, but are not limited to, storing (part of) said message, responding to said message, performing a function (computation) based on (part of) said message and storing the result of the computation locally, performing a function (computation) based on (part of) said message and sending the result of the computation to the sender, optionally modifying and forwarding (part of) said message, performing a function (computation) based on (part of) said message and forwarding the result of said computation to another logical node denoting storage or compute, not being the sender of the message. An example of, but not limited to, storing (part of) said message is a RESTful HTTP PUT method [REST=REpresentational State Transfer], [HTTP=HyperText Transfer Protocol]. An example of, but not limited to, responding to said message, is a HTTP-response, responding to an HTTP-request. An example of, but not limited to, performing a function (computation) based on (part of) said message and sending the result of said computation back to the sender is a SOAP RPC [SOAP=Simple Object Access Protocol], [RPC=REMOTE PROCEDURE CALL]. An example of, but not limited to, performing a function (computation) based on (part of) said message and forwarding the result of said computation to a logical node denoting storage or compute, said logical node not being the sender of said message is a distributed computation. In FIG. 20, the topology-path named L23, denoting a logical message-stream, is a requested topology-path resulting in forwarding instructions for physical networking, compute and storage resources per the SDN Compiler method described in PCT/EP2014/055640. FIG. 20 shows that the topology-path named L21 is a logical packet stream. The topology-path named L23, being a logical message stream, is multiplexed to the topology-path named L21 being a logical packet stream. A message-stream is typically carried in the payload of packets in a packet-stream. FIG. 20 shows that the topology-path named L11 is a physical packet stream using a physical link in the direction from physical node KA to physical node KB denoted by the topology-mapping named L5.

Figures 17E, 17F:
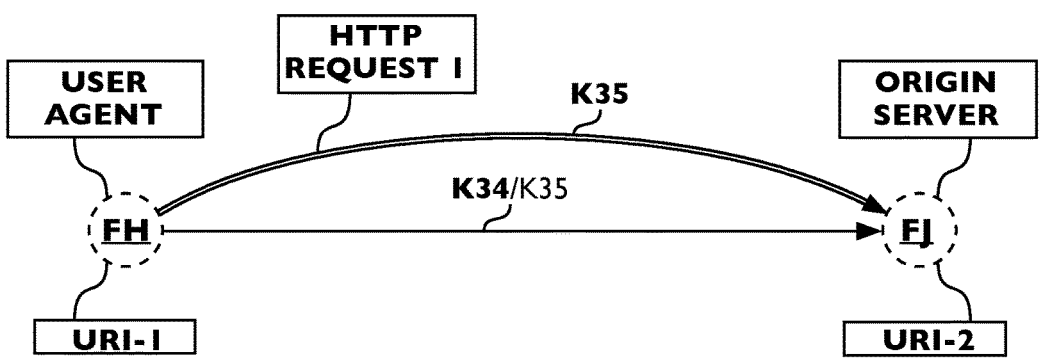
FIG. 17E is a diagram showing switching-identifiers for the edges named K41 through K48, K27 and K35.
FIG. 17F is a diagram showing logical node FH, being a user agent with logical name URI-1, and logical node FJ, being an origin server with logical name URI-2, topology-mapping named K34, and topology-path named K35 denoting 'HTTP Request 1'.

A tighter coupling between networking, storage and compute is created by applying above described method to an overall network in which a logical node at a highest layer denotes logical storage or logical compute and in which a requested topology-level-path denotes a logical message-stream. As an example, but not limited to, we consider physical node KK and KM at (d=0, n=1, h=0) to represent physical storage or compute and consider logical nodes FH and FJ at (d=1, n=1, h=0) to represent logical storage or compute. As shown in FIG. 17F, a requested topology-path named K35 now denotes a HTTP request named "HTTP Request 1", from logical node FH, being a user agent, to logical node FJ, being an origin server. We consider the logical nodes FE, FF and FG at (d=1, n=0, h=0) to forward on a 5-tuple of an IPv4 source address, an IPv4 destination address, a protocol, a source port and a destination port. As will be understood by a person skilled in the art, typically such 5-tuple would be split over more than one layer, but using a 5-tuple at (d=1, n=0, h=0) server our example. The switching-identifiers for edges K41 through K48, K27 and K35 are shown in FIG. 17E. We apply the method described above resulting in a number of matches including the match shown in FIGS. 16D, 16E and 16F. As described above, forwarding instructions are by combining for each physical node in the recursive-path calculated from the requested topology-path named K35 an input port, an output port, incoming set of edge-relationships and outgoing set of edge-relationships, as shown in FIG. 17B, and switching-identifiers, as shown in FIG. 17E. The resulting forwarding instructions are shown in FIG. 17G.

As will be understood by a person skilled in the art, the switching-identifier named K27 determines a packet header, while the switching-identifier named K35 determines a packet payload. Note that a requested topology-level-path could be a single message-stream, such as shown in FIG. 17F a single HTTP request HTTP Request 1'. More practical, a requested topology-level-path could be a set of message-streams, such as multiple HTTP requests. Note that the user of the SDN Compiler defining, or requesting, a requested topology-level-path representing a message-stream could be a person, such as for example, but not limited to, a Software Developer, IT architect, IT operator. Note that the user of the SDN Compiler defining, or requesting, a requested topology-level-path representing a message-stream could be a program, such as for example but not limited to a compiler or a cloud orchestration system. Note that a topology-level-path can comprise of a single topology-path. Note that in this example the switching-identifier of the topology-path named K35 is the 5-tuple of 'Source IP address, destination IP address, TCP, Source port 80, Destination port 80'. As will be understood by a person skilled in the art, so-called 'well-known TCP port' 80 is used, denoting HTTP. Instead of using a well-known-port, a port could be used with a number outside the well-known-port range, as the instructions created per the above method include the relationships between an identifier at the application layer (OSI layer 7), in this example 'Source port 80, Destination port 80' and the identifier of a message-stream, in this example HTTP Request 1'. Note that instead of the loose coupling between applications and the application layer (OSI layer 7) that is provided by a well-known-port, a tighter coupling between applications and the application layer is created using the above described approach. Also, it is current practice to use well-known TCP-port 80 (HTTP) for many applications, making it impossible to distinguish between these applications based on an application-layer identifier. In case multiple applications use the same IPv4 or IPv6 address and the same well-known port (e.g. well-known TCP-port 80), which is not uncommon, it is not possible to distinguish between said applications based on packet header information, resulting in usage of much more resource-consuming inspection of the payload of packets. Using a port number outside the well-known-port range allows for discrimination of applications using the same IPv4 or IPv6 address in an IP-based network. Note that in above description reference is made to 'forwarding entries' also in case of host node, used as a single term for instructions for physical equipment. As will be understood by a person skilled in the art, a host node is not forwarding, but only sending and receiving packets or signals.

PCT/EP2014/055640 (page 222) describes that a requested topology-path, level-path or topology-level-path can be considered as a service for a user. An example, but not limited to, of said user being a person, an organization, or an application. Typically, the requirements of said service are stored in a contract, being a Service-Level-Agreement (SLA) between said user and the provider of said service. When a requested topology-level-path, which includes by definition a topology-path and includes by definition a level-path, is a message-stream, a SLA can be created between the application and the provider of said service, being the SDN Compiler.

PCT/EP2014/055640 (page 222) describes that the SDN Compiler method uses edge-relationships which are used to determine the impact of any changes in a set of networks and will recalculate edges to maintain the service represented by the requested topology-level-path. When a requested topology-level-path is a message-stream, a SLA can now be maintained by the SDN Compiler. As described in PCT/EP2014/055640 (page 153) typical requirements for the characteristics of a topology-path include, but are not limited to, capacity (throughput), delay, jitter, packet loss, availability and packet sequence preservation, being important characteristics for a message stream.

PCT/EP2014/055640 (page 221) describes that when creating a topology-mapping, layer-mapping, topology-path, level-path or topology-level-path per above described method, optionally one or more requirements are taken into account when creating said topology-mapping, layer-mapping, topology-path, level-path or topology-level-path. As will be understood by a person skilled in the art, by storing properties of networks and edges, by using this information in the creation of a topology-mapping, layer-mapping, topology-path, level-path or topology-level-path, by having the ability to calculate a recursive-path at any point in time, by having this information centrally stored, much more complex requirements can be created than in current networking implementations. When a requested topology-level-path is a message-stream, one or more requirements can be taken into account when creating said topology-level-path.

As will be understood by person skilled in the art, apply above method to an overall network in which a logical node at a highest layer denotes logical storage or logical compute and in which a requested topology-level-path denotes a logical message-stream is beneficial in for example a Service Oriented Architecture (SOA). Examples of a SOA are SOAP-based Web Services.

PCT/EP2014/055640 (page 222) describes that the SDN Compiler method uses edge-relationships which are used to determine the impact of any changes in a set of networks and will recalculate edges to maintain the service represented by the requested topology-level-path. In case it is not possible to recalculate one or more edges, the above described method can be used to perform a search, per action e) of claim 1) for a (part of) an overall network.

As will be understood by a person skilled in the art, the above described method can be used for mobility of logical storage, logical compute and logical networking resources, by determining new suitable physical nodes, suitable physical topology-paths and in case of a multi-layer network, suitable physical layer-mappings. 'New' in comparison to current physical nodes, physical topology-paths and physical layer-mappings.

PCT/EP2014/055640 (pages 39, 42, 245) describes a method to optionally perform operation(s) by a physical or virtual node on a packet, such as but not limited to monitoring and/or recording and/or buffering and/or modifying of the incoming packet header and/or payload before forwarding the packet to one or more of it's output ports, or blocking an incoming packet. Said additional optional operations could be specified by a user of the SDN Compiler. Said additional operations could be performed in a virtual node, such as for example but not limited to a virtual machine, resulting in Network Functions Virtualization (NFV), in which a virtual node performs optional operations such as but not limited to monitoring and/or recording and/or buffering and/or modifying of the incoming packet header and/or payload before forwarding the packet to one or more of it's output ports, or blocking an incoming packet. An additional operation on a packet may be performed by a physical node if a recursive-path contains a first depth-mapping from said physical node to a logical node directly followed by a second depth-mapping from said logical node to said physical node, in other words, if a requirements of a logical node to perform an additional operation is matched with the capability of a physical node to perform said additional operation. Therefore, a property of a physical node may include one or more additional operations that could be performed by said physical node. Therefore, a requirement of a logical node may include one or more additional operations to be performed. Said additional operations could be performed on an incoming packet or incoming signal.

Note that the above method allows a user to define a logical storage, compute and networking specification with a set of requirements and have an SDN Compiler compile said specification against physical or virtual resources, including the determining which physical or virtual resources are suitable. As an example, but not limited to, a user may be software developer specifying logical storage and logical compute with particular storage, compute and networking requirements and have an SDN Compiler determine which physical or virtual resources are suitable. A software developer may not include any physical location requirement in such specification in case a requirement of a physical location is irrelevant. Note that said method can be used in an on-demand, or utility, manner providing cloud computing. Note that said method can be used to create a logical specification of distributed logical storage and compute resources, thereby building distributed applications.

As will be understood by a person skilled in the art, a user of an SDN Compiler might specify one or more depth-mappings between a logical node and a physical node, which would result in a search statement that might include said physical node used in the search at action d) above, as was illustrated in the example shown in FIGS. 13A through 13E.

As will be understood by a person skilled in the art, when performing a search to determine physical nodes and physical topology-paths, physical resources may be available but not visible for the SDN Compiler as they might have to be spun-up as virtual resources, such as for example but not limited to a Virtual Machine (VM) or a container. Therefore, it would be beneficial for the SDN Compiler to have visibility of possible virtual resources and ability to request another apparatus to spin-up said virtual resources, or to have the ability to spin-up virtual resources itself. As a result the SDN Compiler becomes an infrastructure manager determining which virtual resources to spin-up or down.

Figure 21A:
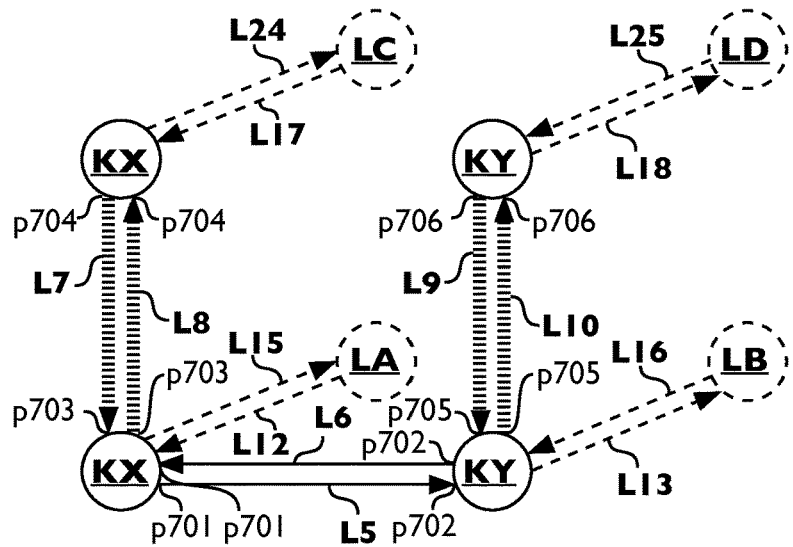
FIG. 21A is a diagram showing physical nodes KX, KY and logical nodes LA, LB, LC, LD and named topology-mappings, layer-mappings and depth-mappings.
Figure 21B:
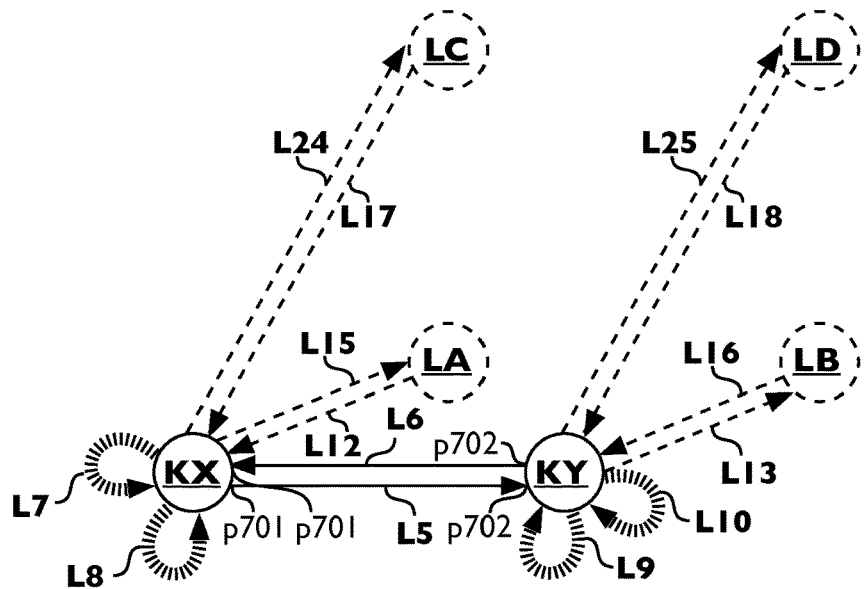
FIG. 21B is a diagram showing physical nodes KX, KY and logical nodes LA, LB, LC, LD and named topology-mappings, layer-mappings and depth-mappings.

As will be understood by a person skilled in the art, it can be beneficial to represent a physical equipment by a single physical node, rather than representing a physical equipment by multiple physical nodes, as forwarding instructions are typically sent to a physical equipment and not to individual components of said physical equipment. When representing a physical equipment by multiple physical nodes, and a physical equipment requires forwarding instructions for said physical equipment in it's entirety, not it's components, multiple forwarding instructions will have to be combined by the SDN compiler, as described in PCT/EP2014/055640 (page 198), requiring an additional step in the calculation. Further, when representing a physical equipment by a single physical nodes the number of physical nodes stored, in for example but not limited to, a database is reduced. Representing a physical equipment by multiple physical nodes allows the user of the SDN Compiler control over subcomponents of a physical system and may reduce hardware complexity as instructions for individual components are created. Multiple physical components can be represented as a single physical node using the following approach. FIG. 5B shows physical nodes KA, KB, KC and KD. We consider physical nodes KA and KC to be physical components of a first physical equipment. As shown in FIG. 21A, we rename physical components KA and KC to KX. We consider physical nodes KB and KD to be physical components of a second physical equipment. We rename physical components KB and KD to KY. We now reduce the two physical nodes named KX in FIG. 21A to a single physical node named KX shown in FIG. 21B, thereby the layer-mapping in layer named L7 and the layer-mapping in layer named L8 have now become layer-mappings from physical node KX to physical node KX and may be omitted (cf. PCT/EP2014/055640 FIGS. 33C and 60B). We now reduce the two physical nodes named KY in FIG. 21A to a single physical node named KY shown in FIG. 21B, thereby the layer-mapping in layer named L9 and the layer-mapping in layer named L10 have now become layer-mappings from physical node KY to physical node KY and may be omitted. We use this approach in FIG. 18A for physical node KP, representing a first computing equipment, physical node KS, representing a second computing equipment, and physical node KT, representing a third computing equipment.

Figure 18A:
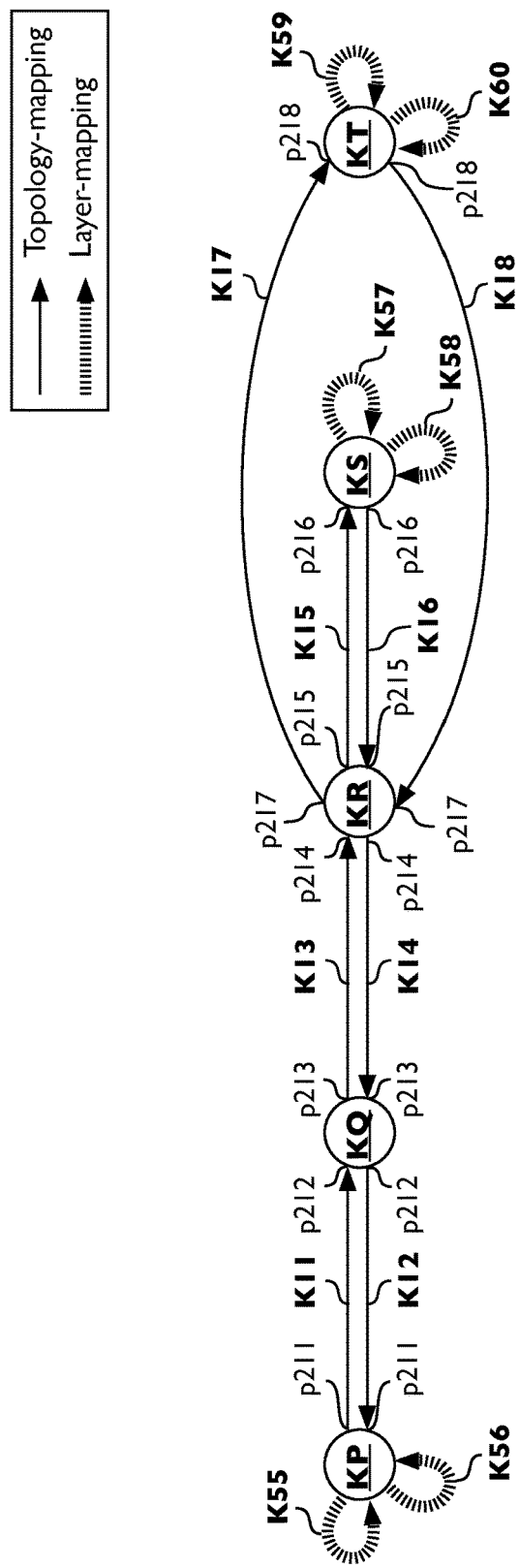
FIG. 18A is a diagram showing physical nodes KP, KQ, KR, KS, KT at (d=0, n=0, h=0), topology-mappings named K11 through K18, and layer-mappings named K55 through K60, represented as directed edges in a graph.

We consider the physical resources shown in FIG. 12A, which was described above, comprising a first computing equipment, represented by physical node KP, a first packet forwarding system, represented by physical node KQ, a second packet forwarding system, represented by physical node KR, a second computing equipment, represented by physical node KS, and a third computing equipment, represented by physical node KT, connected by topology-mappings being physical links. FIG. 12B shows physical nodes KP, KQ, KR, KS, KT at (d=0, n=0, h=0) and topology-mappings named K11 through K18, represented as directed edges in a graph, as described above. Optionally, we add a physical layer-mapping decreasing in layer named K55 from physical node KP to physical node KP, a physical layer-mapping increasing in layer named K56 from physical node KP to physical node KP, a physical layer-mapping decreasing in layer named K57 from physical node KS to physical node KS, a physical layer-mapping increasing in layer named K58 from physical node KS to physical node KS, a physical layer-mapping decreasing in layer named K59 from physical node KT to physical node KT, a physical layer-mapping increasing in layer named K60 from physical node KT to physical node KT, as shown in FIG. 18A. FIG. 18A shows physical nodes KP, KQ, KR, KS, KT at (d=0, n=0, h=0), topology-mappings named K11 through K18, and layer-mappings named K55 through K60, represented as directed edges in a graph. FIG. 18B shows layer-mappings named K55 through K60 per the notation of FIG. 6A.

We consider the logical network diagram shown in FIG. 15A, which was described above, and the search statement shown in FIG. 15G, which was described above. We do not consider any requirements for the logical topology-mappings named K1 and K2 and we do not consider any requirements for the logical layer-mappings named K25 and K26, therefore the search statement can be reduced to "(?X1-?K9[toppath]->?X2) AND (?X2-?K10[toppath]->?X3) AND (?X4-?K32[laymap]->?X1) AND (?X3-?K33[laymap]->?X5)", omitting "/K1" and "/K2" and "/K25" and "/K26". In case we would consider any requirements for the logical topology-mappings named K1 and K2, the search statement including requirements is, written in pseudo-code:

MATCH (?X1-?K9[toppath]->?X2)
AND
MATCH (?X2-?K10[toppath]->?X3)
AND
MATCH (?X4-?K32[laymap]->?X1)
AND
MATCH (?X3-?K33 [laymap]->?X5)
WHERE "requirements of ?K9" equals "requirements of K1"
AND "requirements of ?K10" equals "requirements of K2"
RETURN ?X1, ?X2, ?X3, ?X4, ?X5, ?K9, ?K10, ?K32, ?K33

The search statement shown in FIG. 15G will return a number of matches including the match shown in FIGS. 18C, 18D and 18E. FIG. 18C shows how unknown physical node ?X1 is matched against physical node KP, unknown physical node ?X2 is matched against physical node KR, unknown physical node ?X3 is matched against physical node KT. FIG. 18D shows how the unknown physical topology-path named ?K9 is matched against a physical topology-path, which is named K9 for consistency, comprising of a concatenation of the physical topology-mappings named K11 and K13. FIG. 18D shows how the unknown physical topology-path named ?K10 is matched against a physical topology-path, which is named K10 for consistency, comprising of the physical topology-mapping named K17. FIG. 18E shows how the unknown physical layer-mapping named ?K32 is matched against the physical layer-mapping named K55, and how the unknown physical layer-mapping named ?K33 is matched against the physical layer-mapping named K60.

It is beneficial to introduce a logical equipment in analogy with a physical equipment. We define a logical equipment as being one of:

a single first logical node (FF) not connected to a second logical node through a first layer-mapping a set of third logical nodes (FE, FH; FG, FJ), said third logical nodes (FE, FH; FG, FJ) being connected through one or more second layer-mappings (K25; K26).

Per above definition, in the logical network diagram shown in FIG. 15A, a first logical equipment comprises of logical nodes FE and FH, as logical nodes FE and FH are connected through layer-mapping K25, a second logical equipment comprises of logical node FF, as a logical node FF is not connected to another logical node through a layer-mapping, a third logical equipment comprises of logical nodes FG and FJ, as logical nodes FG and FJ are connected through layer-mapping K26.

A database may be searched in accordance with above definition of a logical equipment to determine one or more logical equipments from a set of logical nodes.

An SDN Compiler may be instructed to compile x logical nodes in a logical equipment to y physical nodes in a physical equipment, with x>0, with y>0 and with y<x, thereby reducing the number of search options and speeding up the search process.

A user of an SDN Compiler may know before a search is performed that two or more logical nodes at two or more layers should match against the same known physical node. For example, but not limited to, a user of an SDN Compiler may have specified a first logical node at layer n being a datalink layer and a second logical node at layer (n+1) being a network layer and expects the first logical node and the second logical node to be compiled against a single physical equipment represented by a single physical node.

In case said first logical node is mapped against a first unknown physical node through a first depth-mapping and said second logical node is mapped against a second unknown physical node through a second depth-mapping, a user of an SDN Compiler may know before a search is performed that two or more unknown physical nodes should match against the same known physical node. For example, but not limited to, a user of an SDN Compiler may know that unknown physical node ?X1 and unknown physical node ?X4 should both match against a first known physical node, in other words unknown physical node ?X1 is identical to unknown physical node ?X4. The user of the SDN Compiler may input this knowledge into the SDN Compiler thereby restricting a search with a constraint "?X1 equals ?X4", thereby reducing the number of search options and speeding up the search process.

Alternatively, above definition of a logical equipment may be used to determine before a search is performed that two or more logical nodes at two or more layers should match against the same known physical node, and that said two or more logical nodes may be mapped against a single unknown physical node, as illustrated by but not limited to, the example shown in FIGS. 19A through 19F. We consider the logical network diagram shown in FIG. 15A, which was described above. Per above definition, in the logical network diagram shown in FIG. 15A, a first logical equipment comprises of logical nodes FE and FH, as logical nodes FE and FH are connected through layer-mapping K25, a second logical equipment comprises of logical node FF, as a logical node FF is not connected to another logical node through a layer-mapping, a third logical equipment comprises of logical nodes FG and FJ, as logical nodes FG and FJ are connected through layer-mapping K26.

We perform a method comprising the following actions:
a) Creating and storing one or more logical equipment names (first logical equipment; second logical equipment; third logical equipment), each logical equipment name (first logical equipment; second logical equipment; third logical equipment) being a unique identifier of a set of one or more logical nodes (FE, FH; FF; FG, FJ), said one or more logical nodes (FE, FH; FF; FG, FJ) being connected through zero or more layer-mappings (K25; none; K26),
b) For each logical equipment name (first logical equipment; second logical equipment; third logical equipment) creating and storing one or more unknown-physical-node names (?X1; ?X2; ?X3), each unknown-physical-node name (?X1; ?X2; ?X3) being a unique identifier of an unknown physical node,
c) Storing at least one depth-mapping (K3, K4, K37; K5, K6; K7, K8, K38) between each of said logical nodes (FE, FH; FF; FG, FJ) within said set of one or more logical nodes (FE, FH; FF; FG, FJ) identified with said logical equipment name (first logical equipment; second logical equipment; third logical equipment), and said one or more unknown-physical-node names (?X1; ?X2; ?X3).

Figure 19A:
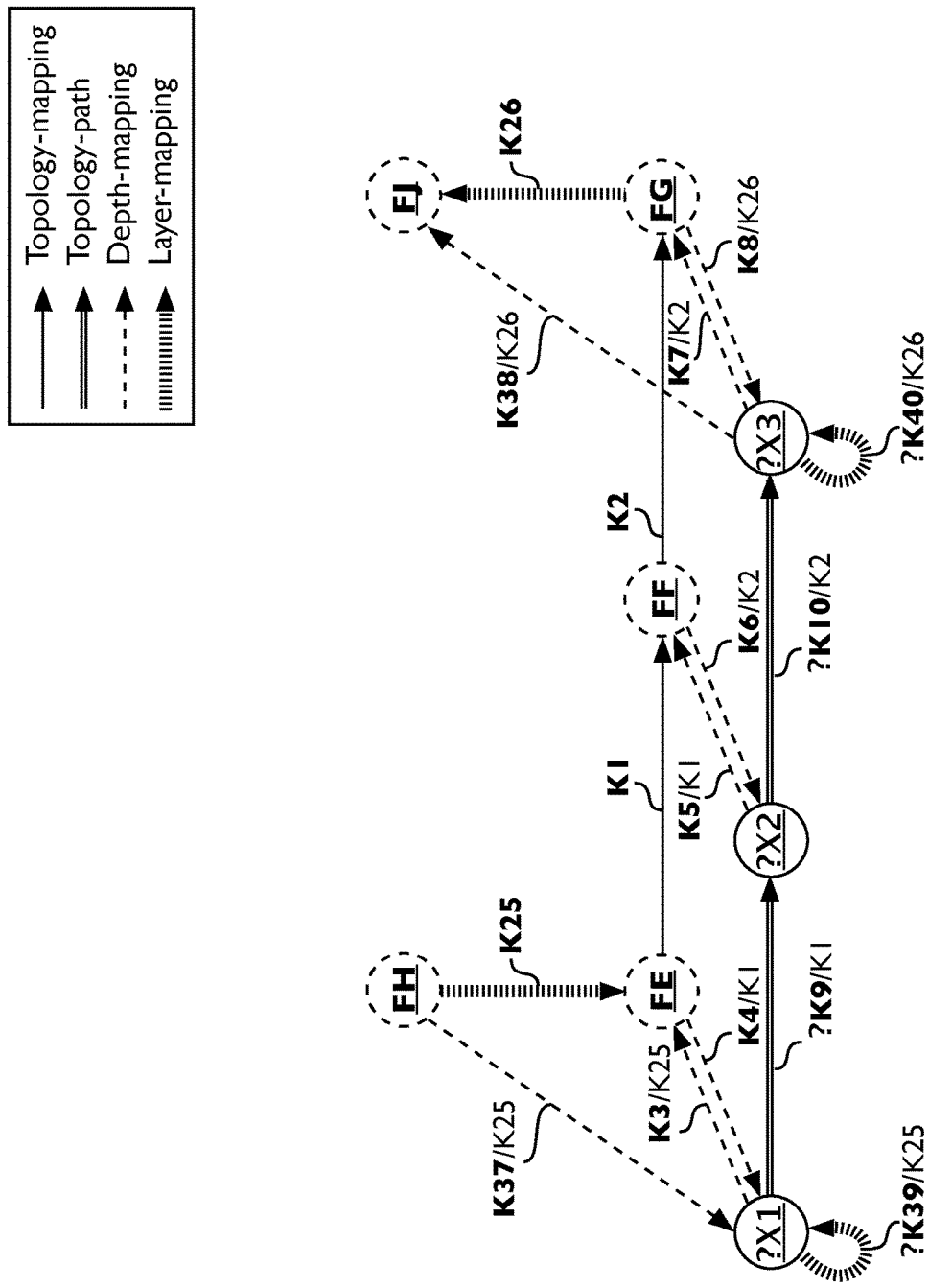
FIG. 19A is a diagram showing logical nodes FE, FF and FG at (d=1, n=0, h=0), logical nodes FH and FJ at (d=1, n=1, h=0), and an unknown physical nodes ?X1, ?X2, ?X3 at (d=0, n=0, h=0).

As shown in FIG. 19A, per action b) of claim 1), we create an unknown physical node named ?X1 for said first logical equipment comprising of logical nodes FE and FH, we create an unknown physical node named ?X2 for said second logical equipment comprising of logical node FF, and we create an unknown physical node named ?X3 for said third logical equipment comprising of logical nodes FG and FJ. As shown in FIGS. 19A and 19B, per action c) of claim 1), depth-mappings named K3 through K8, K37 and K38 are created. Note that optionally a depth-mapping may be created from the unknown physical node named ?X1 to the logical node named FH, and optionally a depth-mapping may be created from the logical node named FJ to the unknown physical node named ?X3. FIG. 19B shows depth-mappings named K3 through K8, K37 and K38 per the notation of FIG. 6A. We apply action d) of claim 1) and create and store topology-mappings named K1 and K2, using the first method to calculate a topology-mapping, as shown in FIGS. 19A and 19C, and explained above. Action d) of claim 1) states "said physical topology-path being a concatenation of one or more physical topology-mappings". Note that 'a concatenation of one' refers to a situation in which said physical topology-path comprises of a single physical topology-mapping. Therefore, "said physical topology-path being a concatenation of one or more physical topology-mappings" is read as "said physical topology-path being a single physical topology-mapping or a concatenation of two or more physical topology-mappings". The term 'a concatenation of one' is used to avoid the or-statement in order to keep the description relatively simple.

As described above, additionally we create and store logical layer-mappings named K25 and K26. Logical layer-mapping named K25 decreasing in layer is a directed graph representation from logical node FH to logical node FE and is calculated using the method to calculate a layer-mapping (cf. claim 9) as a concatenation of a depth-mapping named K37 from logical node FH to unknown physical node ?X1, an unknown physical layer-mapping named ?K39 decreasing in layer from unknown physical node ?X1 to unknown physical node ?X1 and a depth-mapping named K3 from the unknown physical node named ?X1 to the logical node FE, and creating and storing said unknown physical layer-mapping named ?K39. Logical layer-mapping named K26 is a directed graph representation from logical node FG to logical node FJ and is calculated using the second method to calculate a layer-mapping (cf. claim 10) as a concatenation of the depth-mapping named K8 from logical node FG to unknown physical node ?X3, an unknown physical layer-mapping named ?K40 increasing in layer from unknown physical node ?X3 to unknown physical node ?X3 and a depth-mapping named K38 from the unknown physical node named ?X3 to the logical node FJ, and creating and storing said unknown physical layer-mapping named ?K40. The logical layer-mappings named K25 and K26 are shown in FIGS. 19A and 19C.

As shown in of FIGS. 11E, 11F, 19D and 19E we now determine the physical entities of the topology-mappings K1 and K2 and the layer-mappings K25 and K26 respectively, which will be used in a search at action e) of claim 1). Step 1) of FIG. 19D shows the layer-mapping named K25 per FIG. 19C. In step 2) of FIG. 19D, the values of the depth-mappings named K3 and K37 in step 1) of FIG. 19D have been replaced by the definition of the depth-mappings named K3 and K37 shown in FIG. 19B. Step 1) of FIG. 19E shows the layer-mapping named K26 per FIG. 19C. In step 2) of FIG. 19E, the values of the depth-mappings named K8 and K38 in step 1) of FIG. 19E have been replaced by the definition of the depth-mappings named K8 and K38 shown in FIG. 19B.

Per action e) of claim 1), we determine a suitable physical node for each unknown physical node and determine a suitable physical topology-path for each unknown physical topology-path and per claim 11) optionally determine a suitable physical layer-mapping for each unknown physical layer-mapping by performing a search comprising matching each unknown physical topology-path with one of a set of suitable physical topology-paths, and optionally matching each unknown physical layer-mapping with one of a set of suitable physical layer-mappings, and matching each unknown physical node with one of a set of suitable physical nodes.

We use the relationship between unknown physical nodes and unknown physical topology-path of the topology-mapping named K1, being "?X1-?K9[toppath]/K1->?X2", shown in FIG. 11E, as a first search statement, we use the relationship between unknown physical nodes and unknown physical topology-path of the topology-mapping named K2, being "?X2-?K10[toppath]/K2->?X3", shown in FIG. 11F, as a second search statement, we use the relationship between unknown physical nodes and unknown physical layer-mapping of the layer-mapping named K25, being "?X1-?K39[laymapdec]/K25->?X1" as a third search statement, and we use the relationship between unknown physical nodes and unknown physical layer-mapping of the layer-mapping named K26, being "?X3-?K40[laymapinc]/K26->?X3" as a fourth search statement, to create a fifth search statement shown in FIG. 19F. Said fifth search statement is used in said search. Note that said search statement comprises of unknown physical nodes ?X1, ?X2, ?X3, and unknown physical topology-paths named ?K9, ?K10, and unknown physical layer-mappings named ?K39 and ?K40. As an example, but not limited to, a search can be performed against physical network layout shown in FIG. 18A, described above. The search statement shown in FIG. 19F will return a number of matches including the match in which the unknown physical node ?X1 is matched against the physical node KP, the unknown physical node ?X2 is matched against the physical node KR, the unknown physical node ?X3 is matched against the physical node KT, the unknown physical layer-mapping ?K39 is mapped against the physical layer-mapping K55, the unknown physical layer-mapping ?K40 is mapped against the physical layer-mapping K60, the unknown physical topology-path named ?K9 is matched against a physical topology-path, which is named K9 for consistency, comprising of a concatenation of the physical topology-mappings named K11 and K13, and the unknown physical topology-path named ?K10 is matched against a physical topology-path, which is named K10 for consistency, comprising of the physical topology-mapping named K17.

As described above, optionally requirements of one or more logical nodes may be stored. Optionally said requirements of each of said logical nodes may be copied to said unknown physical node mapped to said logical node through one or more depth-mappings, and said requirements of each of said unknown physical nodes may be matched with properties of said physical node in said search. As an example but not limited to requirements of each of said logical nodes (FE, FH; FG, FJ) may be copied to said unknown physical node (?X1; ?X3) mapped to said logical node (FE, FH; FG, FJ) through one or more depth-mappings (K3, K37; K8, K38), and said requirements of each of said unknown physical nodes (?X1; ?X3) may be matched with properties of said physical node (KP; KT) in said search Note that layer-mappings are optional in a search statement in case internal links and/or their capabilities within a physical or virtual device represented by a physical node are not relevant, as they are abstracted away being internal to the device, and may be ignored. As an example, but not limited to, unknown a decreasing layer-mapping named ?K39 (shown in FIG. 19A) may be omitted in a search statement in case an internal link represented by a decreasing layer-mapping named K55 (shown in FIG. 18A) within a first computing equipment represented by a physical node KP is not relevant and may be ignored. As an example, but not limited to, an increasing layer-mapping named ?K40 may be omitted in a search statement in case an internal link represented by a increasing layer-mapping named K60 within a third computing equipment represented by a physical node KT is not relevant and may be ignored. As a result, the search statement shown in FIG. 19F and described above is reduced to the search statement:

"(?X1-?K9[toppath]/K1->?X2) AND (?X2-?K10[toppath]/K2->?X3)".

Note that layer-mappings may be omitted when representing a physical or virtual device in case internal links within a physical or virtual device represented by a physical node are not relevant, as they are abstracted away being internal to the device. As an example, but not limited to, layer-mappings named K55 and K56 representing internal links within a first computing equipment represented by a physical node KP may not be relevant, as they are abstracted away being internal to the device, and may be ignored. As an example, but not limited to, layer-mappings named K57 and K58 representing internal links within a second computing equipment represented by a physical node KS may not be relevant, as they are abstracted away being internal to the device, and may be ignored. As an example, but not limited to, layer-mappings named K59 and K60 representing internal links within a third computing equipment represented by a physical node KT may not be relevant, as they are abstracted away being internal to the device, and may be ignored, as shown in FIG. 12B.

Note that layer-mappings may be omitted when representing an unknown physical node in case internal links within unknown physical node are not relevant and may be ignored. As an example, but not limited to, unknown layer-mapping named ?K39 (shown in FIG. 19A) representing a link internal within an unknown physical node ?X1 may be omitted. As an example, but not limited to, unknown layer-mapping named ?K40 representing a link internal within an unknown physical node ?X3 may be omitted.

PCT/EP2014/055640 (page 178) describes that in the first method for calculating a layer-mapping, the third and fourth network can be the same network at (d–x, n2, h) or at (d–x, n2–y, h). The layer-mapping named K25 is calculated as a concatenation of the depth-mapping named K37 and the depth-mapping named K3, using the first method to calculate a layer-mapping with the third and fourth network being the same unknown physical node ?X1. Per notation of FIG. 6C, the layer-mapping named K25 is laymapdec K25=K37/K25+K3/K25'. The layer-mapping named K26 is calculated as a concatenation of the depth-mapping named K8 and the depth-mapping named K38, using the second method to calculate a layer-mapping with the third and fourth network being the same unknown physical node ?X3. Per notation of FIG. 6C, the layer-mapping named K26 is laymap K26=K8/K26+K38/K26'. Applying above described method results in the following search statement:

"(?X1-?K9[toppath]/K1->?X2) AND (?X2-?K10[toppath]/K2->?X3)".

As described above, optionally requirements of one or more logical nodes may be stored. Optionally said requirements of each of said logical nodes may be copied to said unknown physical node mapped to said logical node through one or more depth-mappings, and said requirements of each of said unknown physical nodes may be matched with properties of said physical node in said search. As an example but not limited to, in the example shown in FIG. 19A requirements of each of said logical nodes (FE, FH; FG, FJ) may be copied to said unknown physical node (?X1; ?X3) mapped to said logical node (FE, FH; FG, FJ) through one or more depth-mappings (K3, K37; K8, K38), and said requirements of each of said unknown physical nodes (?X1; ?X3) may be matched with properties of said physical node (KP; KT) in said search.

Note that in case edges have been given a name which can be used for forwarding, switching-identifiers can be omitted and forwarding entries can be created directly from the name of said edges. In an implementation though, typically edges are stored using a different namespace than the namespace used for forwarding.

It is observed that the content of the present application, including its claims, can be combined with the teachings of EP14185825.8 which is not pre-published but filed on 22 Sep. 2014.

It is observed that the content of the present application, including its claims, can be combined with the teachings of EP14186045.2 which is not pre-published but filed on 23 Sep. 2014.

It is observed that the content of the present application, including its claims, can be combined with the teachings of EP14196330.6 which is not pre-published but filed on 4 Dec. 2014.

In the above specification, reference has been made to many different kinds of units, like controller, compiler, node, virtual machine, NIC, etc. (cf. PCT/EP2014/055640 page 89). As will be apparent to persons skilled in the art, the functionality of such units is performed by at least one of hardware and software running on a processing unit. Such hardware may be any known type of hardware (now and in the future) arranged to perform the claimed functions. FIG. 10 shows a schematic diagram of a computer arrangement that can perform such functions. FIG. 10 shows a kind of "complete" picture: it will be evident that some components (like a printer) may not be used for many of the units specified in the present document.

The arrangement shown in FIG. 10 comprises a processor 1 for carrying out arithmetic operations.

The processor 1 is connected to a plurality of memory components, including a hard disk 5, Read Only Memory (ROM) 7, Electrically Erasable Programmable Read Only Memory (EEPROM) 9, and Random Access Memory (RAM) 11. Not all of these memory types need necessarily be provided. Moreover, these memory components need not be located physically close to the processor 1 but may be located remote from the processor 1.

The processor 1 is also connected to units for inputting instructions, data etc. by a user, like a keyboard 13, and a mouse 15. Other input units, such as a touch screen, a track ball and/or a voice converter, known to persons skilled in the art may be provided too.

A reading unit 17 connected to the processor 1 is provided. The reading unit 17 is arranged to read data from and possibly write data on a data carrier like a floppy disk 19 or a CDROM 21. Other data carriers may be tapes, DVD, Blu Ray disks, Compact Flash (CF), Secure Digital (SD), Micro SD, Mini SD, Extreme Digital (xD), and memory sticks, etc. as is known to persons skilled in the art. The data carrier may be provided with a computer program product comprising instructions and data arranged to be read by the processor 1 and, after being read, allowing the processor 1 to perform a method in accordance with the invention. Such a computer program product may then be loaded in one of the memory components 5, 7, 9, 11. However, such computer program product may, alternatively, be downloaded via the telecommunication network 27.

The processor 1 may be connected to a printer 23 for printing output data on paper, as well as to a display 3, for instance, a monitor or LCD (Liquid Crystal Display) screen, a plasma display panel, an Organic Light Emitting Diode (OLED), an Active Matrix OLED (AMOLED) or any other type of display known to persons skilled in the art.

The processor 1 may be connected to a communication network 27, for instance, the Public Switched Telephone Network (PSTN), a Local Area Network (LAN), a Wide Area Network (WAN), the Internet, etc. by means of an I/O unit 25. The processor 1 may be arranged to communicate with other communication arrangements through the network 27.

The processor 1 may be implemented as stand alone system, or as a plurality of parallel operating processors each arranged to carry out subtasks of a larger computer program, or as one or more main processors with several sub-processors. Parts of the functionality of the invention may even be carried out by remote processors communicating with processor 1 through the network 27.

It is to be understood that the invention is limited by the annexed claims and its technical equivalents only. In this document and in its claims, the verb "to comprise" and its conjugations are used in their non-limiting sense to mean that items following the word are included, without excluding items not specifically mentioned. In addition, reference to an element by the indefinite article "a" or "an" does not exclude the possibility that more than one of the element is present, unless the context clearly requires that there be one and only one of the elements. The indefinite article "a" or "an" thus usually means "at least one".

It is observed that in the claims, for the sake of efficiency, apart from the terms "physical node" and "unknown physical node" as defined above, the term "known/unknown physical node" is used. This latter term refers to a set comprising all known and unknown physical nodes and each member of this set may either be a known or an unknown physical node. "Known/unknown physical node names" are names of these "known/unknown physical nodes".

Similarly, for the sake of efficiency, apart from the terms "physical topology-path" and "unknown physical topology-path" as defined above, the term "known/unknown physical topology-path" is used in the claims. This latter term refers to a set comprising all known and unknown physical topology-paths and each member of this set may either be a known or an unknown physical topology-path. "Known/unknown physical topology-path names" are names of these "known/unknown physical topology-paths".

It is observed that, for the sake of efficiency, apart from the terms "physical layer-mapping" and "unknown physical layer-mapping" as defined above, the term "known/unknown physical layer-mapping" is used in the claims. This latter term refers to a set comprising all known and unknown physical layer-mappings and each member of this set may either be a known or an unknown physical layer-mapping. "Known/unknown physical layer-mapping names" are names of these "known/unknown physical layer-mappings".

The invention claimed is:

1. A method of controlling an overall network by a compiler, based on a logical network model, the overall network comprising two or more physical nodes, the two or more physical nodes being interconnected by physical links in accordance with a physical network layout, the logical network model comprising logical nodes, each logical node being indicated with a logical node name, the method as performed by the compiler comprising the following actions:

a) Storing physical node names, each physical node name being a unique identifier of one physical node, storing physical topology-mappings, each physical topology-mapping being one physical link in one direction, said physical topology-mapping being based on a directed graph representation, and storing point-of-attachment names of said physical nodes, each of the point-of-attachment names of a particular physical node being a unique identifier of a point-of-attachment between the particular physical node and a physical link connecting the particular physical node to another physical node, b) Creating and storing one or more unknown-physical-node names, each unknown-physical-node name being a unique identifier of an unknown physical node, c) Storing logical node names for said logical nodes, each logical node name being a unique identifier of one logical node and storing depth-mappings, said depth-mappings at least defining how logical nodes are mapped to known/unknown physical nodes, said depth-mapping being based on a directed graph representation, d) Creating and storing one or more logical topology-mappings, each logical topology-mapping being a directed graph representation from a first logical node to a second logical node, calculated as a concatenation of a first depth-mapping from the first logical node to a first known/unknown physical node, a known/unknown physical topology-path from the first known/unknown physical node to a second known/unknown physical node and a second depth-mapping from the second known/unknown physical node to the second logical node, where said known/unknown physical topology-path is either a physical topology-path or an unknown, created and stored, physical topology-path, said physical topology-path being a concatenation of one or more physical topology-mappings, e) Determining a suitable physical node in the overall network for each unknown physical node and determining a suitable physical topology-path in the overall network for each unknown physical topology-path by performing a search comprising matching each unknown physical topology-path with one of a set of suitable physical topology-paths, and matching each unknown physical node with one of a set of suitable physical nodes, and replacing and storing each unknown physical topology-path by said one of said set of suitable physical topology-paths, said one of said suitable physical topology-paths being a concatenation of one or more physical topology-mappings, and replacing each unknown physical node by said one of said set of suitable physical nodes in accordance with a result of said search, f) Creating and storing a requested-topology-path being a concatenation of one or more logical topology-mappings, g) Calculating through recursion and storing a recursive-path for said requested-topology-path, said recursive-path comprising logical nodes as indicated by said logical node names, depth-mappings, physical nodes as indicated by said physical node names, physical topology-mappings, physical point-of-attachments as indicated by physical point-of-attachment names, said recursive-path being based on the directed graph representation, h) Creating forwarding table entries for physical nodes in said recursive-path from said recursive-path, and i) Sending said forwarding table entries, either directly or indirectly, to physical nodes in said recursive-path.

2. The method according to claim 1, comprising the following actions:

at action d) of claim 1 storing for each of said logical topology-mappings edge-relationships comprising a first edge-relationship being a relationship between the first depth-mapping and said logical topology-mapping, one or more second edge-relationships each second edge-relationship being a relationship between one of said one or more physical topology-mappings in said physical topology-path and said logical topology-mapping or a second edge-relationship being a relationship between said known/unknown physical topology-path and said logical topology-mapping, a third edge-relationship being a relationship between the second depth-mapping and said logical topology-mapping and one or more fourth edge-relationships each fourth edge-relationship being a relationship between one of said one or more physical topology-mappings and said physical topology-path, at action e) of claim 1 storing for each of said suitable physical topology-path one or more fifth edge-relationships, each fifth edge-relationship being a relationship between one of said one or more physical topology-mappings and said suitable physical topology-path, in accordance with a result of said search, at action e) of claim 1 storing for each of said logical topology-mappings edge-relationships comprising a sixth edge-relationship being a relationship between the first depth-mapping and said logical topology-mapping, a seventh edge-relationship being a relationship between said suitable physical topology-path and said logical topology-mapping, an eighth edge-relationship being a relationship between the second depth-mapping and said logical topology-mapping, in accordance with said result of said search, and at action f) of claim 1 storing one or more further edge-relationships, each further edge-relationship concerned being a relationship between one logical topology-mapping within the requested-topology-path and said requested-topology-path.

3. The method according to claim 2, comprising the following actions:

at action g) of claim 1 calculating and storing nested edge-relationships.

4. The method according to claim 1, wherein said overall network comprises a plurality of networks, said plurality of networks comprising a first set of networks comprising one or more networks (KA, KB, KC, KD) and said logical network model comprising a second set of networks comprising one or more networks (LA, LB, LC, LD), said first set of networks being grouped in one or more layers (n) and said second set of networks (LA, LB, LC, LD) being grouped in one or more layers n and at one or more depths d from said first set of networks (KA, KB, KC, KD), wherein each one of those networks (KA, KB, KC, KD) of said first set which are at a same layer n are related to one another by a topology-mapping, each one of those networks (KC, KD) of said first set which are at a higher layer than a minimum layer $n=n\_min(d)$, $n\_min(d)$ being a lowest layer at particular depth d and $n\_min(d)$ being $\geq 0$, are related to zero or more networks of said first set of networks at a preceding layer n−y with $0<y\leq n-n\_min(d)$, by a layer-mapping, each one of those networks of said second set of networks (LA, LB, LC, LD) which are at a first depth d=1 from said first set of networks (KA, KB, KC, KD) are related to one or more of said networks of said first set of networks (KA, KB, KC, KD) by a first depth-mapping, each one of those networks (LC, LD) of said second set of networks which are at a higher layer than minimum layer $n=n\_min$ are related to zero or more networks of said second set of networks at a preceding layer n−y with $0<y\leq n-n\_min$, n_min being the lowest layer at particular depth d by a layer-mapping, and each one of those networks of said second set of networks which are at a second or higher depth $d\geq 2$ from said first set of networks (KA, KB, KC, KD) are related to one or more networks of said second set of networks at a preceding depth d−x with x larger than zero and smaller than or equal to d by a depth-mapping and/or are related to one or more networks of said first set of networks (KA, KB, KC, KD) by a depth-mapping, where each network of said first set of networks comprises one or more physical nodes and each network of said second set of networks comprises logical nodes.

5. The method according to claim 4, wherein at least one network of said first set of networks is arranged as a first nested configuration of one or more networks at one or more levels h relating to one another by first level-mappings, networks of said first set of networks at a lowest level $h=h\_min$ being either a physical node or a virtual node, and networks at higher levels than lowest level $h=h\_min$ possibly being either a physical node or a virtual node, where $h\_min=\leq h\leq h\_max$, h_max being a maximum level.

6. The method according to claim 4, wherein at least one network of said second set of networks is arranged as a second nested configuration of one or more networks at one or more levels h relating to one another by second level-mappings, networks of said second set of networks at a lowest level $h=h\_min$ being a logical node, and networks at higher levels than lowest level $h=h\_min$ possibly being a logical node, where $h\_min=\leq h\leq h\_max$, h_max being a maximum level.

7. The method according to claim 4, comprising the following actions:

Calculating and storing a topology-mapping from a first network at a first depth d, a first layer n1 and a first level h1 to a second network at said first depth d, said first layer n1 and said first level h1 as a concatenation of a depth-mapping from said first network to a third network at a second depth d−x, a second layer n2 and a second level h2, a topology-level-path from said third network to a fourth network at said second depth d−x, said second layer n2 and said second level h2 and a depth-mapping from said fourth network to said second network with x being larger than zero and smaller than or equal to d, and wherein said first layer n1 may be equal to said second layer n2.

8. The method according to claim 4, comprising the following actions:

Calculating and storing a topology-mapping from a first network at a depth d, a first layer n and a first level h1 to a second network at said depth d, said first layer n and said first level h1 as a concatenation of a layer-mapping from said first network to a third network at said depth d, a second layer n−y and a second level y, h2, a topology-level-path from said third network to a fourth network at said depth d, said second layer n−y and said second level h2 and a layer-mapping from said fourth network to said second network with y being larger than zero and smaller than or equal to $n-n\_min$ (d).

9. The method according to claim 4, comprising the following actions:

Calculating and storing a layer-mapping from a first network at a first depth d+x, a first layer n1 and a first level h1 to a second network at said first depth d+x, a second layer n1−y and a second level h2 as a concatenation of a depth-mapping from said first network to a third network at a second depth d=0, a third layer n2 and a third level h3, zero or more known/unknown physical layer-mappings from said third network to a fourth network at said second depth d=0, a fourth layer n2−y and a fourth level h4 and a depth-mapping from said fourth network to said second network with x larger than zero, with y larger than zero and smaller than or equal to $n1-n1\_min$ and smaller than or equal to $n2-n2\_min$, n1_min being the lowest layer at said first depth d+x, n2_min being the lowest layer at said second depth d=0.

10. The method according to claim 4, comprising the following actions:

Calculating and storing a layer-mapping from a first network at a first depth d+x, a first layer n1 and a first level h1 to a second network at said first depth d+x, a second layer n1+y and a second level h2 as a concatenation of a depth-mapping from said first network to a third network at a second depth d=0, a third layer n2 and a third level h3, zero or more known/unknown physical layer-mappings from said third network to a fourth network at said second depth d=0, a fourth layer n2+y and a fourth level h4 and a depth-mapping from said fourth network to said second network with x larger than zero, with y larger than zero and smaller than or equal to $n1\_max-n1$ and smaller than or equal to n2_max−n2, n1_max being the highest layer at said first depth d+x, n2_max being the highest layer at said second depth d=0.

11. The method according to claim 9, comprising the following actions:
At action e) of claim 1) determining a suitable physical layer-mapping in the overall network for each unknown physical layer-mapping by including in said search matching each unknown physical layer-mapping with one of a set of suitable physical layer-mappings, and replacing and storing each unknown physical layer-mapping by said one of said set of suitable physical layer-mappings.

12. The method according to claim 1 comprising the following actions:
at action a) of claim 1) storing properties of one or more of said physical nodes,
at action c) of claim 1) storing requirements of one or more of said logical nodes,
at action e) of claim 1) copying said requirements of each of said logical nodes to said unknown physical node mapped to said logical node through one or more depth-mappings, said depth-mappings being used in the calculation of said logical topology-mapping, and matching said requirements of each of said unknown physical nodes with said properties of said physical node in said search.

13. The method according to claim 1, comprising the following actions:
at action a) of claim 1) storing properties of said one or more physical links in one direction with said physical topology-mappings,
at action d) of claim 1) storing requirements of said logical topology-mappings,
at action e) of claim 1) copying said requirements of each of said logical topology-mappings to said unknown physical topology-path used in the calculation of said logical topology-mapping, and matching said requirements of each of said unknown physical topology-paths with said properties of said physical topology-path in said search, said properties of said physical topology-path being determined by said properties of said physical topology-mappings from which said physical topology-path is calculated.

14. The method according to claim 12, wherein a property of a physical node is a node type of said physical node, and/or one or more switching-characteristics of said physical node, and/or a capacity of said physical node, and/or a latency of said physical node, and/or an availability of said physical node, and/or an additional operation that can possibly be performed by said physical node.

15. The method according to claim 13, wherein a property of a physical link in one direction is a capacity of said physical link in one direction, and/or a latency of said physical link in one direction, and/or an availability of said physical link in one direction.

16. The method according to claim 12, wherein a requirement of a logical node is a node type of said logical node, and/or one or more switching-characteristics of said logical node, and/or a capacity of said logical node, and/or a latency of said logical node, and/or an availability of said logical node, and/or an additional operation that is to be performed by said logical node.

17. The method according to claim 13, wherein a requirement of a logical topology-mapping is a capacity of said logical topology-mapping, and/or a latency of said logical topology-mapping, and/or an availability of said logical topology-mapping.

18. The method according to claim 1, comprising the following actions:
Performing an additional operation on a packet by a physical node if a recursive-path contains a first depth-mapping from said physical node to a logical node directly followed by a second depth-mapping from said logical node to said physical node.

19. The method according to claim 1, wherein a physical node is mapped to more than one logical node through a depth-mapping resulting in multicasting.

20. The method according to claim 1, wherein a first topology-mapping between a first physical node and a second physical node is removed and a second topology-mapping between said second physical node and a third physical node is created resulting in mobility of said second physical node.

21. The method according to claim 1 in which one or more networks at depth d>0 represent user requirements, in which one or more topology-mappings and/or layer-mappings and/or level-mappings represent user requirements, in which zero or more policies represent user requirements, in which the namespace of the one or more networks at depth d>0 is not used in a forwarding decision by a physical or virtual node.

22. The method according to claim 4, wherein a logical node at a highest layer denotes logical storage or logical compute, and a requested-topology-path denotes a logical message-stream.

23. The method according to claim 1, wherein networks, mappings and topology-level-paths are stored in a graph database, said networks are stored as a named vertex in said graph database, said mappings are stored as a named and directed edge in said graph database, said topology-level-paths are stored as a named and directed edge in said graph database, properties of said networks are stored as vertex attributes in said graph database, properties of said mappings are stored as edge attributes in said graph database, properties of said topology-level-paths are stored as edge attributes in said graph database, types of mapping are stored as an edge type in said graph database, and types of topology-level-paths are stored as an edge type in said graph database, wherein the creation and recalculation of mappings and topology-level-paths is implemented by querying a graph database.

24. The method according to claim 23, wherein said search at action e) of claim 1) is performed by querying a graph database.

25. The method according to claim 1, comprising:
Calculating forwarding entries for a physical packet-switching node, referred to as node in below method, within the recursive-path of a requested-path by performing the below method comprising the following actions:
i. if the recursive-path does not contain an incoming topology-mapping or an incoming layer-mapping for said physical packet-switching node, and said physical packet-switching node is mapped to a source network of the recursive-path through one or more depth-mappings, creating for each outgoing topology-mapping and each outgoing layer-mapping of said physical packet-switching node in said recursive-path a forwarding entry instructing said physical packet-switching node to create a packet with a packet overhead containing switching-identifiers of an outgoing set of edge-relationships of said outgoing topology-mapping or said outgoing layer-mapping, and to send said packet out of an output port, said output port being a point-of-attachment between said physical packet-switching node and said outgoing topology-mapping or said outgoing layer-mapping, ii. else if the recursive-path does not contain an outgoing topology-mapping or an outgoing layer-mapping for said physical packet-switching node, and said physical packet-switching node is mapped to a destination network of the recursive-path through one or more depth-mappings, creating for each incoming topology-mapping and each incoming layer-mapping of said physical packet-switching node in said recursive-path a forwarding entry instructing said physical packet-switching node to receive at an input port a packet in accordance with switching-identifiers of the incoming set of edge-relationships of said incoming topology-mapping or said incoming layer-mapping, said input port being a point-of-attachment of between said physical packet-switching node and said incoming topology-mapping or said incoming layer-mapping, iii. else if the recursive-path does contain one incoming topology-mapping or one incoming layer-mapping for said physical packet-switching node and the recursive-path does contain one or more outgoing topology-mappings or outgoing layer-mappings for said physical packet-switching node, creating for each outgoing topology-mapping and each outgoing layer-mapping of said physical packet-switching node in said recursive-path a forwarding entry instructing said physical packet-switching node to receive an incoming packet at an input port, said input port being a point-of-attachment between said physical packet-switching node and said incoming topology-mapping or said incoming layer-mapping specified by the recursive-path, said packet in accordance with switching-identifiers of an incoming set of edge-relationships of said incoming topology-mapping or said incoming layer-mapping and to modify said packet in accordance with switching-identifiers of an outgoing set of edge-relationships of said outgoing topology-mapping or said outgoing layer-mapping, and forward said packet out of an output port, said output port being a point-of-attachment between said physical packet-switching node and said outgoing topology-mapping or said outgoing layer-mapping.

26. The method according to claim 1, comprising:

Calculating forwarding entries for a physical non-packet-switching node within the recursive-path of a requested-path by performing the below method comprising the following actions:

i. if the recursive-path does not contain an incoming topology-mapping or an incoming layer-mapping for said physical non-packet-switching node, and said physical non-packet-switching node is mapped to a source network of the recursive-path through one or more depth-mappings, creating for each outgoing topology-mapping and each outgoing layer-mapping of said physical non-packet-switching node in said recursive-path an instruction instructing said physical non-packet-switching node to create a signal in accordance with a switching-identifiers of an outgoing set of edge-relationships of said outgoing topology-mapping or said outgoing layer-mapping, and to send said signal out of an output port, said output port being a point-of-attachment between said physical non-packet-switching node and said outgoing topology-mapping or said outgoing layer-mapping, ii. else if the recursive-path does not contain an outgoing topology-mapping or an outgoing layer-mapping for said physical non-packet-switching node, and said physical non-packet-switching node is mapped to a destination network of the recursive-path through one or more depth-mappings, creating for each incoming topology-mapping and each incoming layer-mapping of said physical non-packet-switching node in said recursive-path an instruction instructing said physical non-packet-switching node to receive at an input port a signal in accordance with switching-identifiers of an incoming set of edge-relationships of said incoming topology-mapping or said incoming layer-mapping, said input port being a point-of-attachment of between said physical non-packet-switching node and said incoming topology-mapping or said incoming layer-mapping, iii. else if the recursive-path does contain one incoming topology-mapping or one incoming layer-mapping for said physical non-packet-switching node and the recursive-path does contain one or more outgoing topology-mappings or outgoing layer-mappings for said physical non-packet-switching node, creating for each outgoing topology-mapping and each outgoing layer-mapping of said physical non-packet-switching node in said recursive-path an instruction instructing said physical non-packet-switching node to receive an incoming signal at an input port in accordance with switching-identifiers of an incoming set of edge-relationships of said incoming topology-mapping or said incoming layer-mapping, said input port being a point-of-attachment between said physical non-packet-switching node and said incoming topology-mapping or said incoming layer-mapping specified by the recursive-path, and to modify said signal in accordance with switching-identifiers of an outgoing set of edge-relationships of said outgoing topology-mapping or said outgoing layer-mapping, and forward said signal out of an output port, said output port being a point-of-attachment between said physical non-packet-switching node and said outgoing topology-mapping or said outgoing layer-mapping.

27. A compiler comprising a processor and a memory storing a non-transitory computer-readable medium, arranged to perform the method of claim 1.

28. A non-transitory computer-readable medium for controlling an overall network by a compiler, comprising instructions and data, arranged to be loaded by the compiler according to claim 27 and, then, allowing said compiler to perform the method.

29. A network comprising the compiler according to claim 27.

* * * * *